(12) United States Patent
Komiyama

(10) Patent No.: US 12,704,702 B2
(45) Date of Patent: Aug. 11, 2026

(54) ZOOM LENS, AND IMAGING APPARATUS INCLUDING THE SAME

(71) Applicant: CANON KABUSHIKI KAISHA, Tokyo (JP)

(72) Inventor: Takahiro Komiyama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 233 days.

(21) Appl. No.: 18/748,952

(22) Filed: Jun. 20, 2024

(65) Prior Publication Data

US 2024/0427126 A1 Dec. 26, 2024

(30) Foreign Application Priority Data

Jun. 21, 2023 (JP) ................................ 2023-101410

(51) Int. Cl.
*G02B 15/14* (2006.01)
*G02B 15/167* (2006.01)

(52) U.S. Cl.
CPC ....... *G02B 15/1461* (2019.08); *G02B 15/167* (2013.01)

(58) Field of Classification Search
CPC .......................... G02B 15/1461; G02B 15/167
USPC .......................................................... 359/683
See application file for complete search history.

(56) References Cited

FOREIGN PATENT DOCUMENTS

| | | | |
|---|---|---|---|
| JP | 2012023021 A | | 2/2012 |
| JP | 2014095877 A | | 5/2014 |
| JP | 2017203927 A | * | 11/2017 |
| JP | 2018116182 A | | 7/2018 |

* cited by examiner

*Primary Examiner* — Bumsuk Won
*Assistant Examiner* — Mitchell T Oestreich
(74) *Attorney, Agent, or Firm* — Canon U.S.A., Inc. IP Division

(57) ABSTRACT

A zoom lens includes a first lens unit, a second lens unit, a third lens unit, and a rear lens group. The first lens unit has a positive refractive power. The third lens unit has a negative refractive power. The rear lens group includes one or more lens units. The first lens unit, the second lens unit, the third lens unit, and the rear lens group are disposed in order from an object side to an image side. An interval between lens units disposed adjacent to each other changes during zooming. The rear lens group includes all of lens units disposed closer to an image than the third lens unit. The first lens unit includes a first positive lens disposed closest to an object and having a positive refractive power. The rear lens group has a positive refractive power at a wide-angle end. Predetermined inequalities are satisfied.

26 Claims, 41 Drawing Sheets

L0
LR
IP
FL
L8
LF2
LRF
L7
L6
L5
LVR
L4
SP
L3
L2
GN1
L1B
L1
GP1
L1A

Fno=6.48
-0.400
0.400
SPHERICAL ABERRATION
M
S
ω=2.1°
-0.400
0.400
ASTIGMATISM
ω=2.1°
-5.000
5.000
DISTORTION (%)
d
g
ω=2.1°
-0.050
0.050
CHROMATIC ABERRATION

L0
IP
FL
LR
LRF
LVR
SP
L6L7
L5
L4
L3
L2
L1
L1A
L1B
GN1
GP1

Fno=5.15
SPHERICAL ABERRATION
-0.400
0.400
M
S
ω=5.87°
ASTIGMATISM
-0.400
0.400
ω=5.87°
DISTORTION (%)
-5.000
5.000
d
g
ω=5.87°
CHROMATIC ABERRATION
-0.050
0.050

L0
LR
IP
FL
LRF
LF2
LVR
SP
GN1
GP1
L1
L2
L3
L4
L5
L6
L7

L0
LR
IP
FL
LF2
LRF
LVR
SP
GN1
GP1
L1A
L1B
L1
L2
L3
L4
L5
L6
L7
L8

Fno=5.7
-0.400
0.400
SPHERICAL ABERRATION
M
S
ω=4.01°
-0.400
0.400
ASTIGMATISM
ω=4.01°
-5.000
5.000
DISTORTION (%)
d
g
ω=4.01°
-0.050
0.050
CHROMATIC ABERRATION

Fno=5.15
SPHERICAL ABERRATION
-0.400
0.400
M ----- S ——
ω=5.32°
ASTIGMATISM
-0.400
0.400
ω=5.32°
DISTORTION (%)
-5.000
5.000
d ——
g -----
ω=5.32°
CHROMATIC ABERRATION
-0.050
0.050

L0
LR
FL
IP
LRF
LF2
LVR
SP
GN1
GP1
L1A
L1B
L1
L2
L3
L4
L5
L6
L7
L8

L0
LR
IP
FL
LF2
LRF
LVR
SP
GN1
GP1
L1A
L1B
L1
L2
L3
L4
L5
L6
L7
L8

L0
LR
IP
FL
LRF
LVR
SP
LF2
GN1
L1B
GP1
L1A
L7L8
L6
L5
L4
L3
L2
L1

Fno=6.48
-0.400
0.400
SPHERICAL ABERRATION
M
S
ω=2.1°
-0.400
0.400
ASTIGMATISM
ω=2.1°
-5.000
5.000
DISTORTION (%)
d
g
ω=2.1°
-0.050
0.050
CHROMATIC ABERRATION

Fno=6.48
-0.400
0.400
SPHERICAL ABERRATION
M
S
ω=1.99°
-0.400
0.400
ASTIGMATISM
ω=1.99°
-5.000
5.000
DISTORTION (%)
d
g
ω=1.99°
-0.050
0.050
CHROMATIC ABERRATION

ZOOM LENS, AND IMAGING APPARATUS INCLUDING THE SAME

BACKGROUND

Technical Field

Aspect of the embodiments relates to a zoom lens and can be suitably applied to an imaging apparatus such as a digital video camera, a digital still camera, a broadcasting camera, a silver-halide film camera, and the like.

Description of the Related Art

These days, as an imaging optical system to be used for an imaging apparatus, a compact and lightweight zoom lens that offers high optical performance throughout the entire zoom range while achieving a long focal length at the telephoto end is demanded.

Japanese Patent Laid-Open No. 2018-116182 discloses a positive-lead-type optical system as a zoom lens having a long focal length at the telephoto end.

The zoom lens disclosed in Japanese Patent Laid-Open No. 2018-116182 includes a first lens unit having a positive refractive power and a second lens unit having a negative refractive power. The first lens unit and the second lens unit are disposed in order from the object side to the image side. The first lens unit is stationary for zooming. However, since the refractive power of the first lens unit is weak, the principal point of the entire system is disposed on the image side, and the overall lens length is thus long.

SUMMARY

A zoom lens includes a first lens unit having a positive refractive power, a second lens unit, a third lens unit having a negative refractive power, and a rear lens group including one or more lens units. The first lens unit, the second lens unit, the third lens unit, and the rear lens group are disposed in order from an object side to an image side.

An interval between lens units disposed adjacent to each other changes during zooming. The rear lens group includes all of lens units disposed closer to an image than the third lens unit in the zoom lens.

The first lens unit is stationary for zooming, and includes a first positive lens disposed closest to an object and having a positive refractive power.

The rear lens group has a positive refractive power at a wide-angle end.

Following inequalities are satisfied:

$$0.05 < f1/|f2| < 2.00,$$

$$\text{and } 0.40 < Lt/ft < 0.65,$$

where f1 denotes a focal length of the first lens unit, f2 denotes a focal length of the second lens unit, Lt denotes an overall lens length at a telephoto end, and ft denotes a focal length of an entire system at the telephoto end.

Further features of the disclosure will become apparent from the following description of exemplary embodiments with reference to the attached drawings.

DESCRIPTION OF THE EMBODIMENTS

Figure 1:
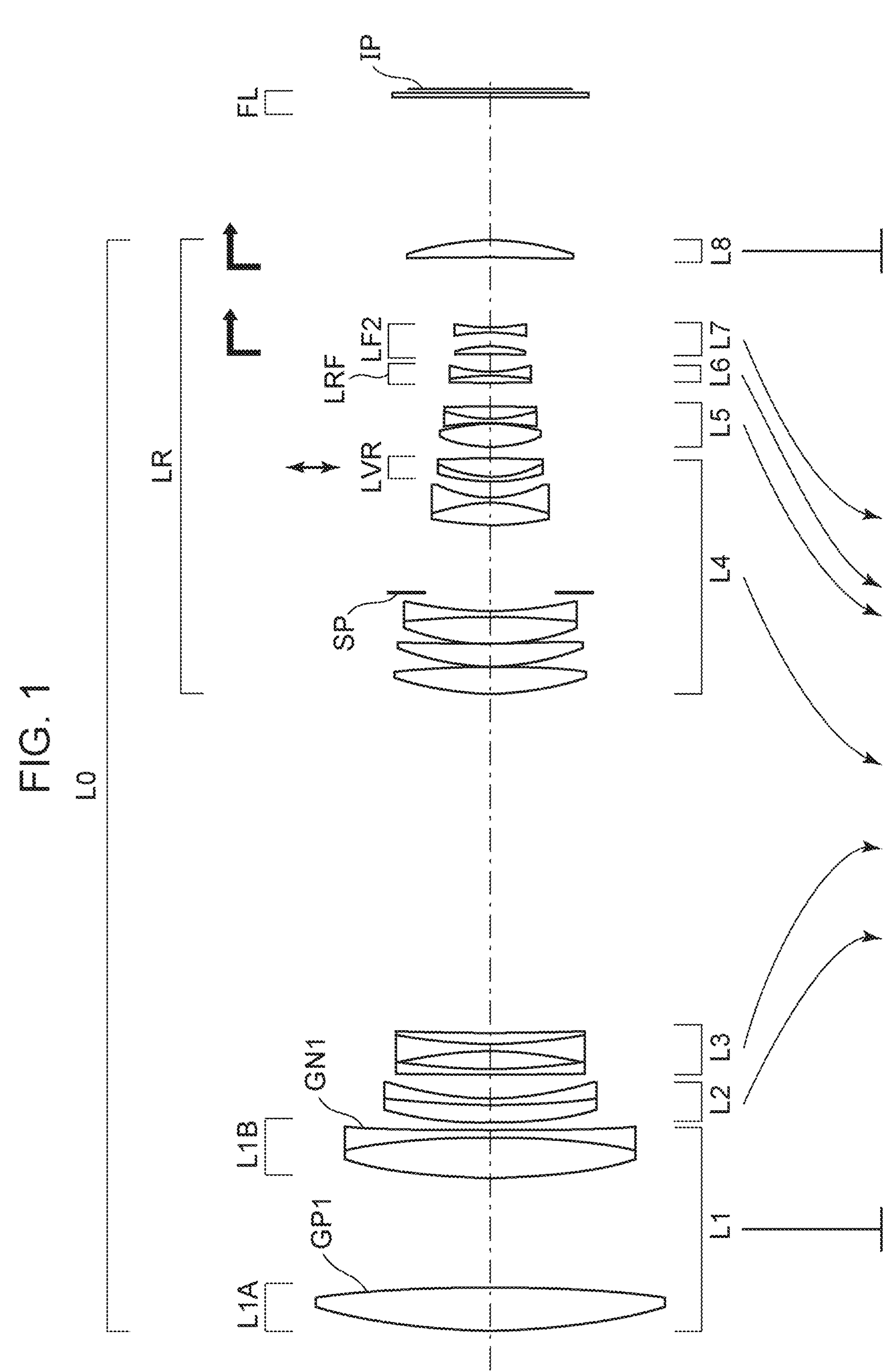
FIG. 1 is a cross-sectional view of lenses at the wide-angle end of a zoom lens according to a first embodiment.
Figure 2A:
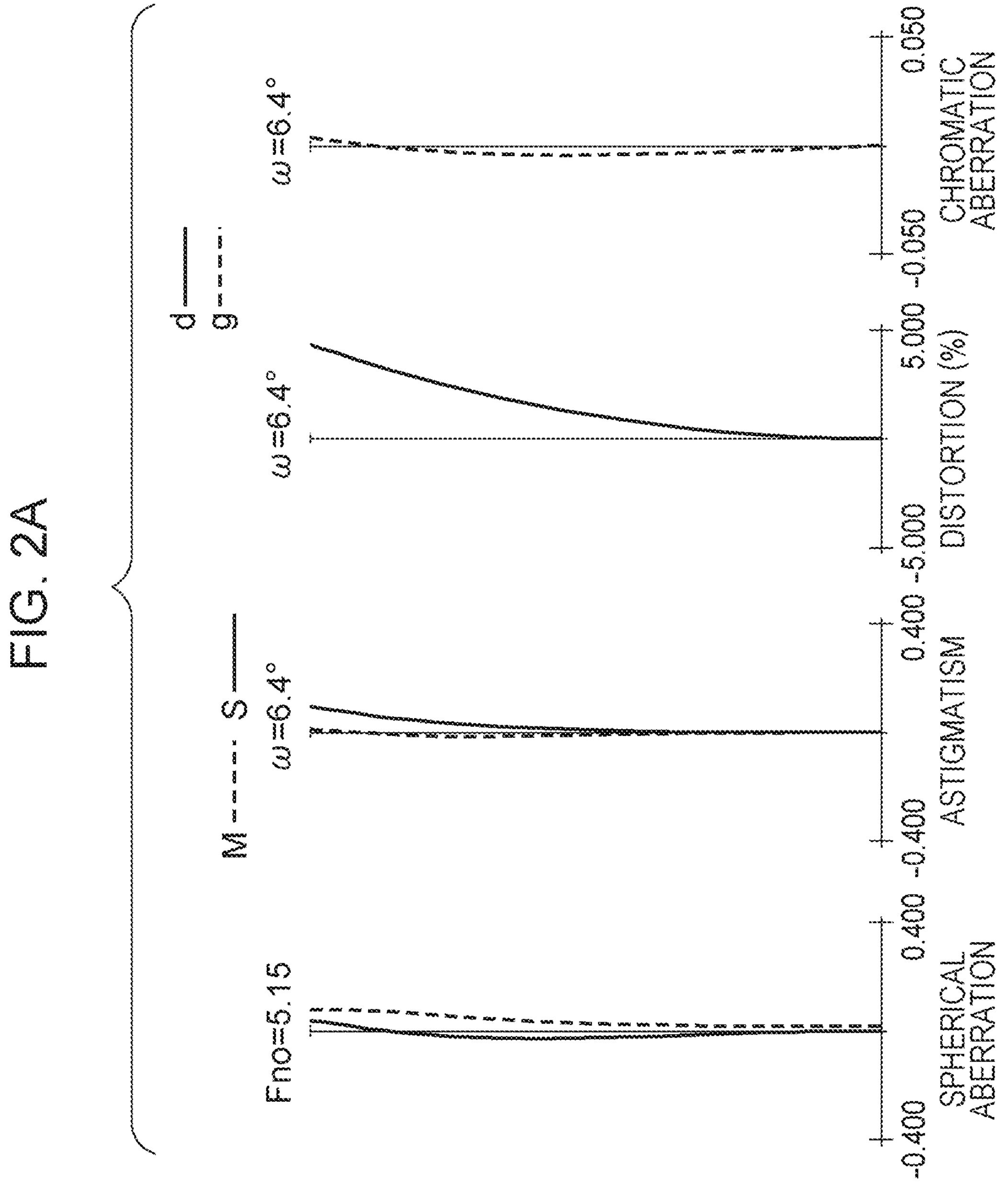
FIG. 2A is a set of aberration graphs obtained when focusing to infinity is performed at the wide-angle end of the zoom lens according to the first embodiment.
Figure 2B:
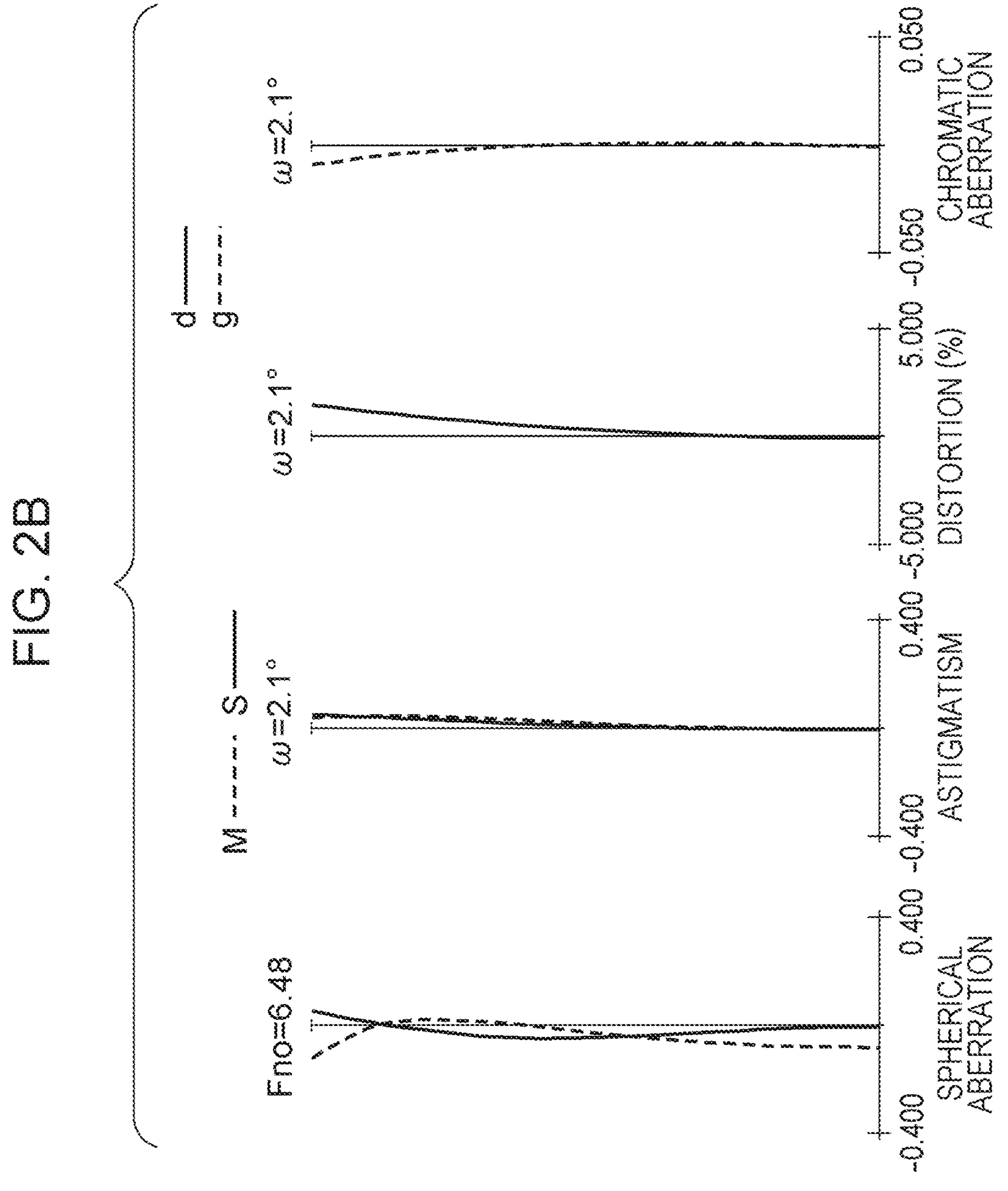
FIG. 2B is a set of aberration graphs obtained when focusing to infinity is performed at the telephoto end of the zoom lens according to the first embodiment.
Figure 3A:
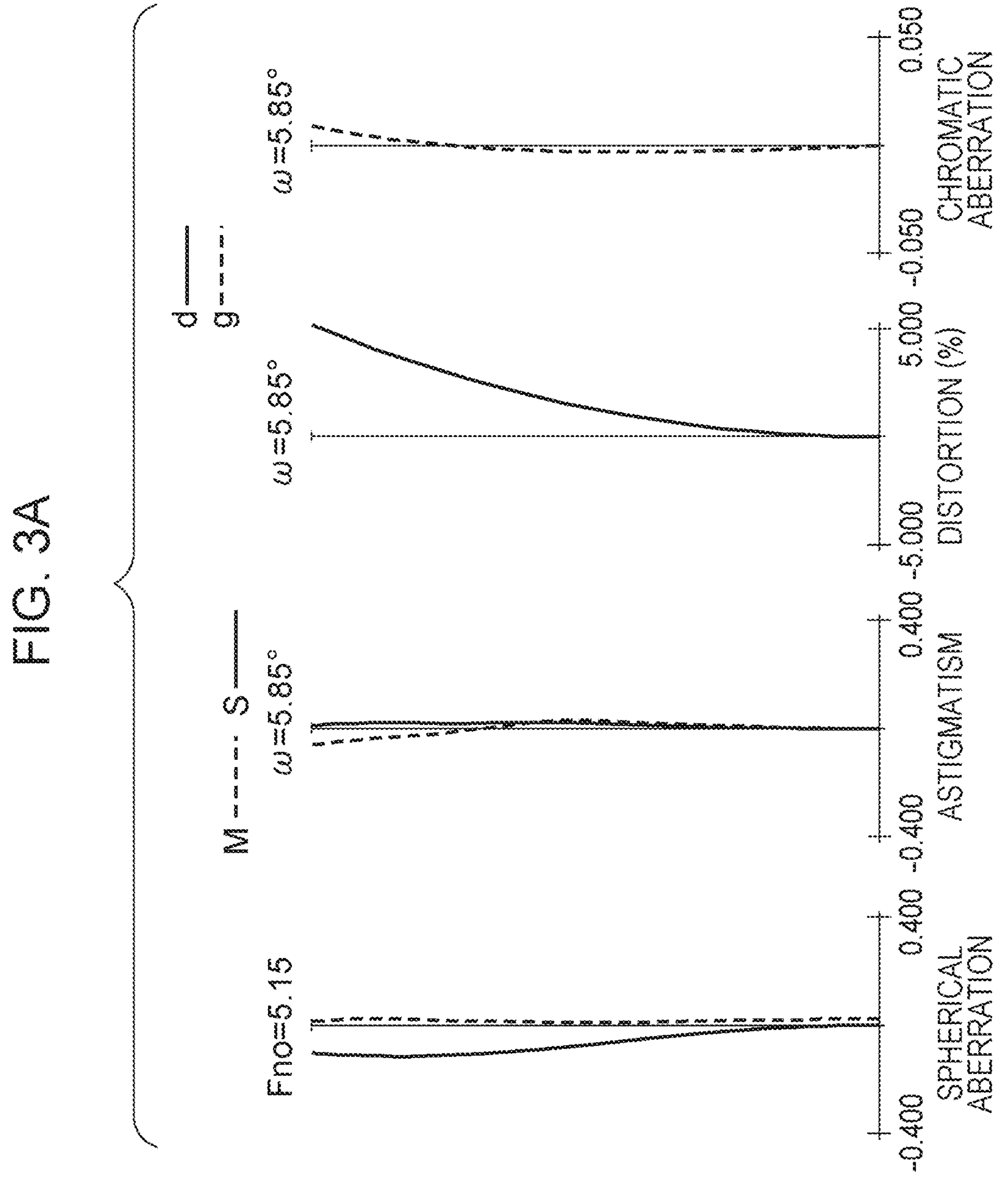
FIG. 3A is a set of aberration graphs obtained when focusing to close range is performed at the wide-angle end of the zoom lens according to the first embodiment.
Figure 3B:
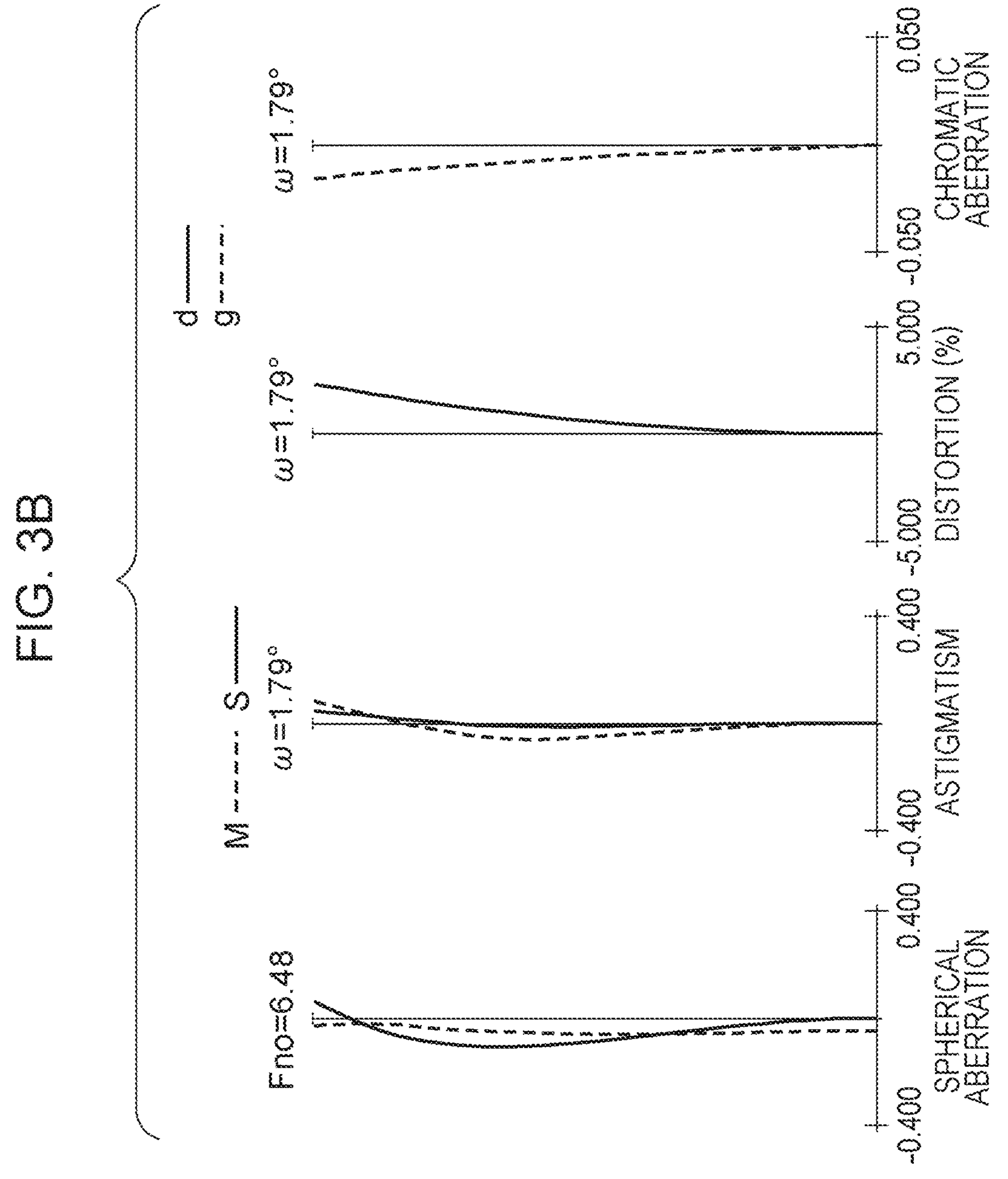
FIG. 3B is a set of aberration graphs obtained when focusing to close range is performed at the telephoto end of the zoom lens according to the first embodiment.
Figure 4:
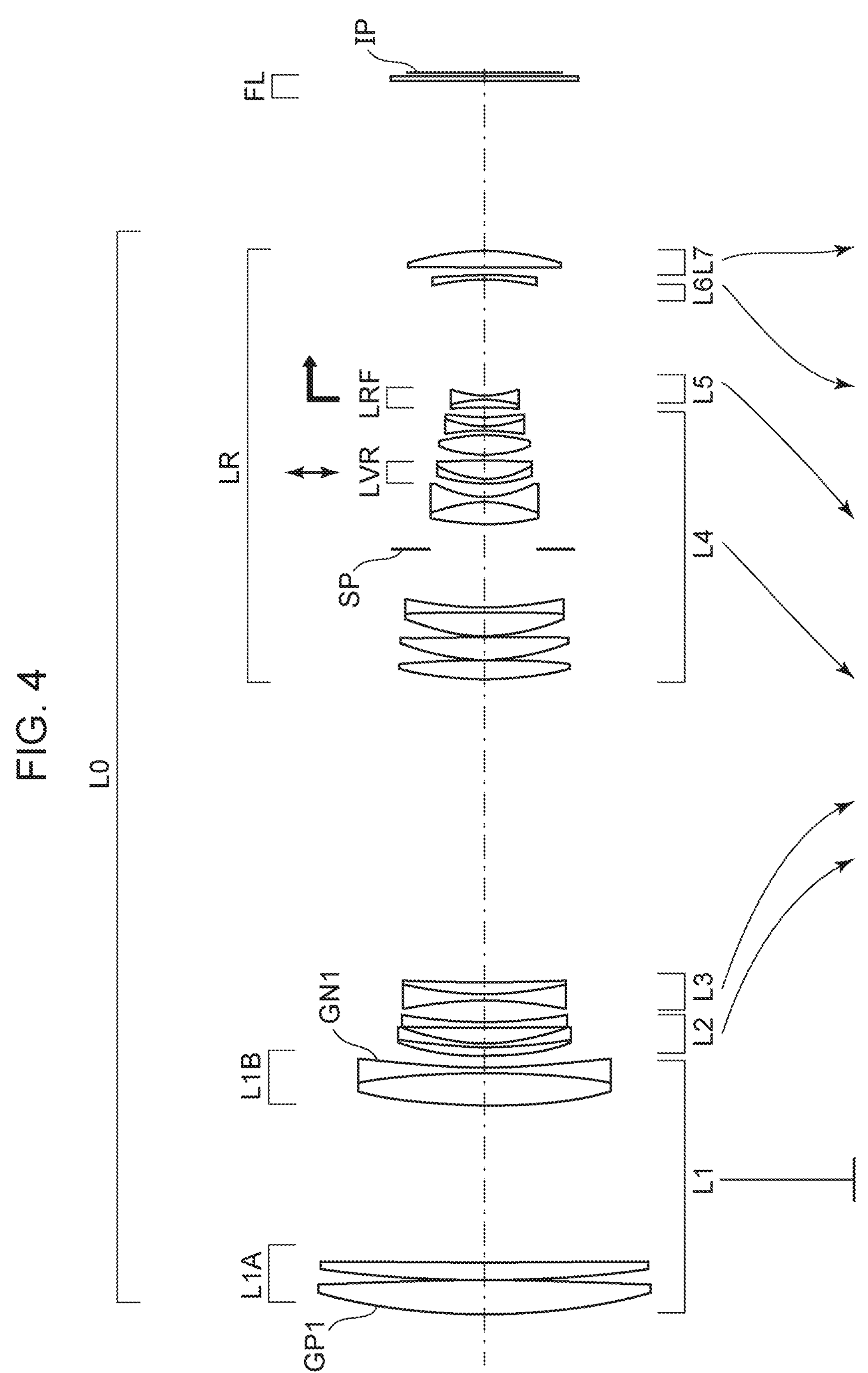
FIG. 4 is a cross-sectional view of lenses at the wide-angle end of a zoom lens according to a second embodiment.
Figure 5A:
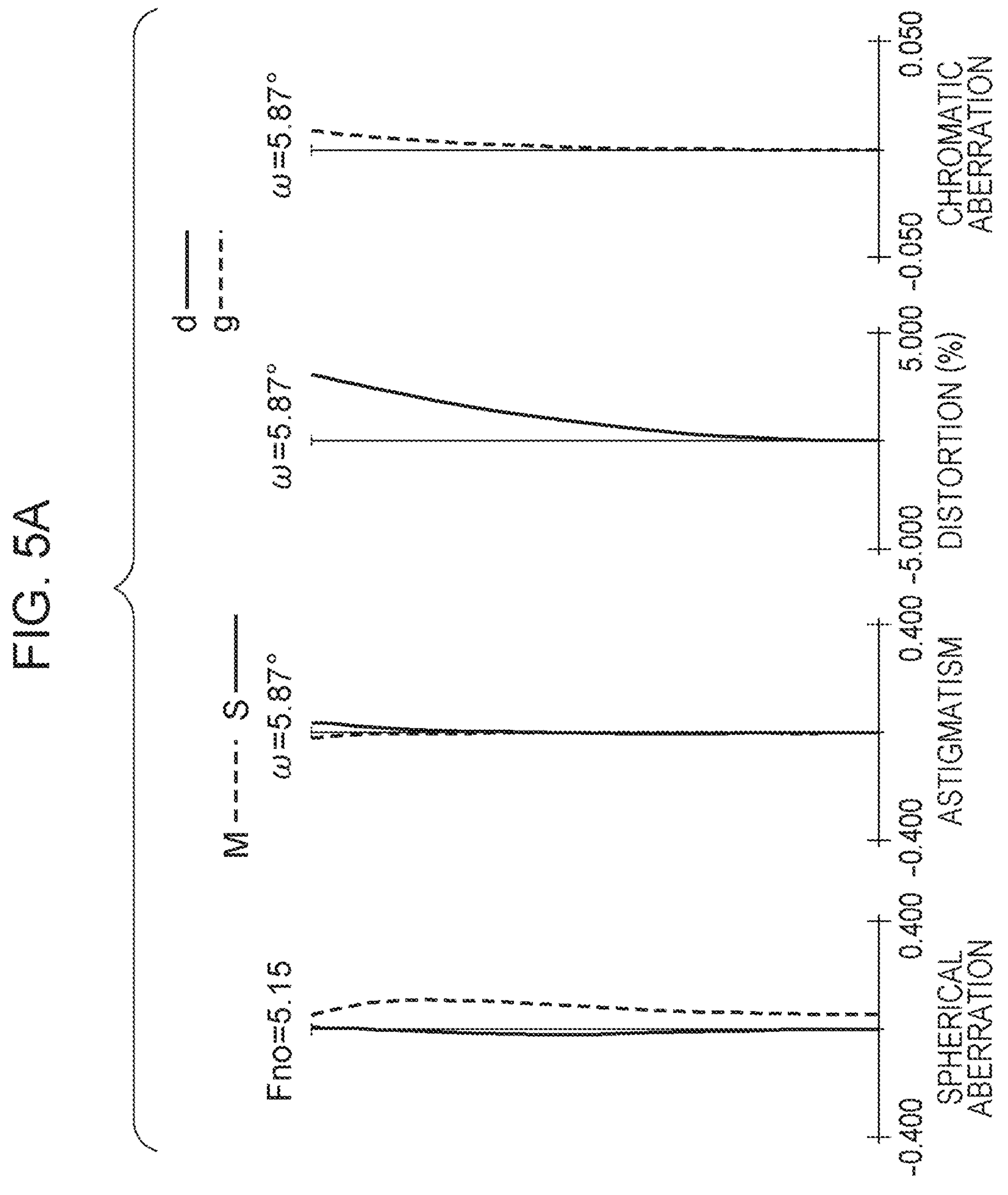
FIG. 5A is a set of aberration graphs obtained when focusing to infinity is performed at the wide-angle end of the zoom lens according to the second embodiment.
Figure 5B:
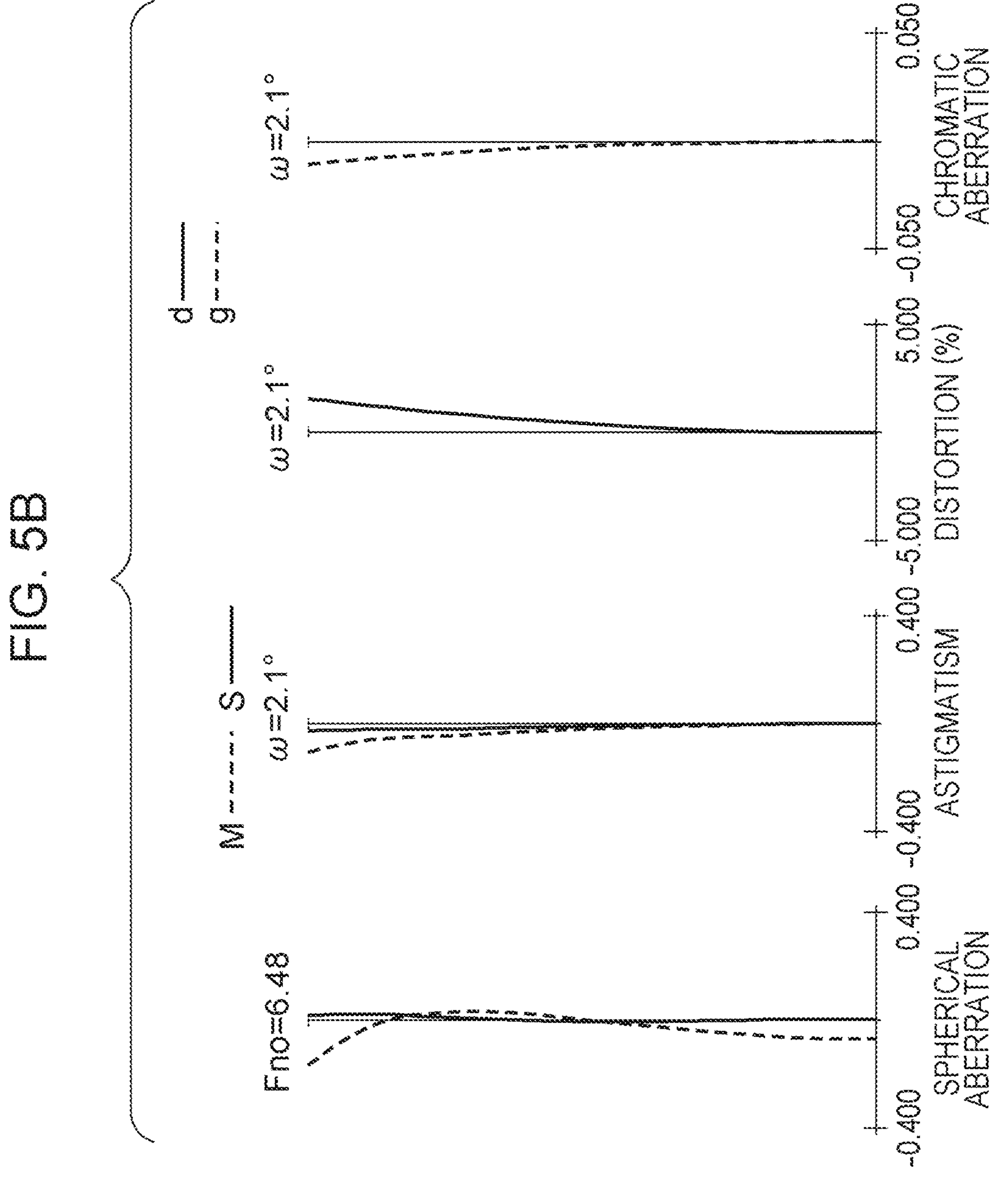
FIG. 5B is a set of aberration graphs obtained when focusing to infinity is performed at the telephoto end of the zoom lens according to the second embodiment.
Figure 6A:
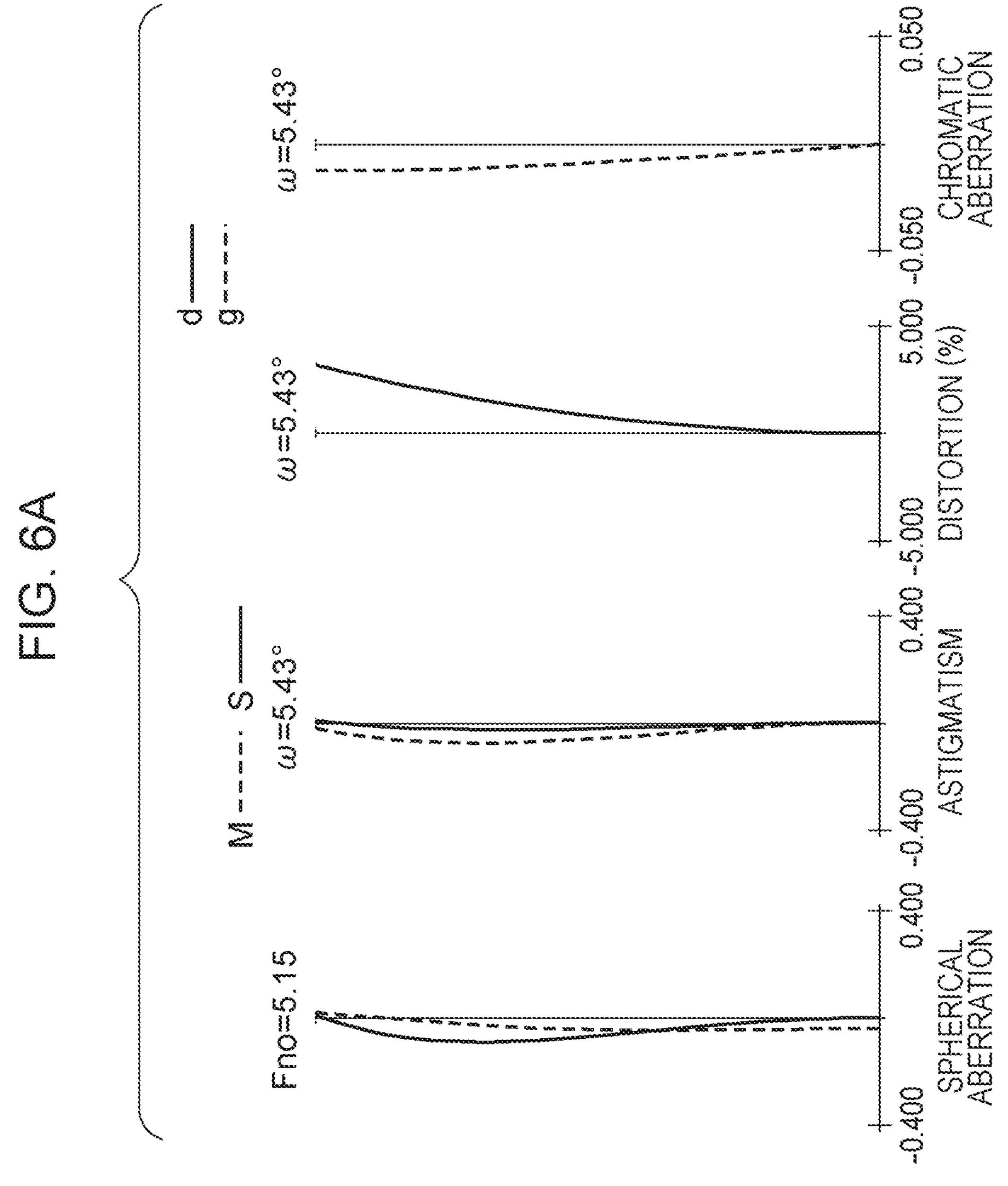
FIG. 6A is a set of aberration graphs obtained when focusing to close range is performed at the wide-angle end of the zoom lens according to the second embodiment.
Figure 6B:
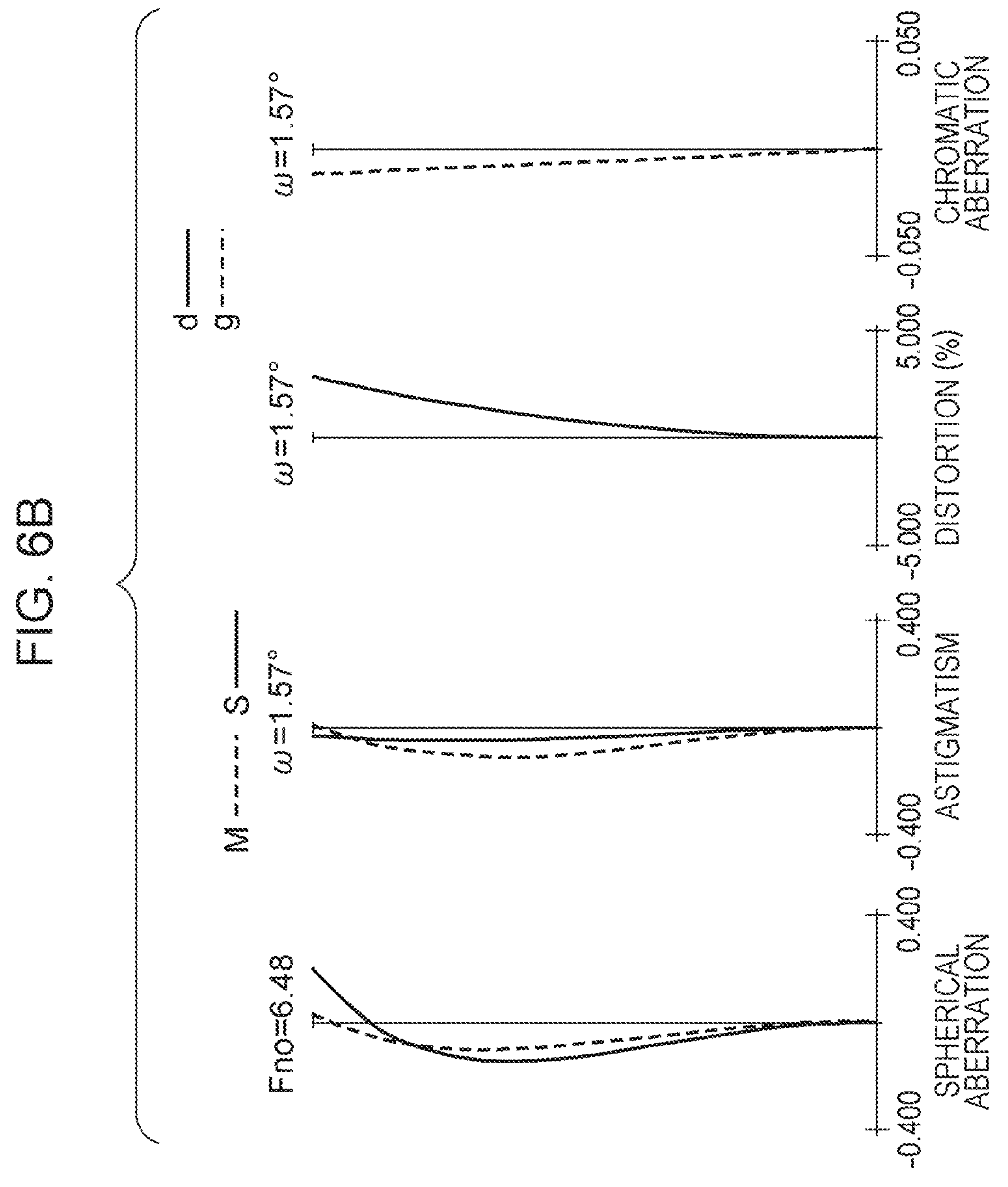
FIG. 6B is a set of aberration graphs obtained when focusing to close range is performed at the telephoto end of the zoom lens according to the second embodiment.
Figure 7:
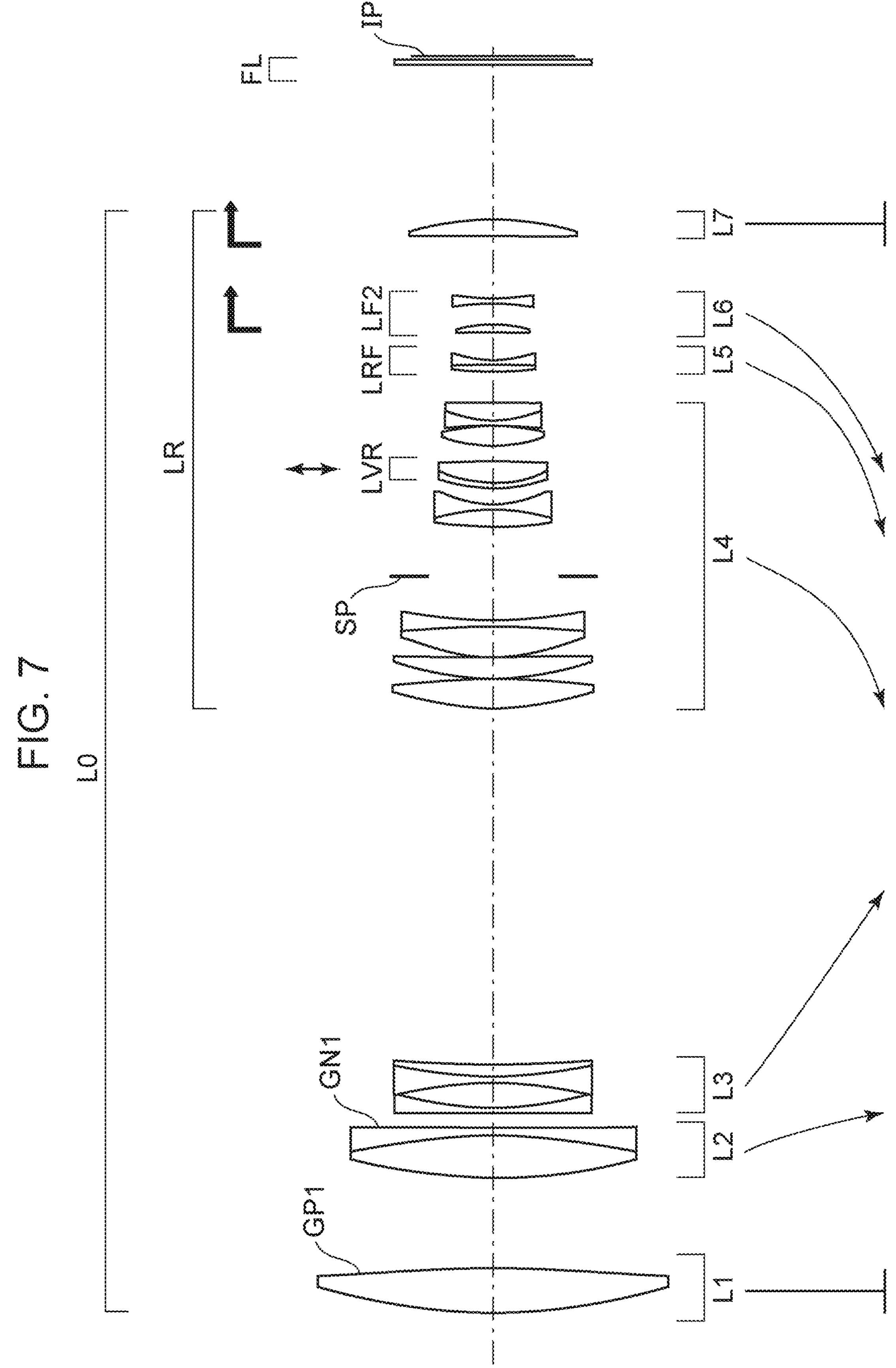
FIG. 7 is a cross-sectional view of lenses at the wide-angle end of a zoom lens according to a third embodiment.
Figure 8A:
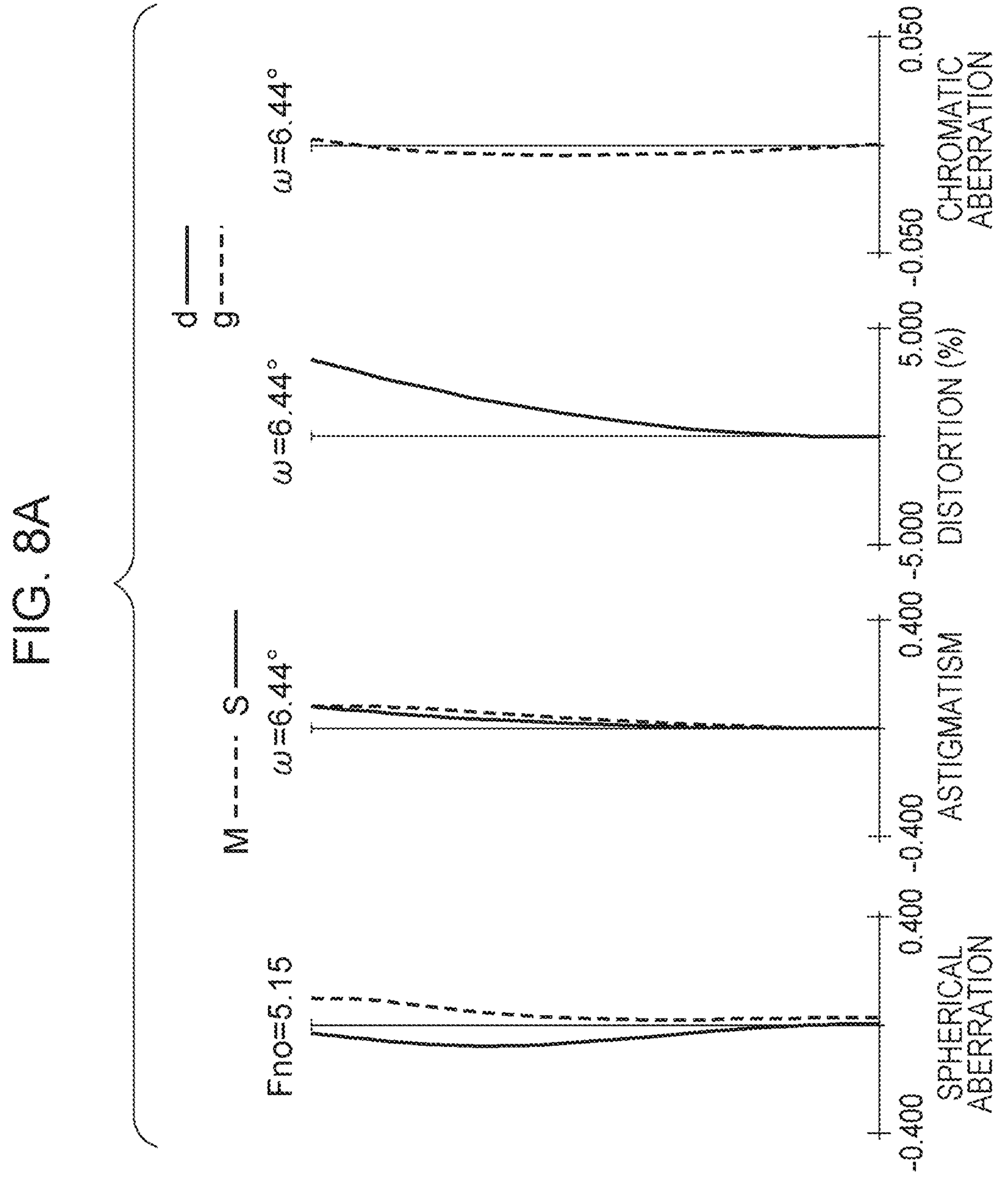
FIG. 8A is a set of aberration graphs obtained when focusing to infinity is performed at the wide-angle end of the zoom lens according to the third embodiment.
Figure 8B:
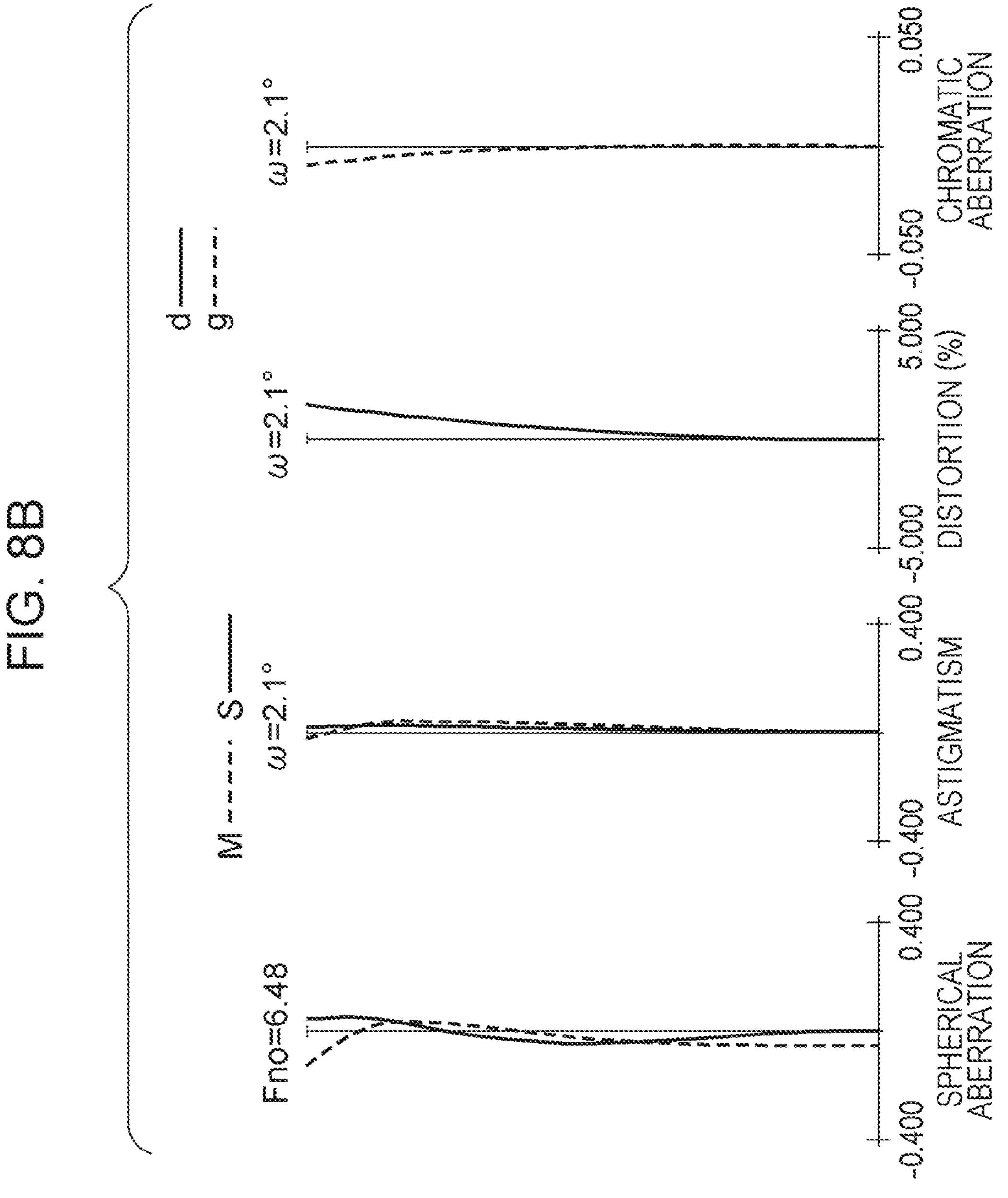
FIG. 8B is a set of aberration graphs obtained when focusing to infinity is performed at the telephoto end of the zoom lens according to the third embodiment.
Figure 9A:
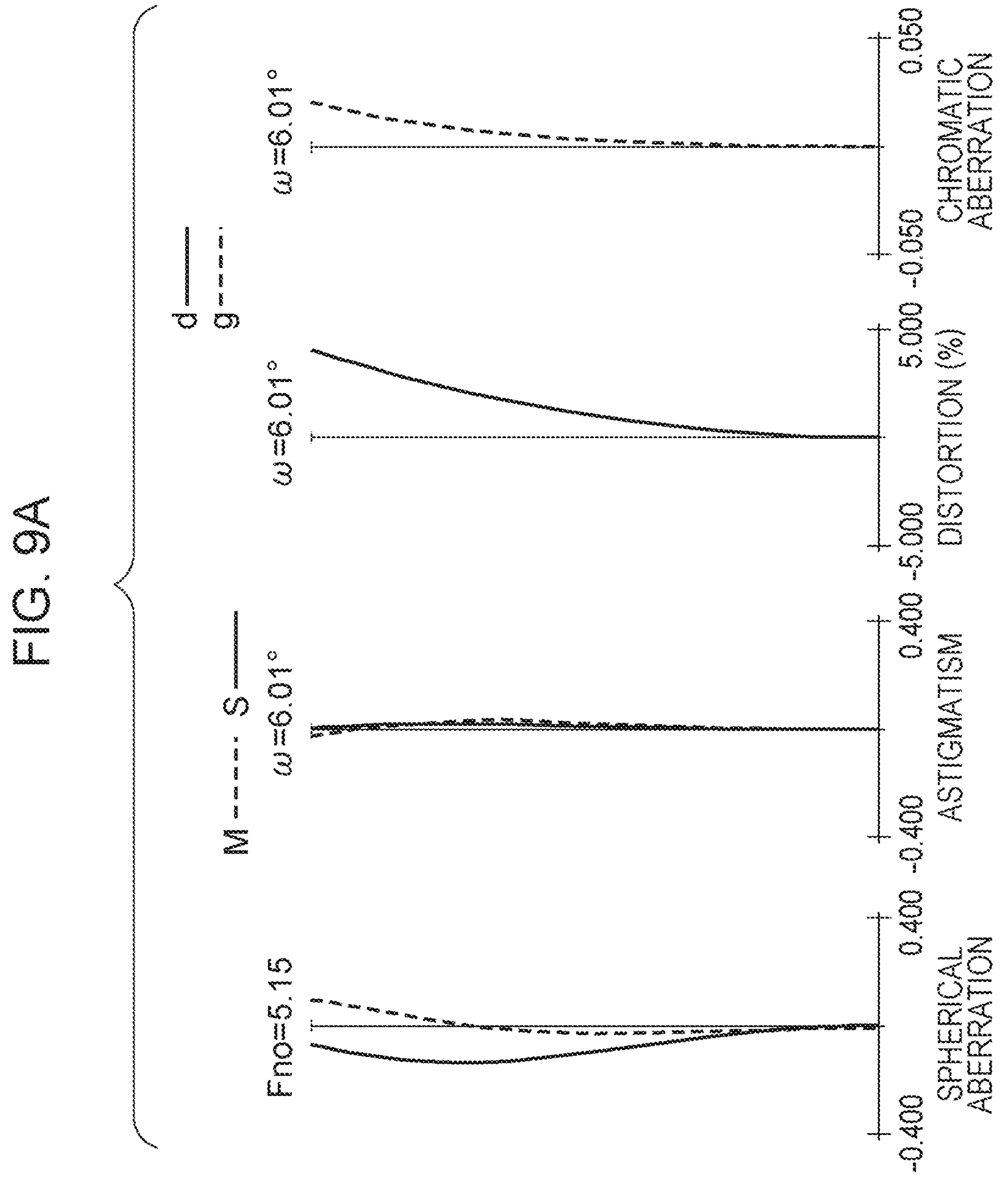
FIG. 9A is a set of aberration graphs obtained when focusing to close range is performed at the wide-angle end of the zoom lens according to the third embodiment.
Figure 9B:
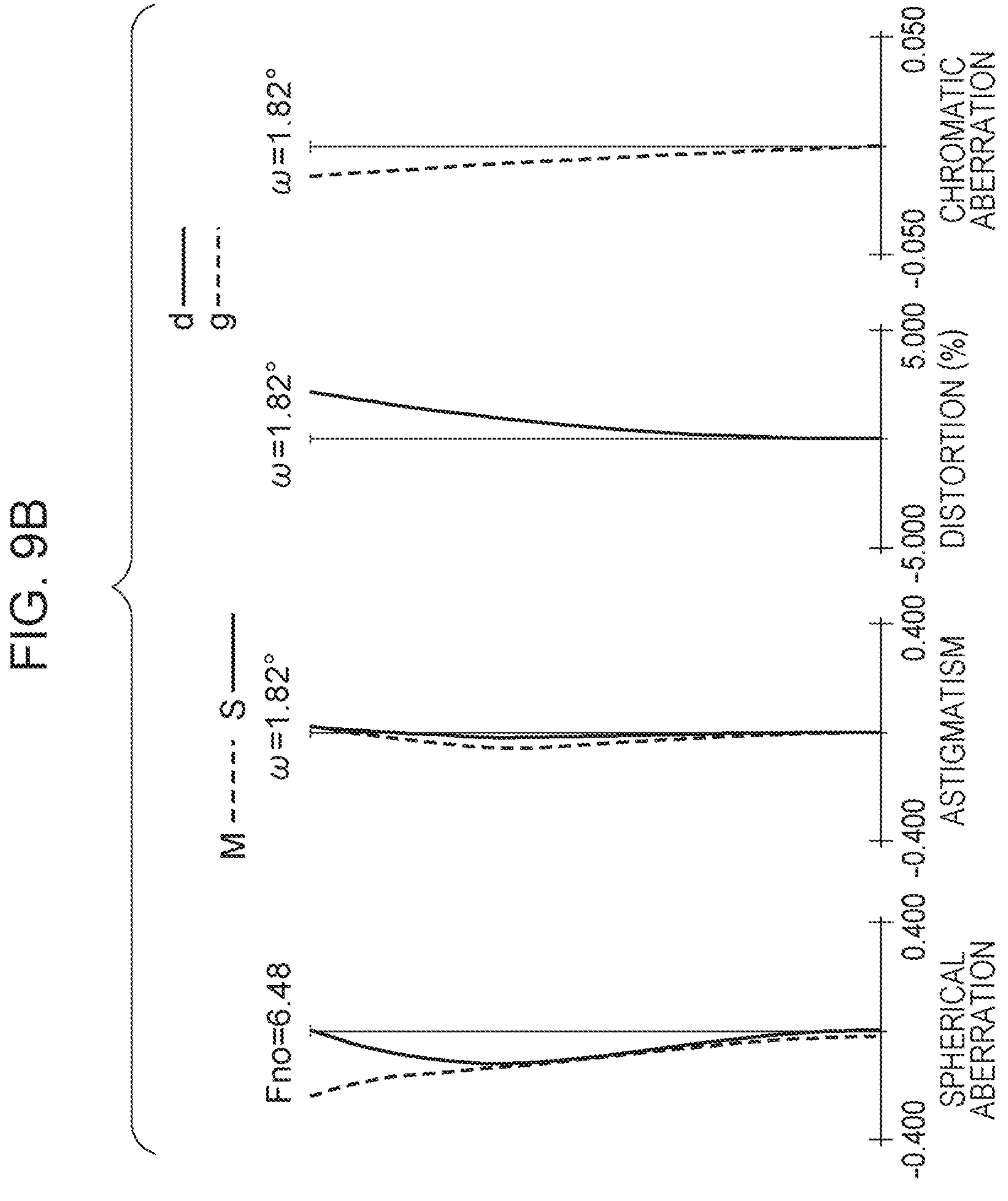
FIG. 9B is a set of aberration graphs obtained when focusing to close range is performed at the telephoto end of the zoom lens according to the third embodiment.
Figure 10:
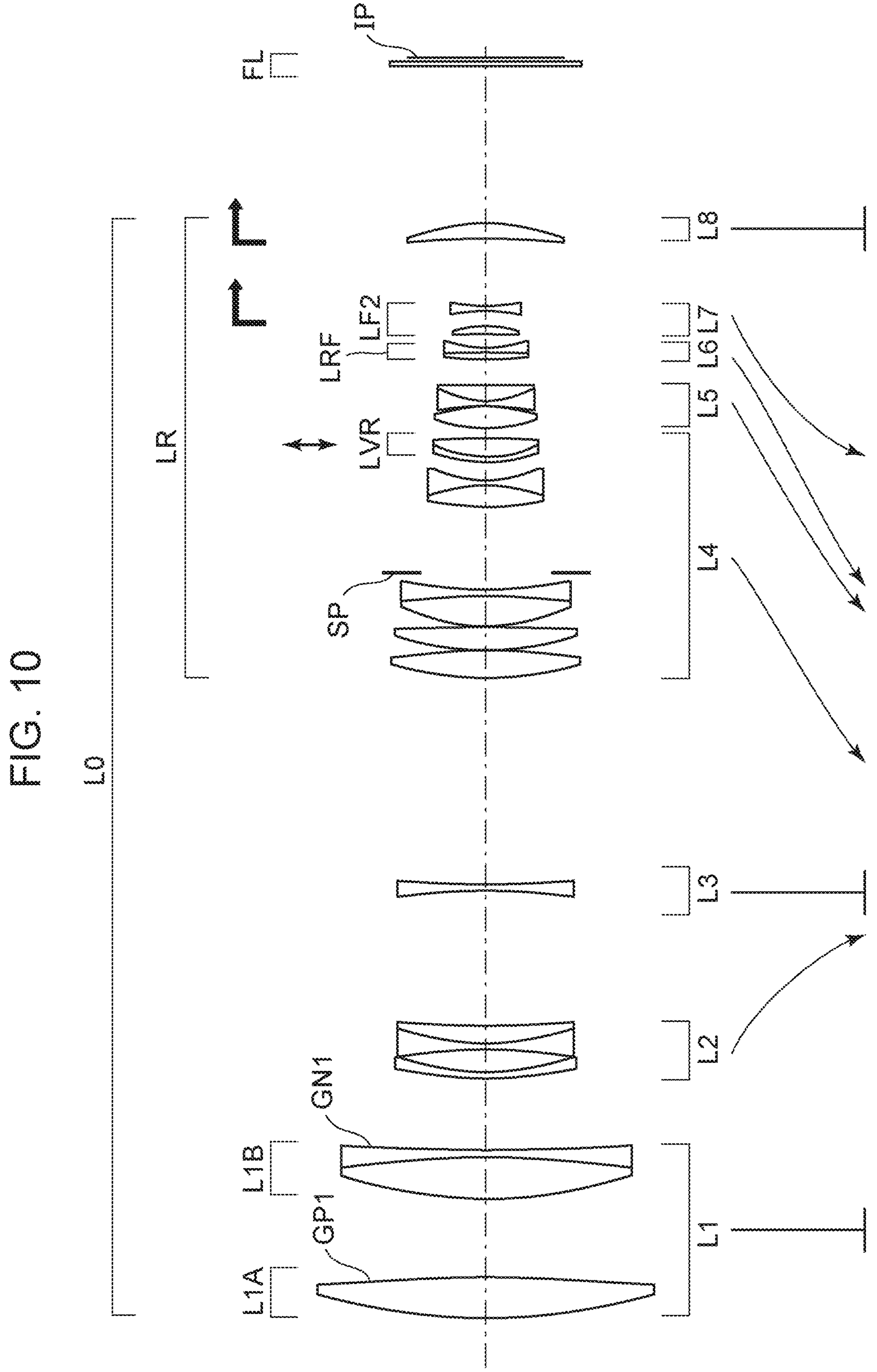
FIG. 10 is a cross-sectional view of lenses at the wide-angle end of a zoom lens according to a fourth embodiment.
Figure 11A:
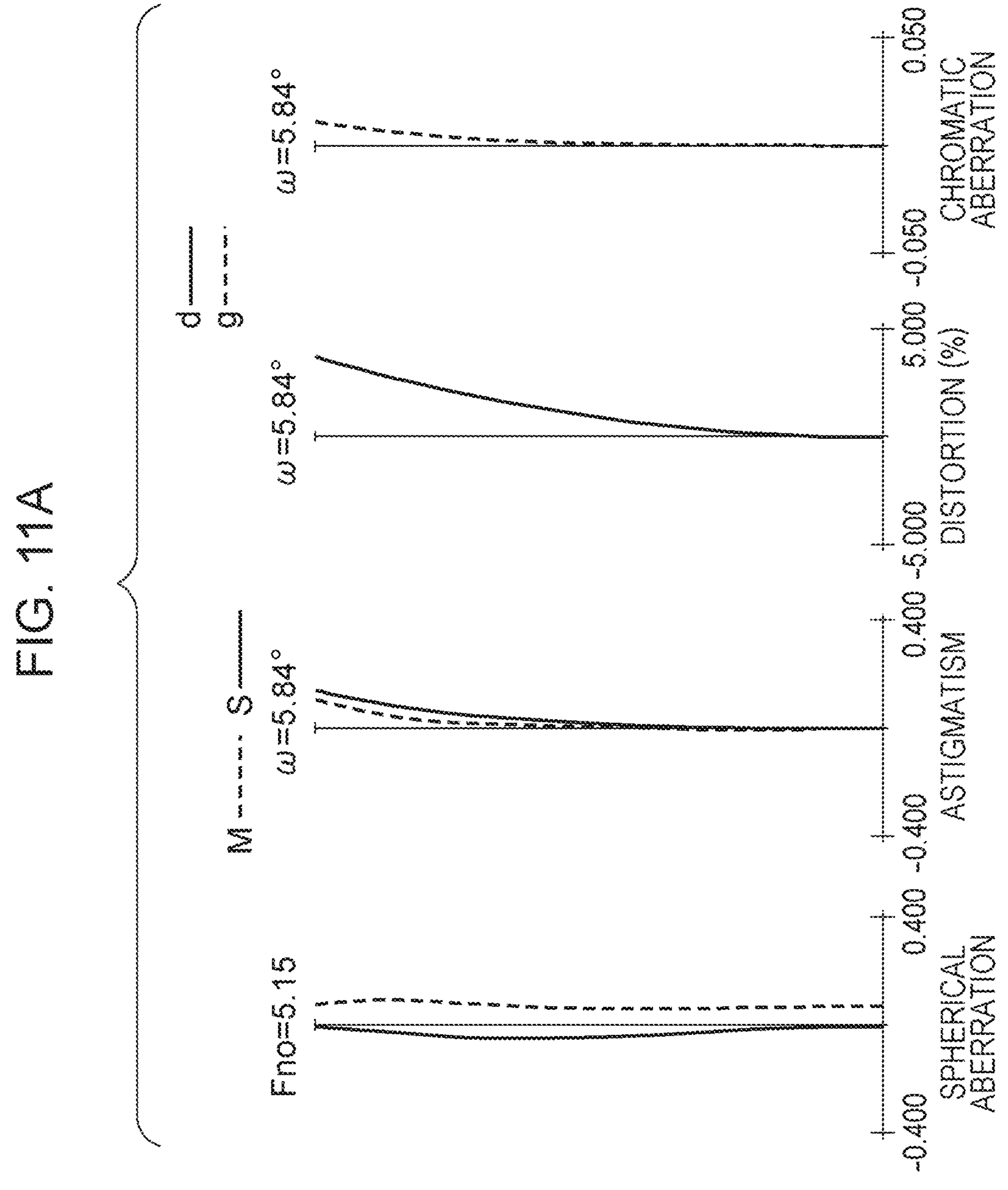
FIG. 11A is a set of aberration graphs obtained when focusing to infinity is performed at the wide-angle end of the zoom lens according to the fourth embodiment.
Figure 11B:
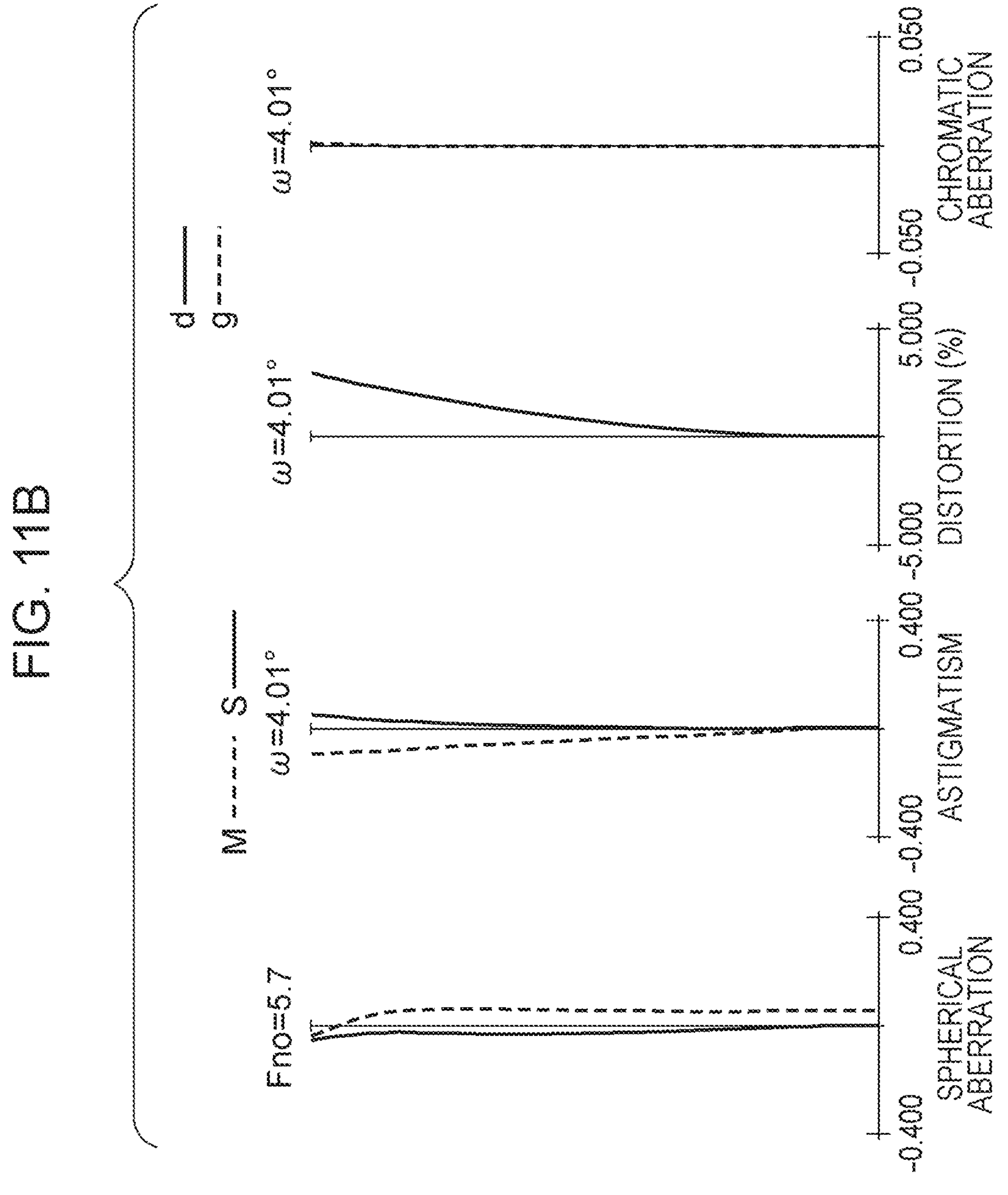
FIG. 11B is a set of aberration graphs obtained when focusing to infinity is performed at the telephoto end of the zoom lens according to the fourth embodiment.
Figure 12A:
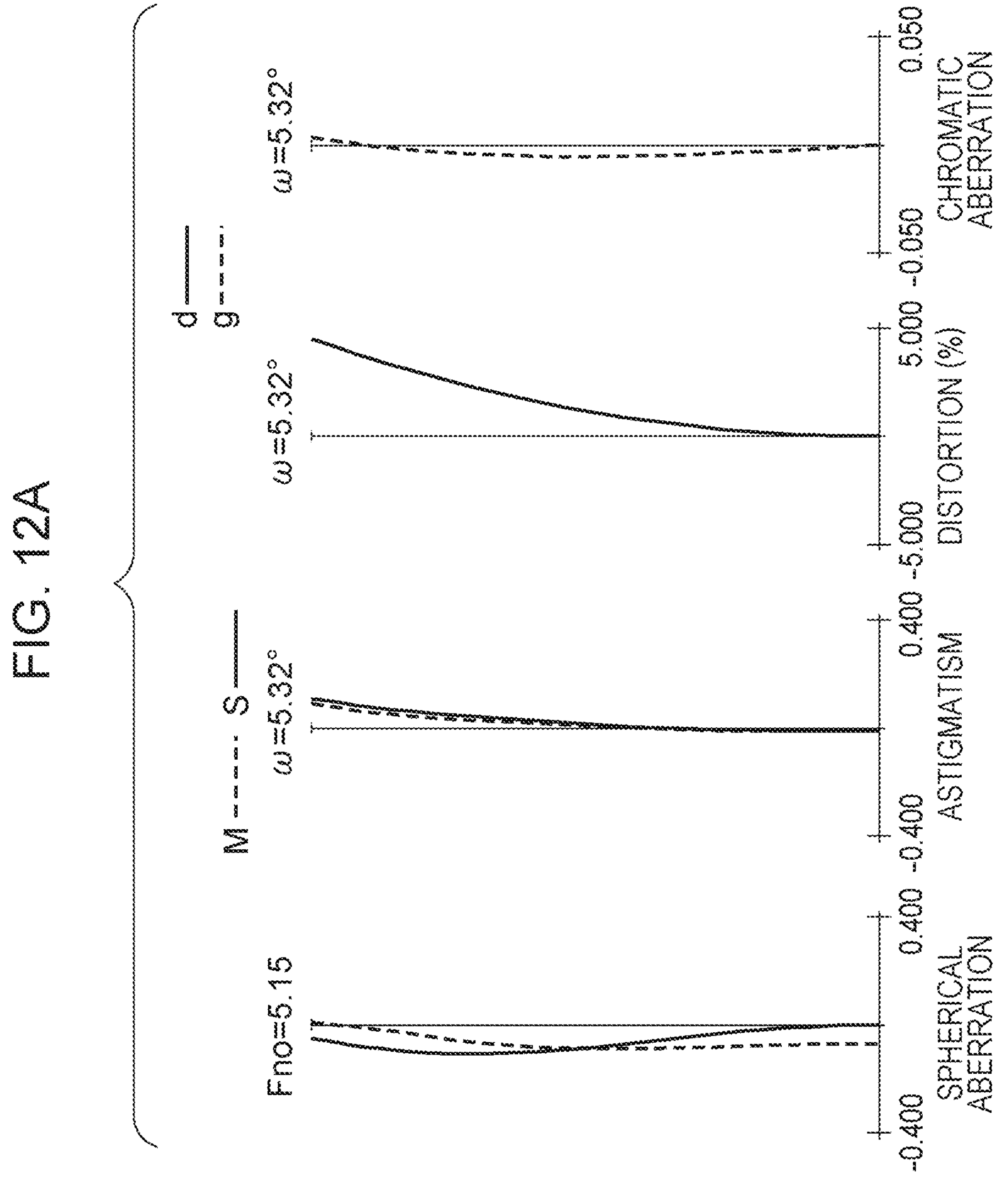
FIG. 12A is a set of aberration graphs obtained when focusing to close range is performed at the wide-angle end of the zoom lens according to the fourth embodiment.
Figure 12B:
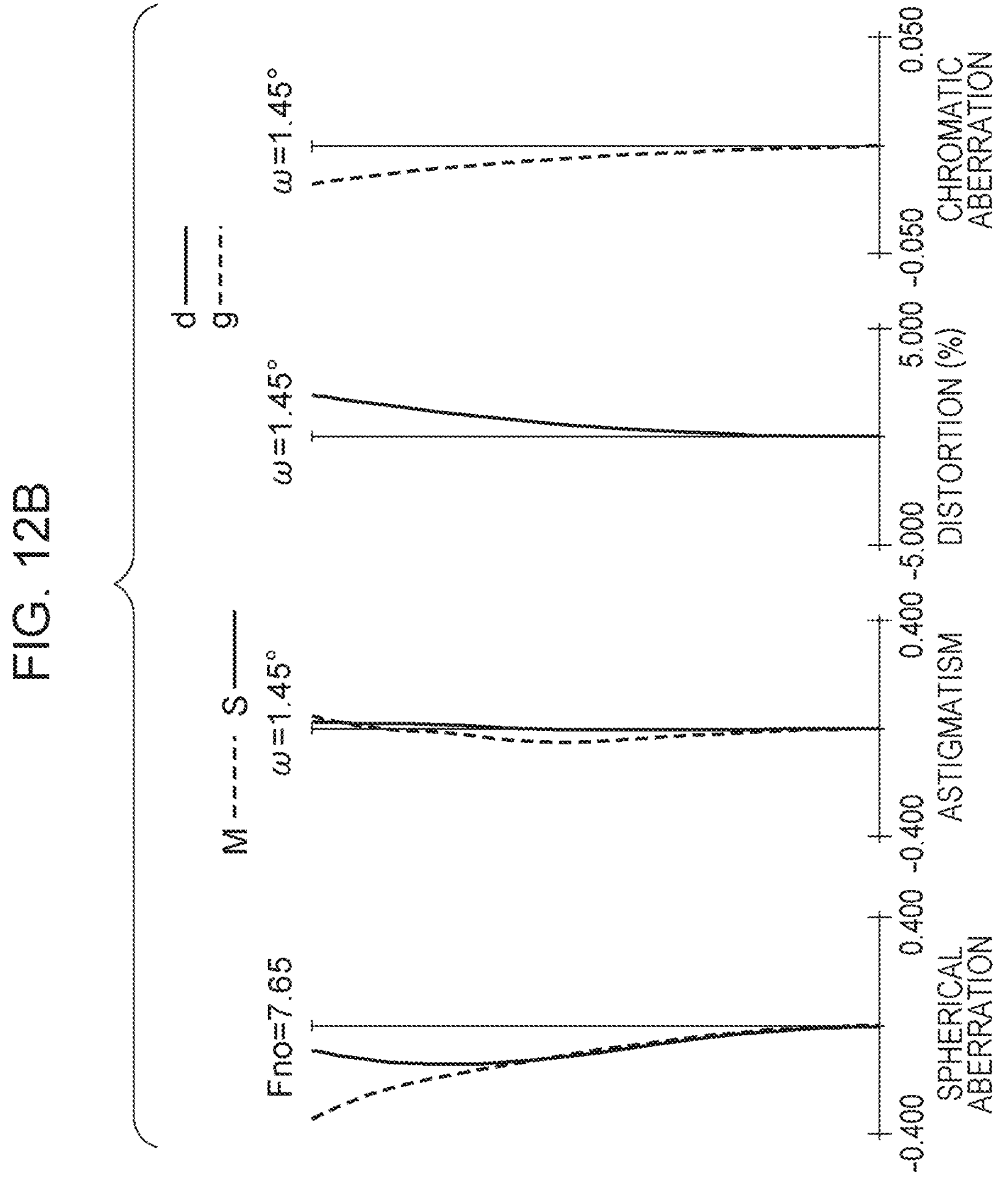
FIG. 12B is a set of aberration graphs obtained when focusing to close range is performed at the telephoto end of the zoom lens according to the fourth embodiment.
Figure 13:
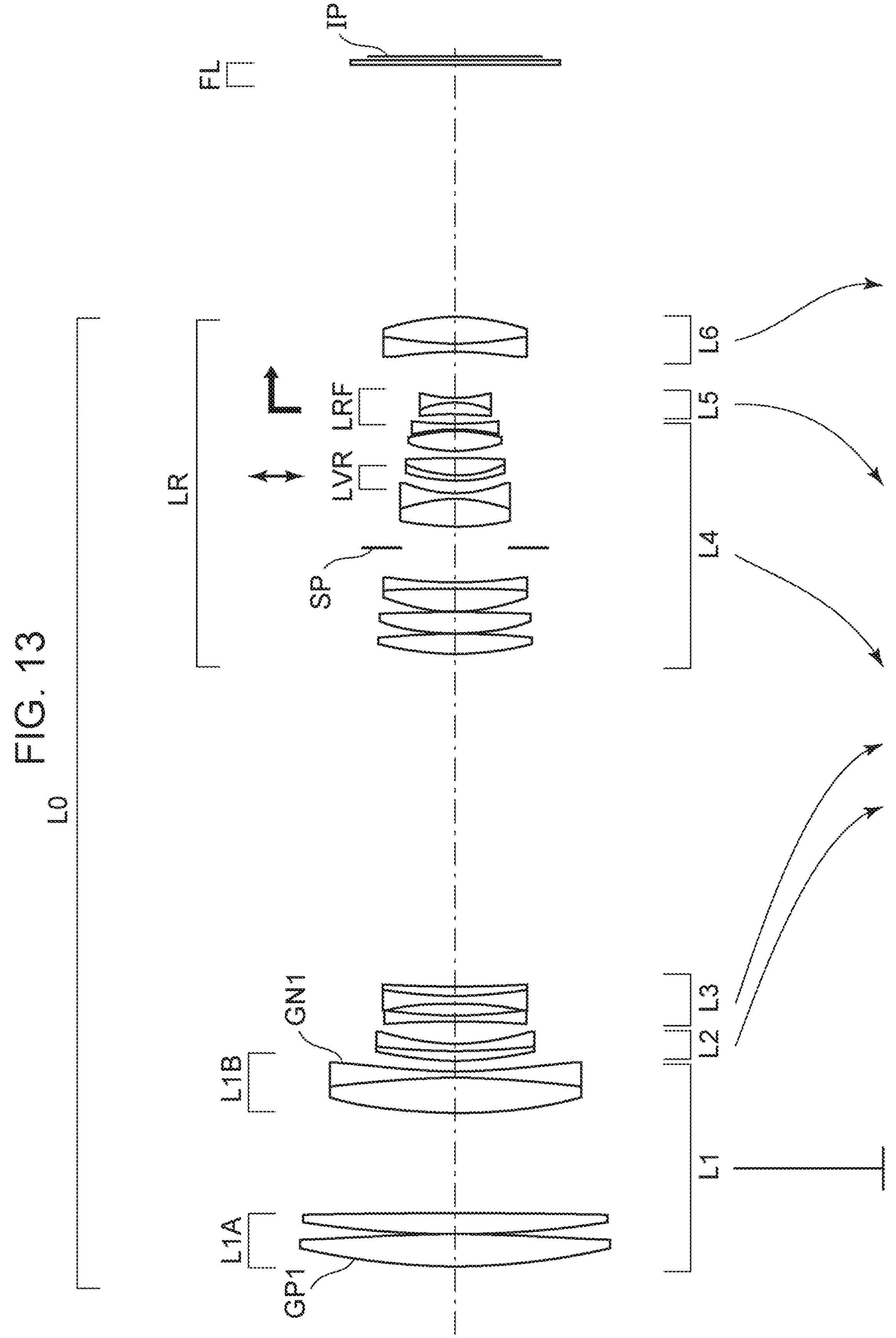
FIG. 13 is a cross-sectional view of lenses at the wide-angle end of a zoom lens according to a fifth embodiment.
Figure 14A:
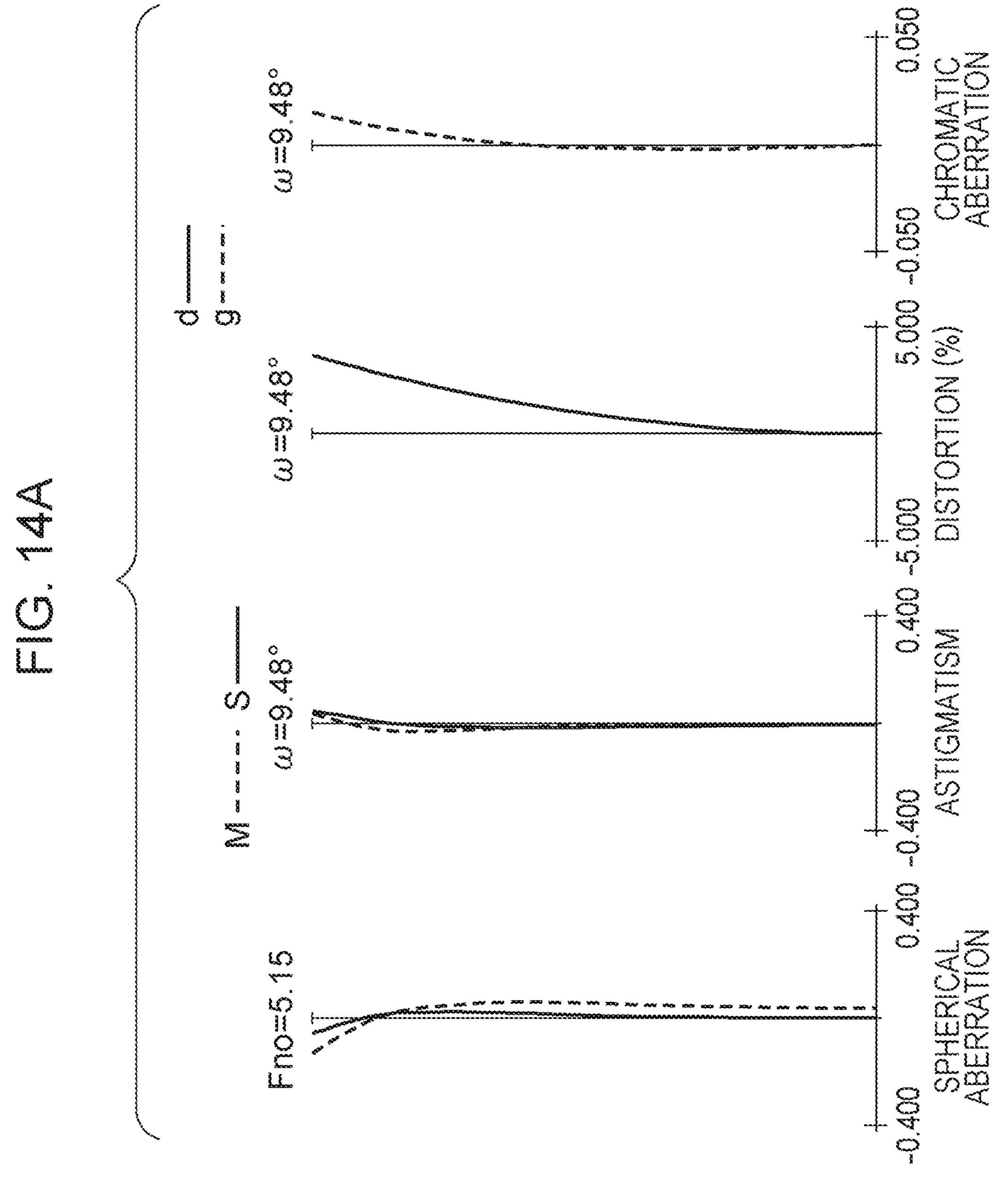
FIG. 14A is a set of aberration graphs obtained when focusing to infinity is performed at the wide-angle end of the zoom lens according to the fifth embodiment.
Figure 14B:
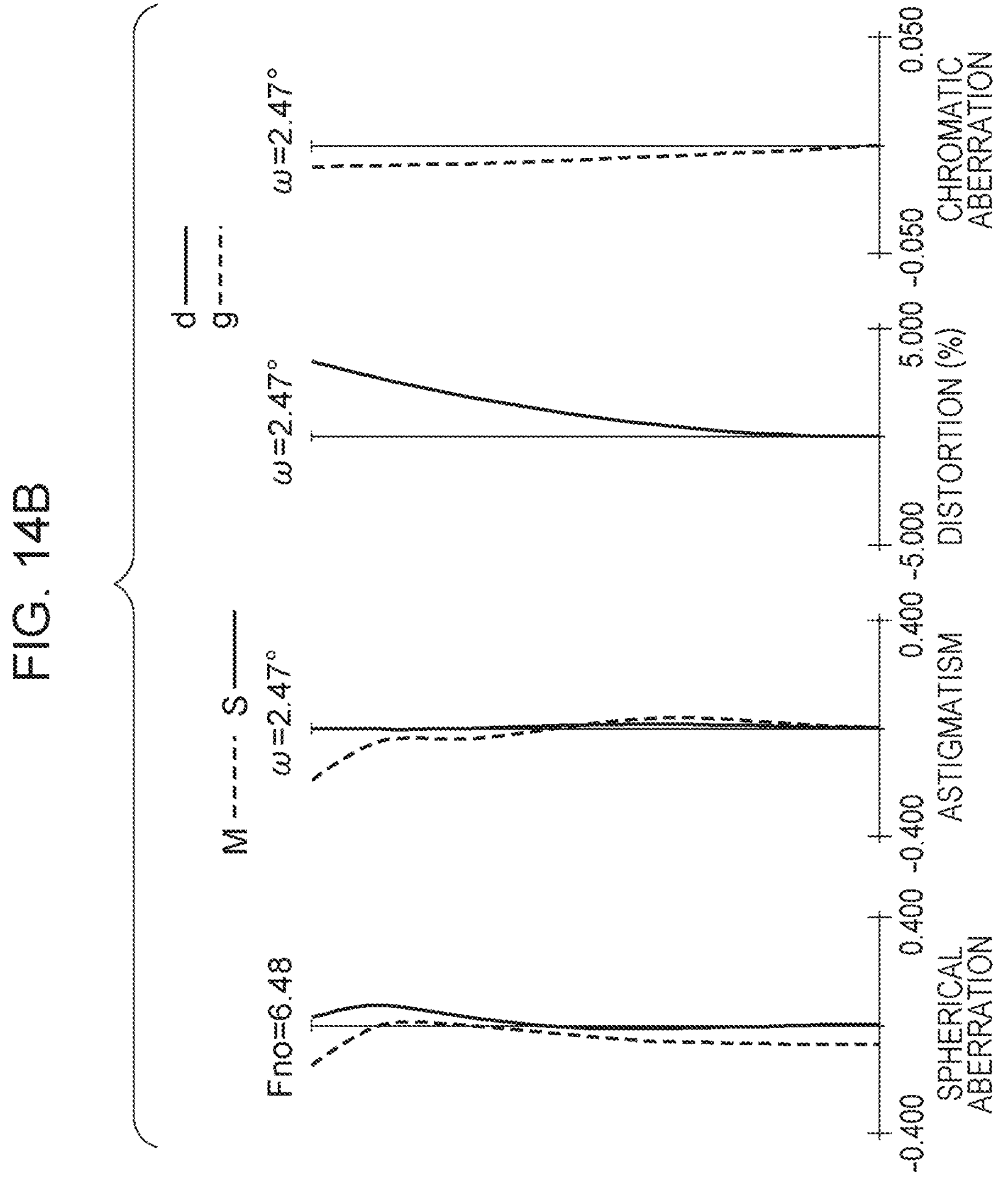
FIG. 14B is a set of aberration graphs obtained when focusing to infinity is performed at the telephoto end of the zoom lens according to the fifth embodiment.
Figure 15A:
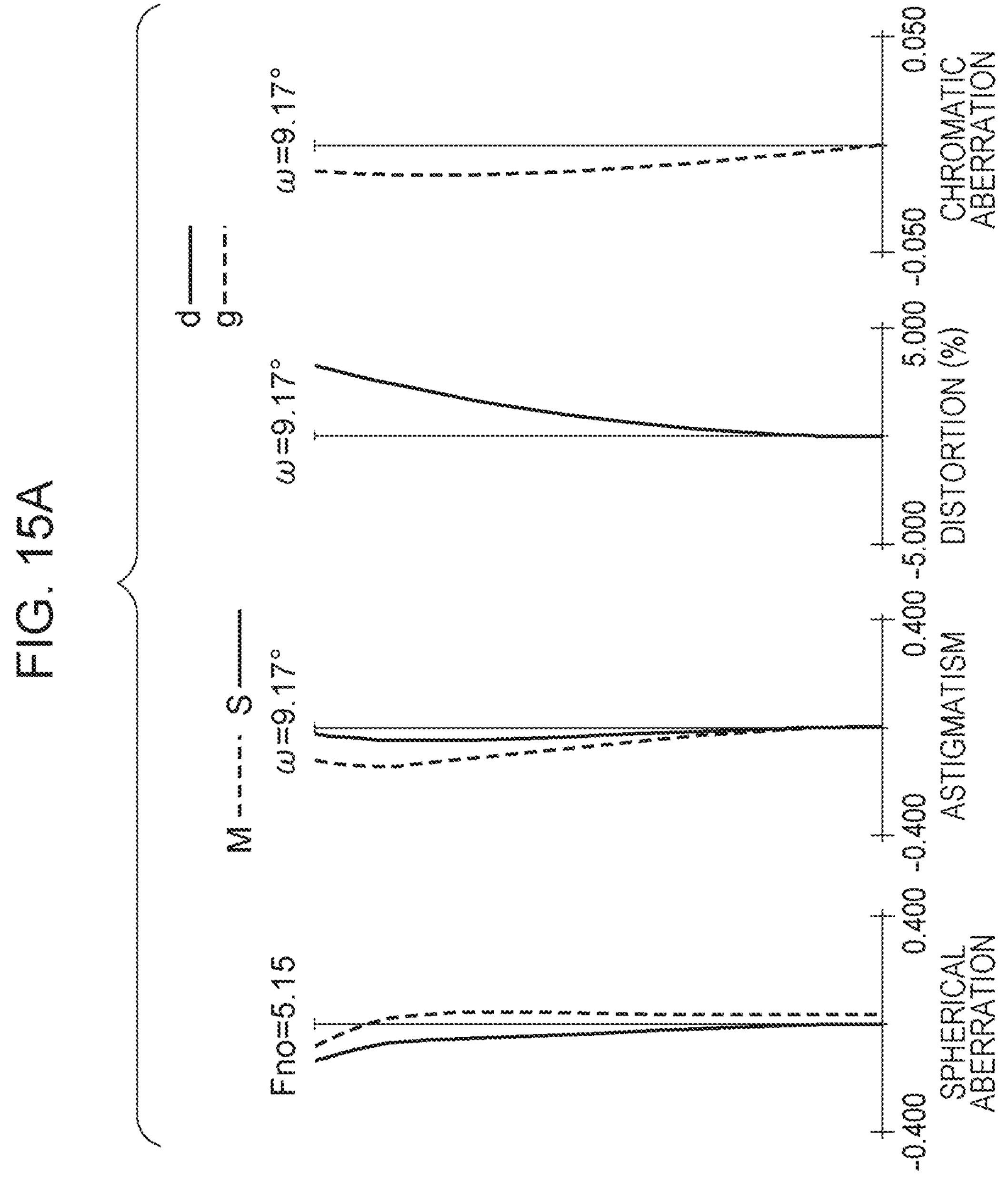
FIG. 15A is a set of aberration graphs obtained when focusing to close range is performed at the wide-angle end of the zoom lens according to the fifth embodiment.
Figure 15B:
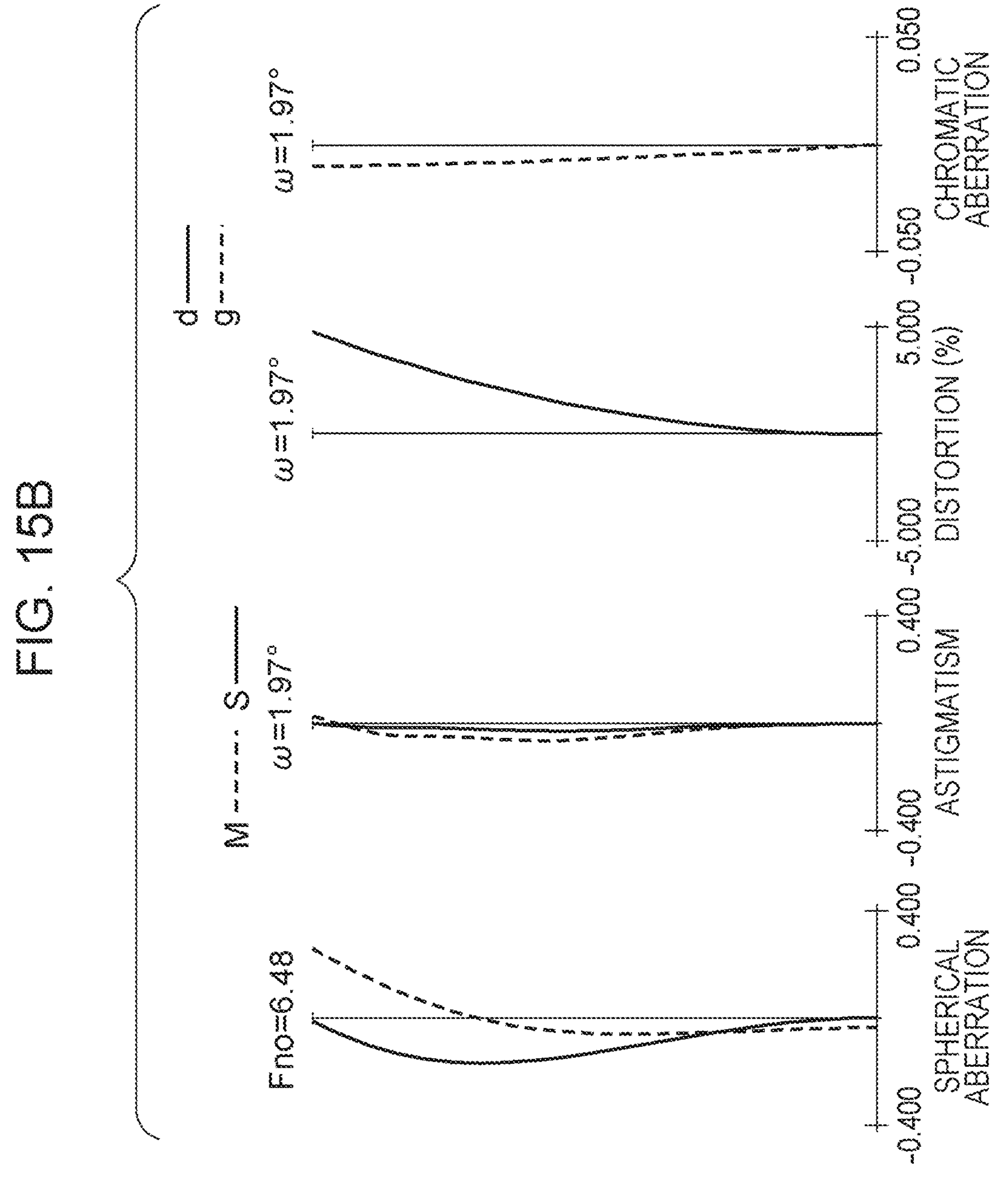
FIG. 15B is a set of aberration graphs obtained when focusing to close range is performed at the telephoto end of the zoom lens according to the fifth embodiment.
Figure 16:
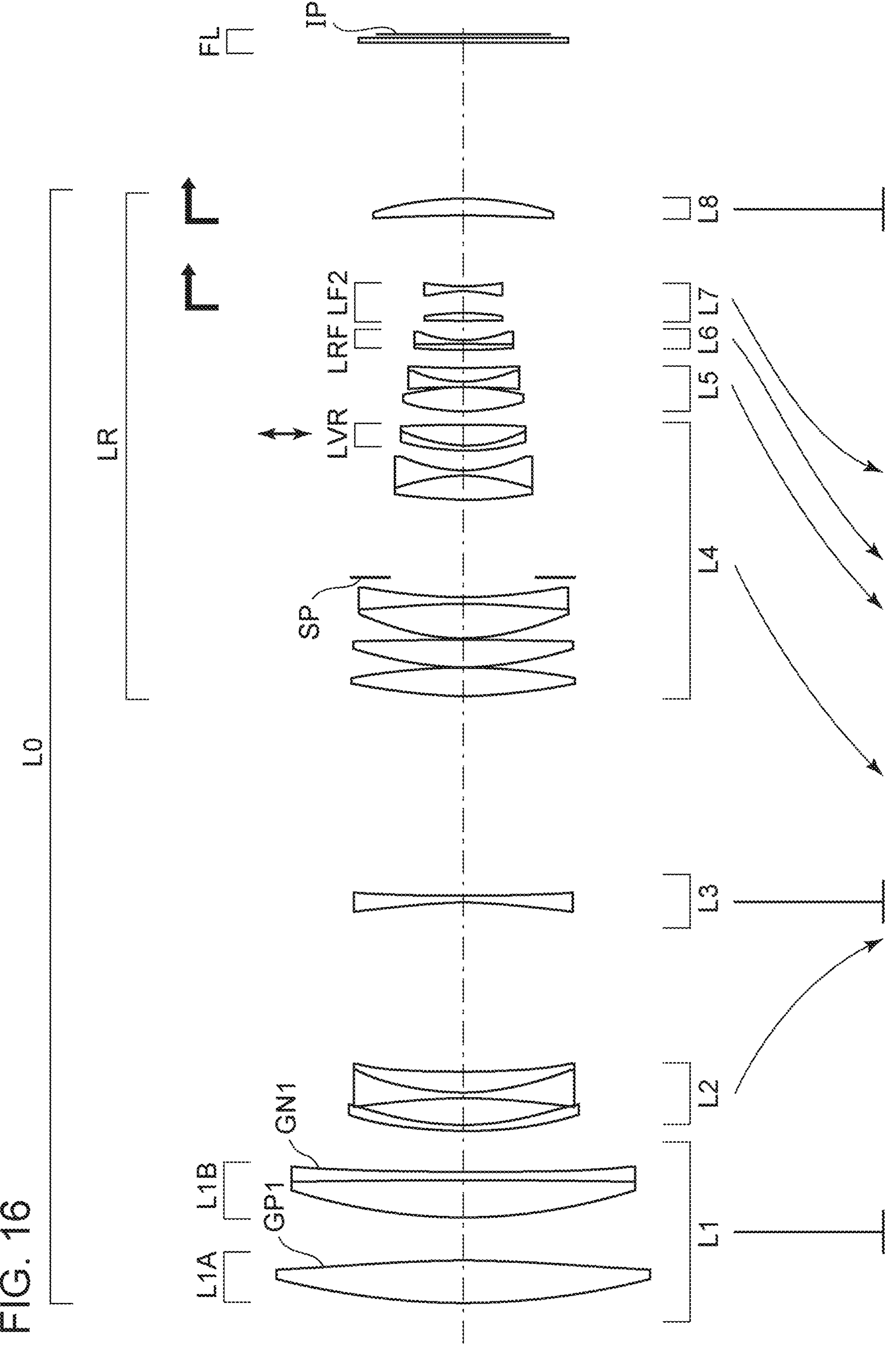
FIG. 16 is a cross-sectional view of lenses at the wide-angle end of a zoom lens according to a sixth embodiment.
Figure 17A:
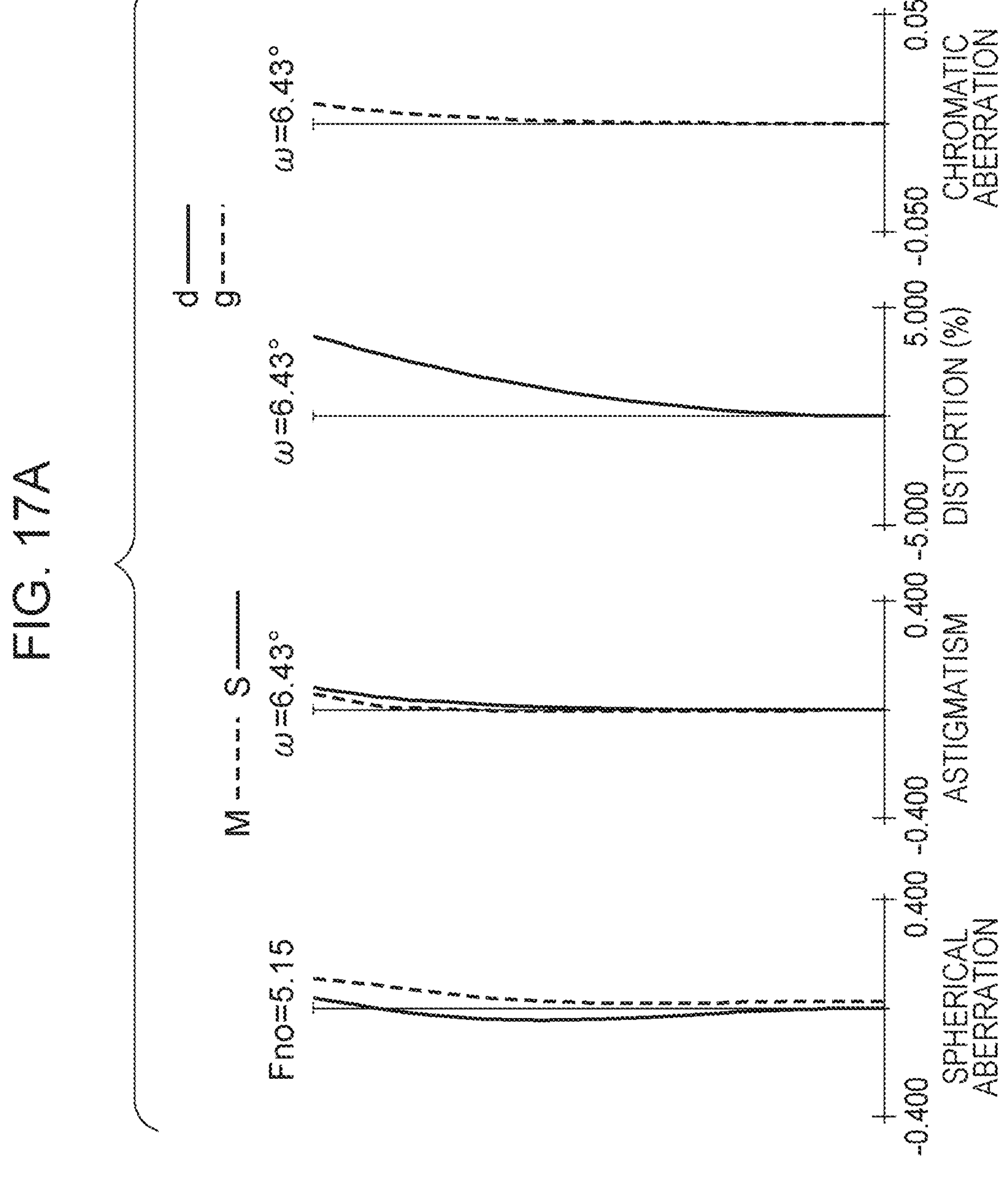
FIG. 17A is a set of aberration graphs obtained when focusing to infinity is performed at the wide-angle end of the zoom lens according to the sixth embodiment.
Figure 17B:
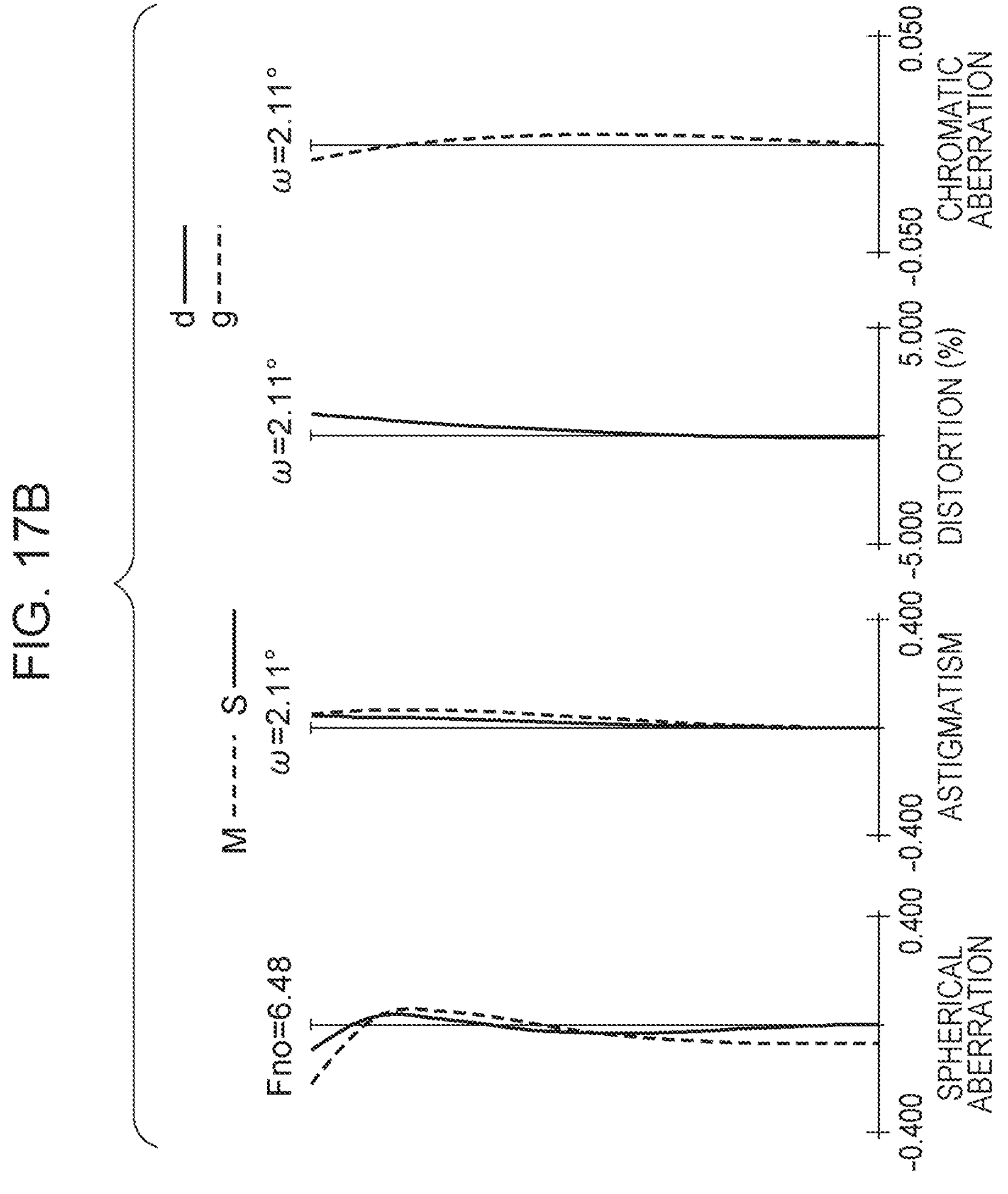
FIG. 17B is a set of aberration graphs obtained when focusing to infinity is performed at the telephoto end of the zoom lens according to the sixth embodiment.
Figure 18A:
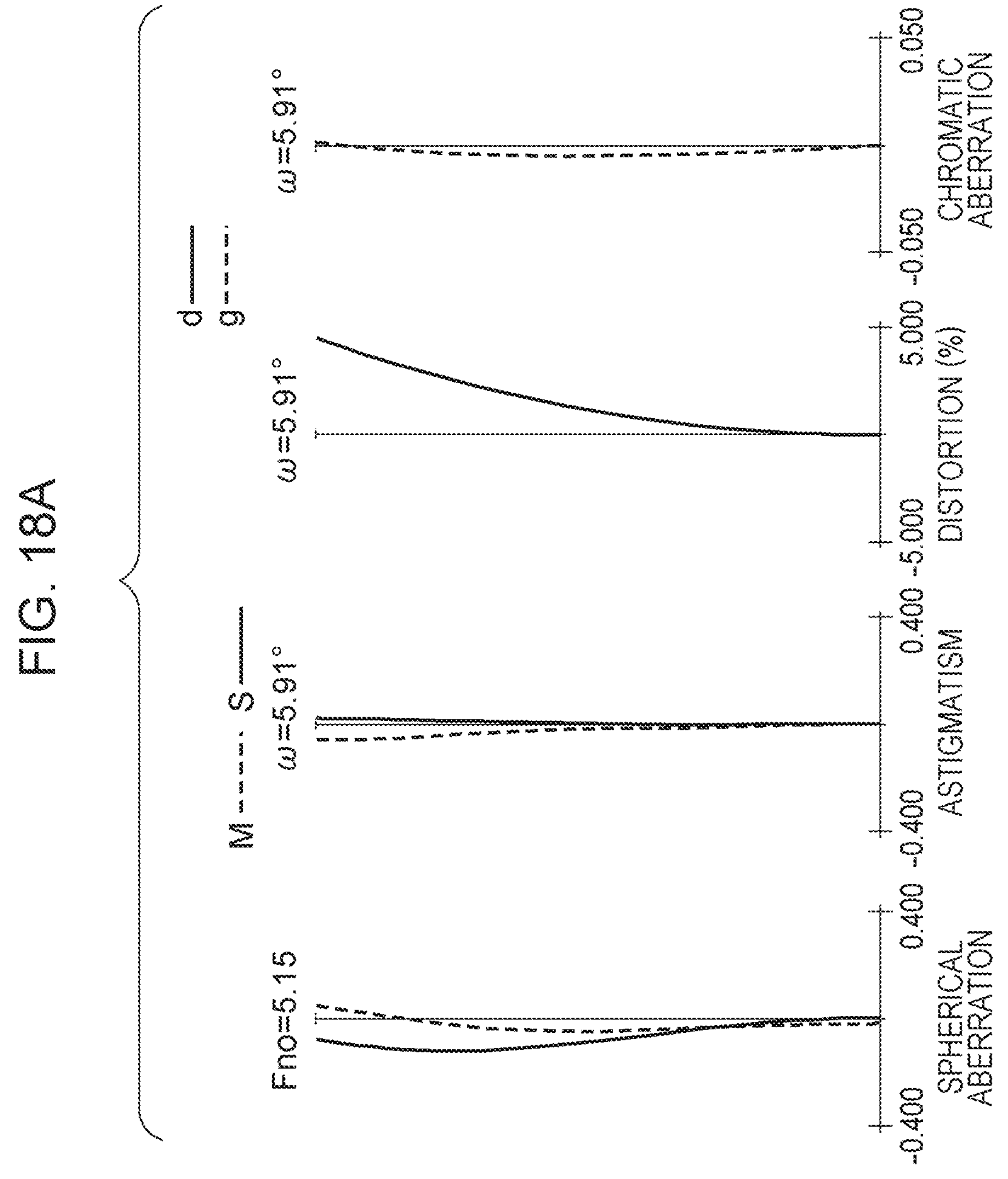
FIG. 18A is a set of aberration graphs obtained when focusing to close range is performed at the wide-angle end of the zoom lens according to the sixth embodiment.
Figure 18B:
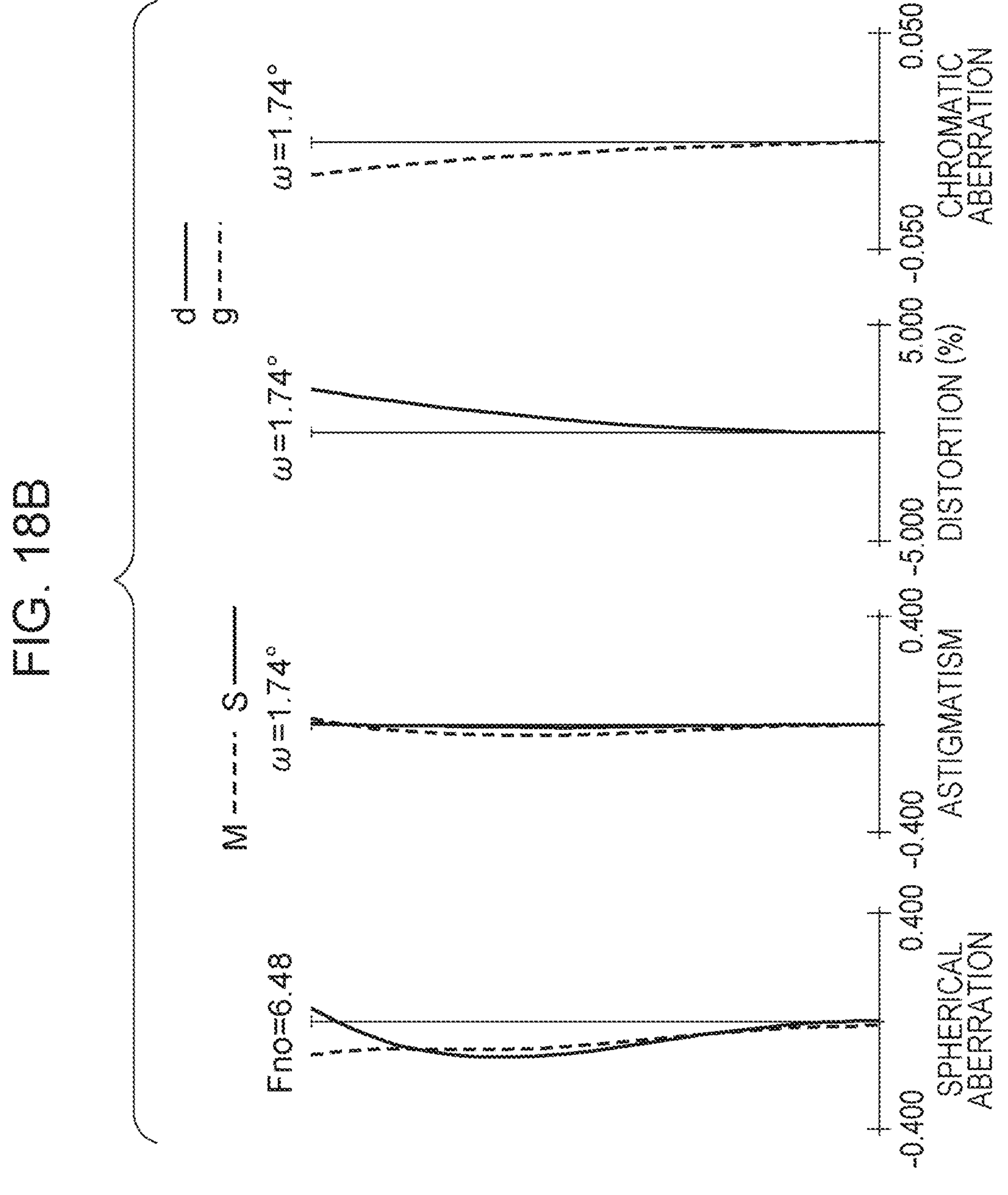
FIG. 18B is a set of aberration graphs obtained when focusing to close range is performed at the telephoto end of the zoom lens according to the sixth embodiment.
Figure 19:
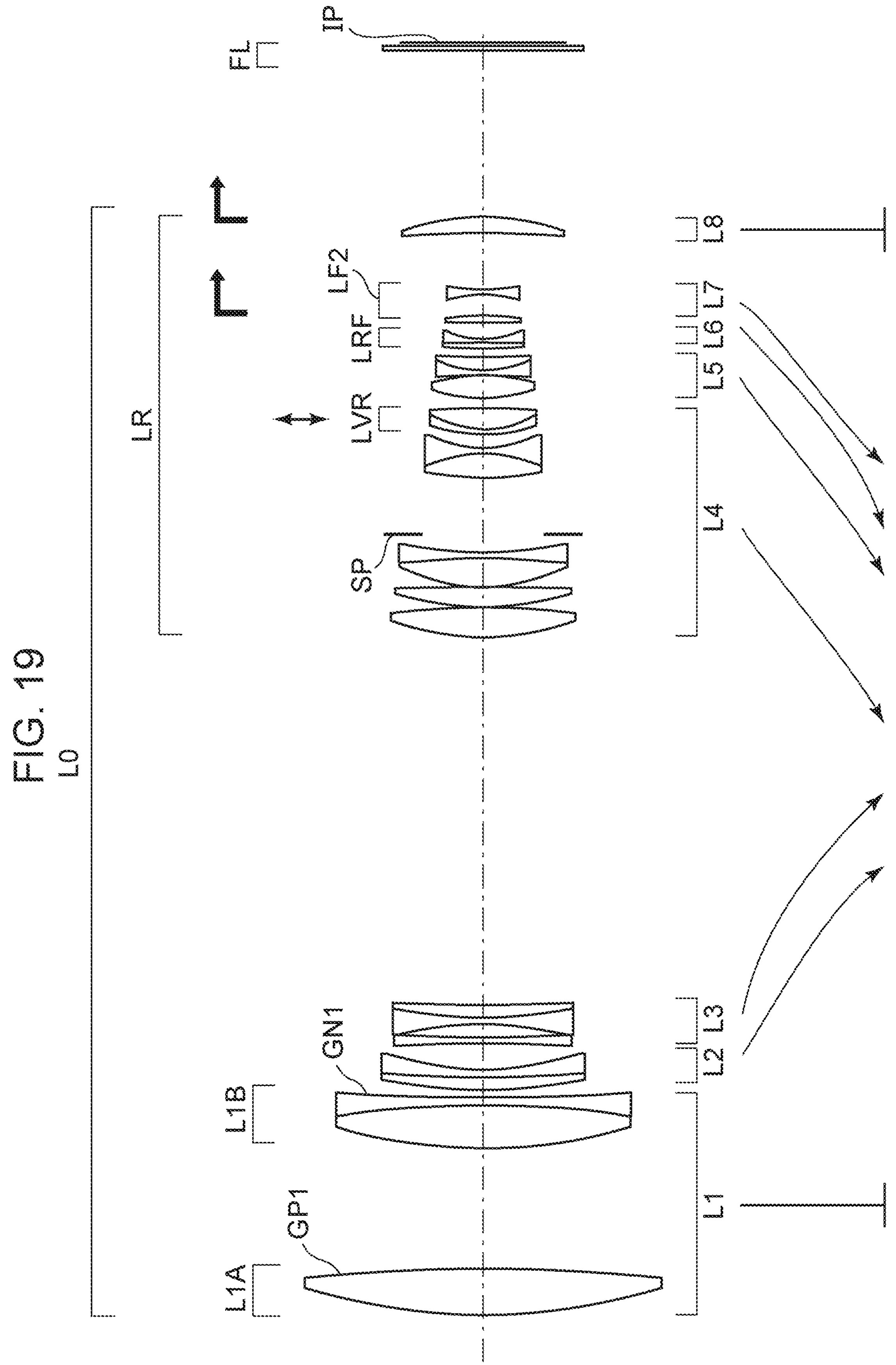
FIG. 19 is a cross-sectional view of lenses at the wide-angle end of a zoom lens according to a seventh embodiment.
Figure 20A:
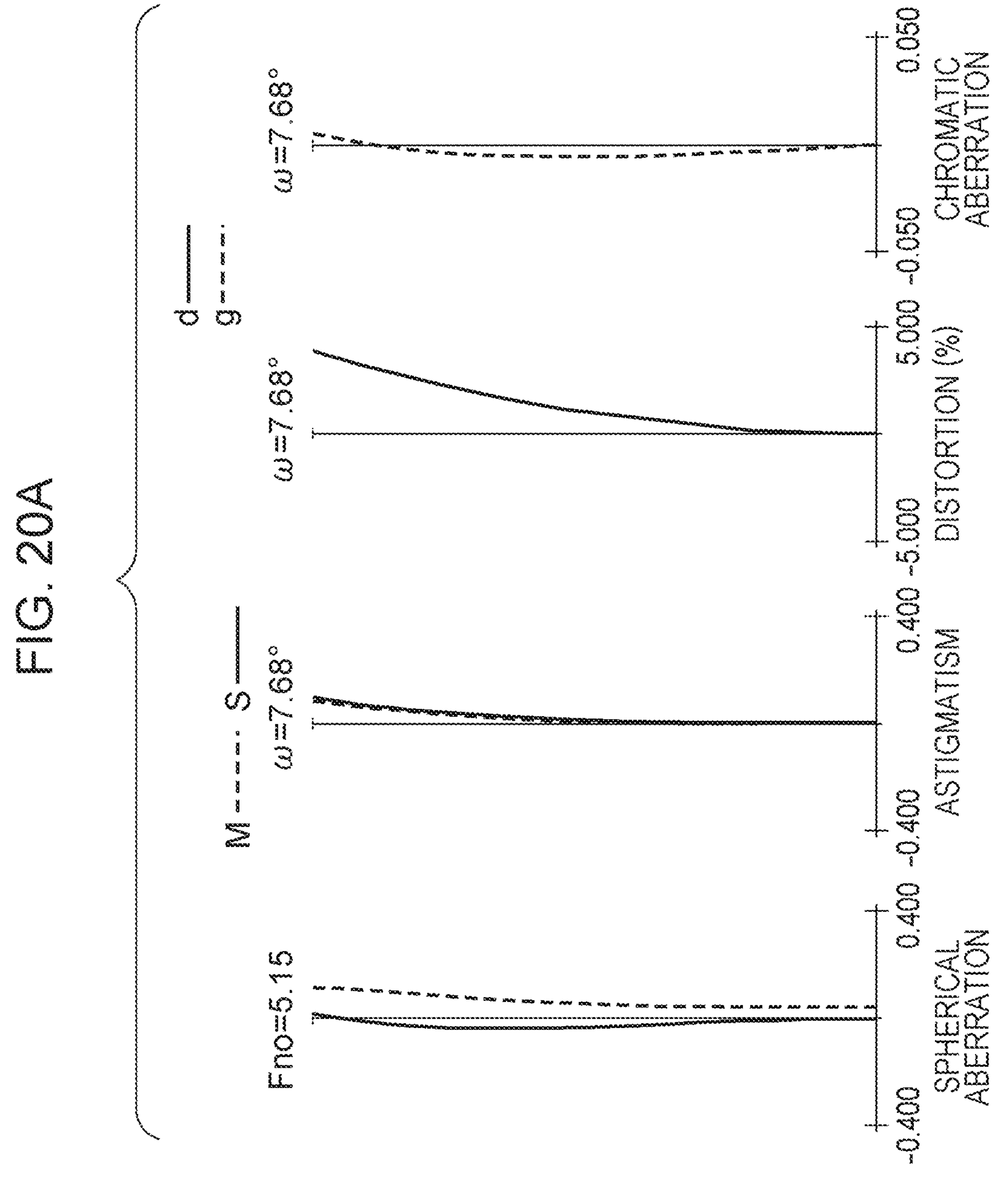
FIG. 20A is a set of aberration graphs obtained when focusing to infinity is performed at the wide-angle end of the zoom lens according to the seventh embodiment.
Figure 20B:
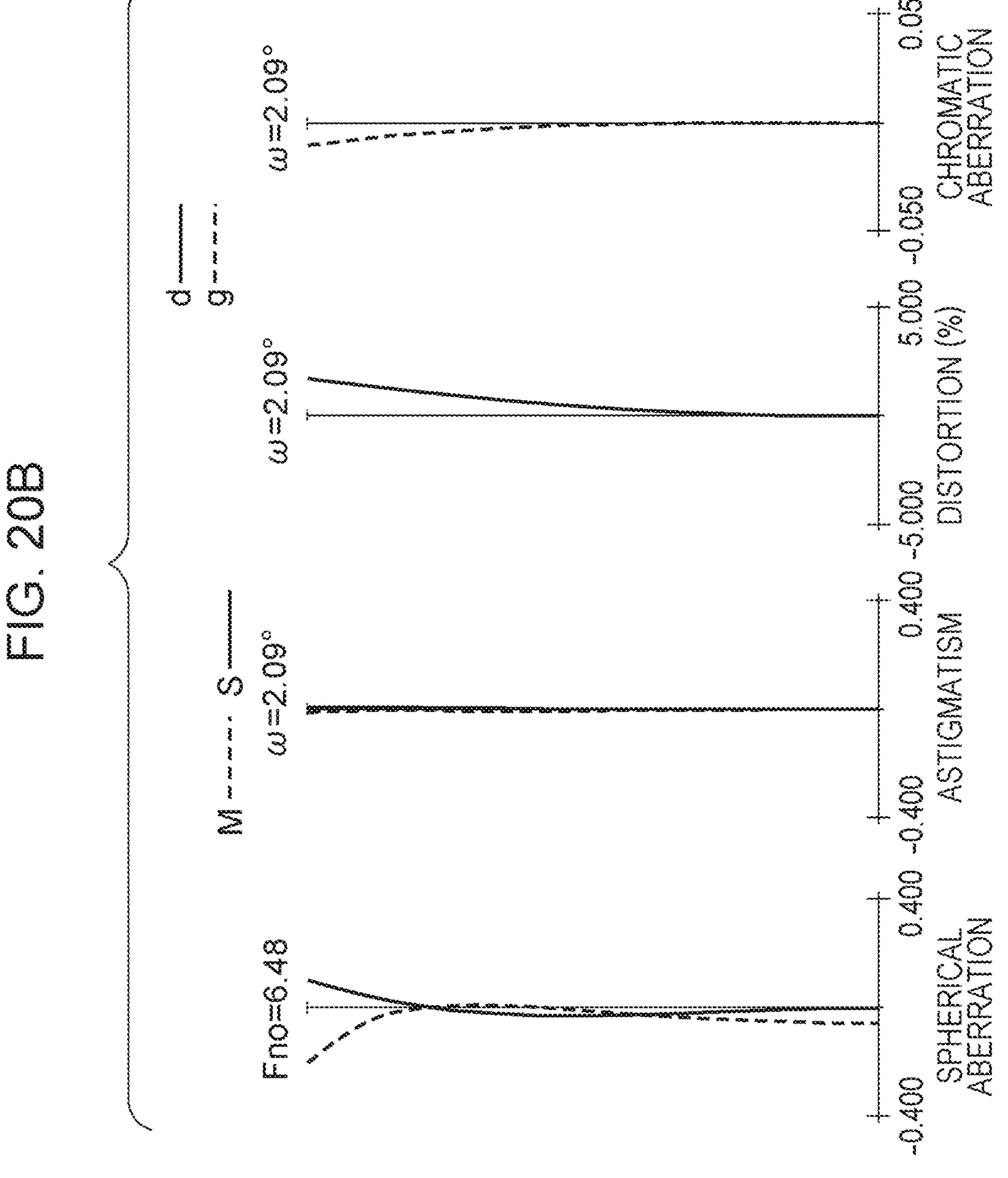
FIG. 20B is a set of aberration graphs obtained when focusing to infinity is performed at the telephoto end of the zoom lens according to the seventh embodiment.
Figure 21A:
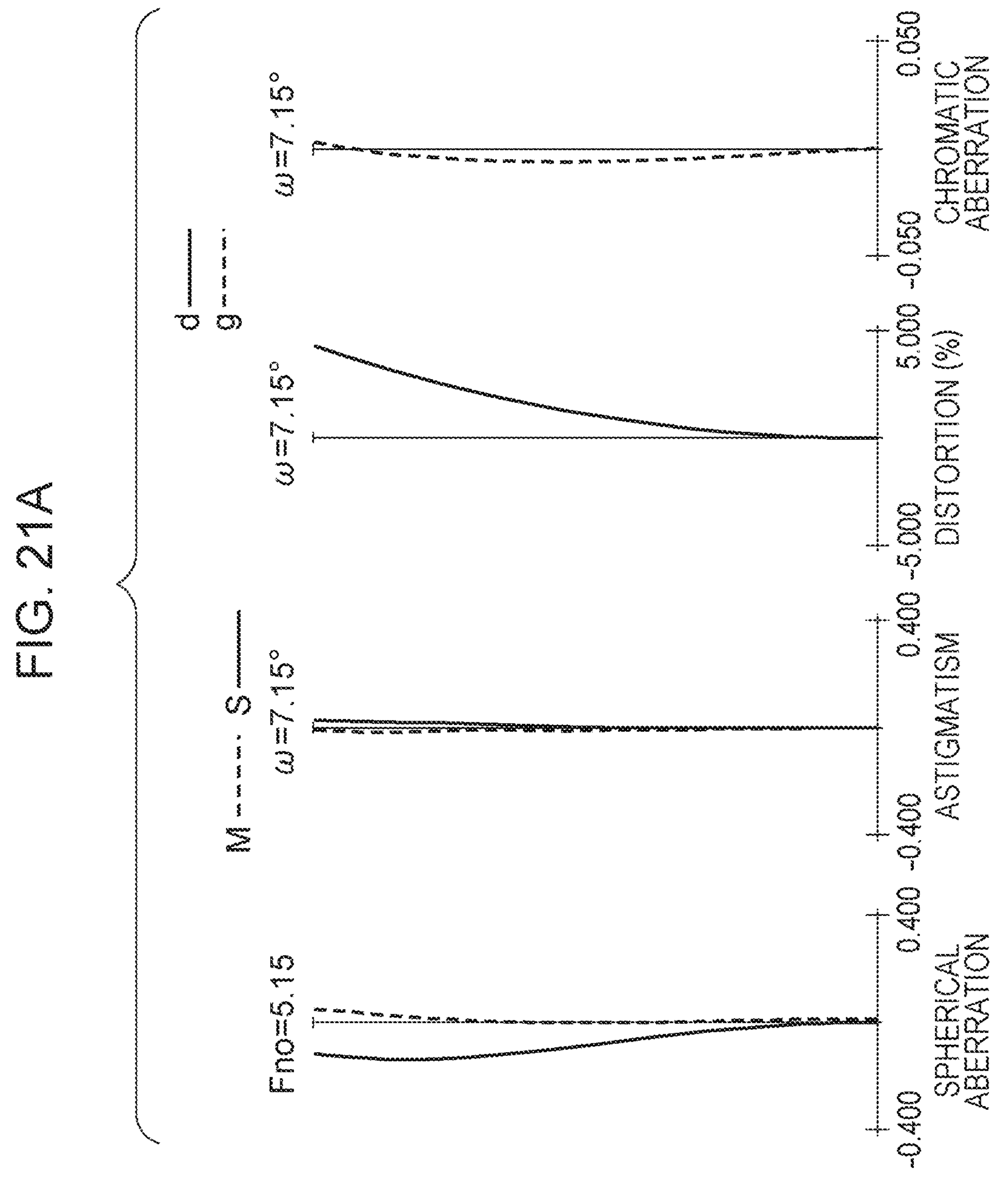
FIG. 21A is a set of aberration graphs obtained when focusing to close range is performed at the wide-angle end of the zoom lens according to the seventh embodiment.
Figure 21B:
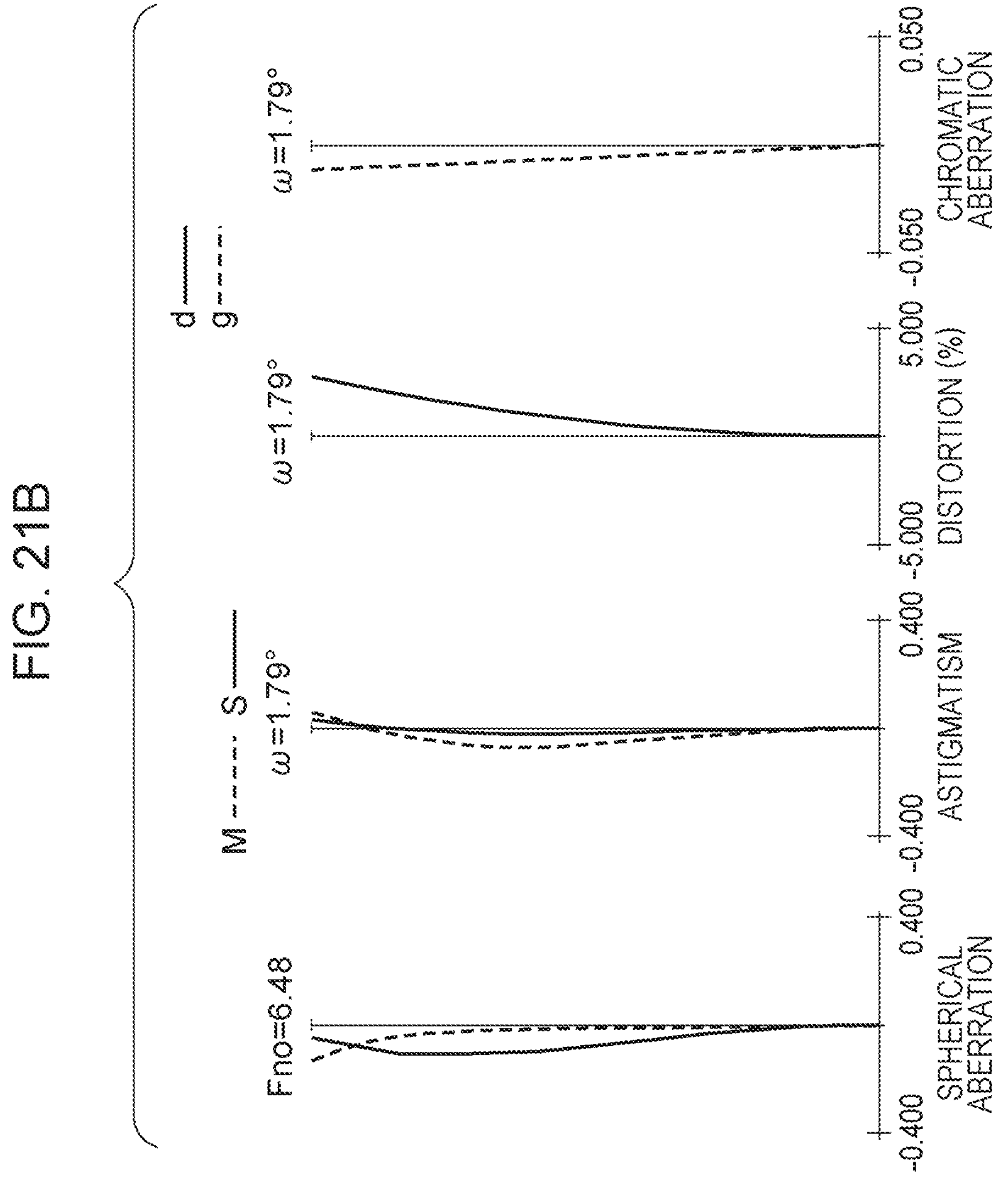
FIG. 21B is a set of aberration graphs obtained when focusing to close range is performed at the telephoto end of the zoom lens according to the seventh embodiment.
Figure 22:
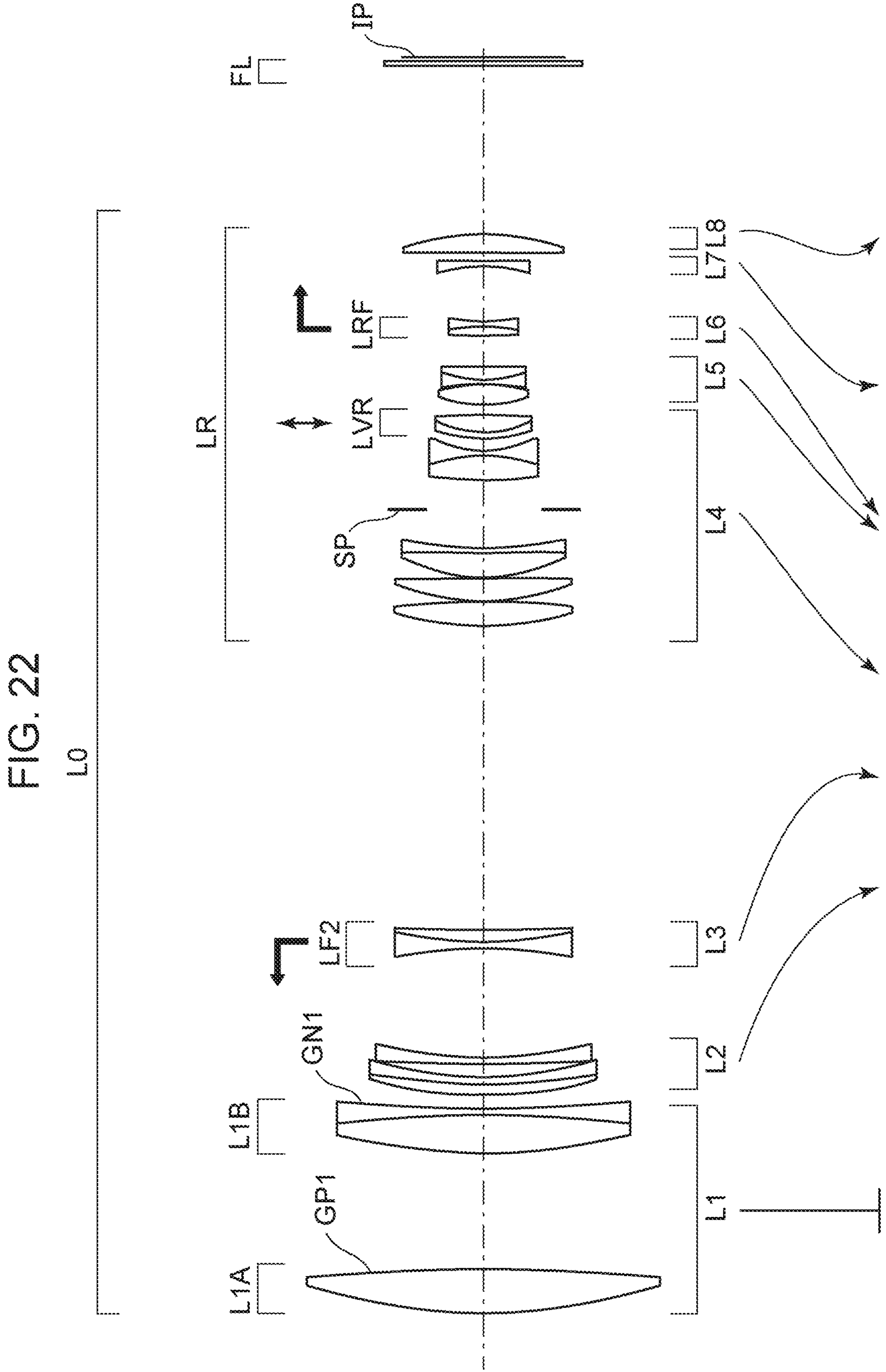
FIG. 22 is a cross-sectional view of lenses at the wide-angle end of a zoom lens according to an eighth embodiment.
Figure 23A:
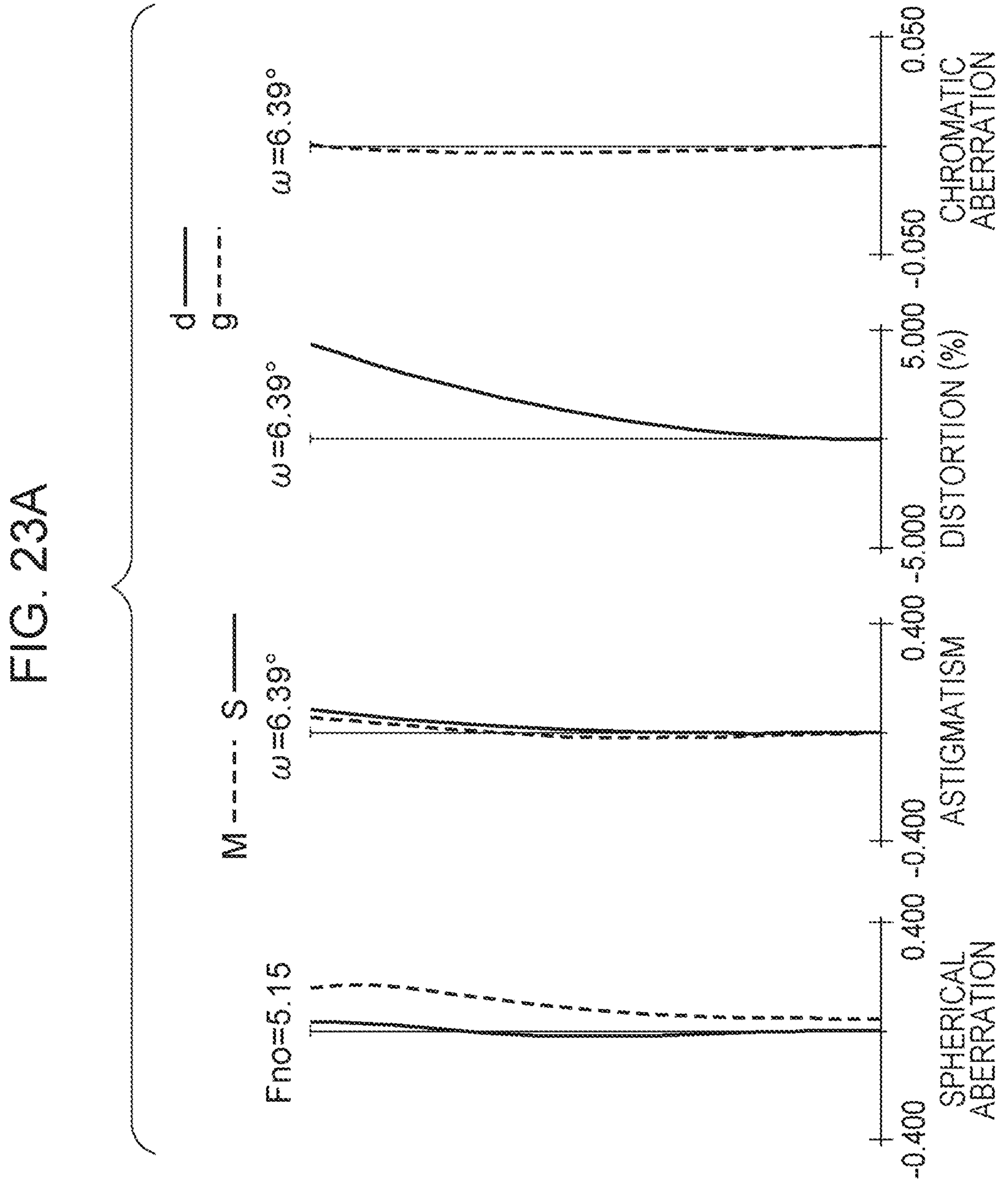
FIG. 23A is a set of aberration graphs obtained when focusing to infinity is performed at the wide-angle end of the zoom lens according to the eighth embodiment.
Figure 23B:
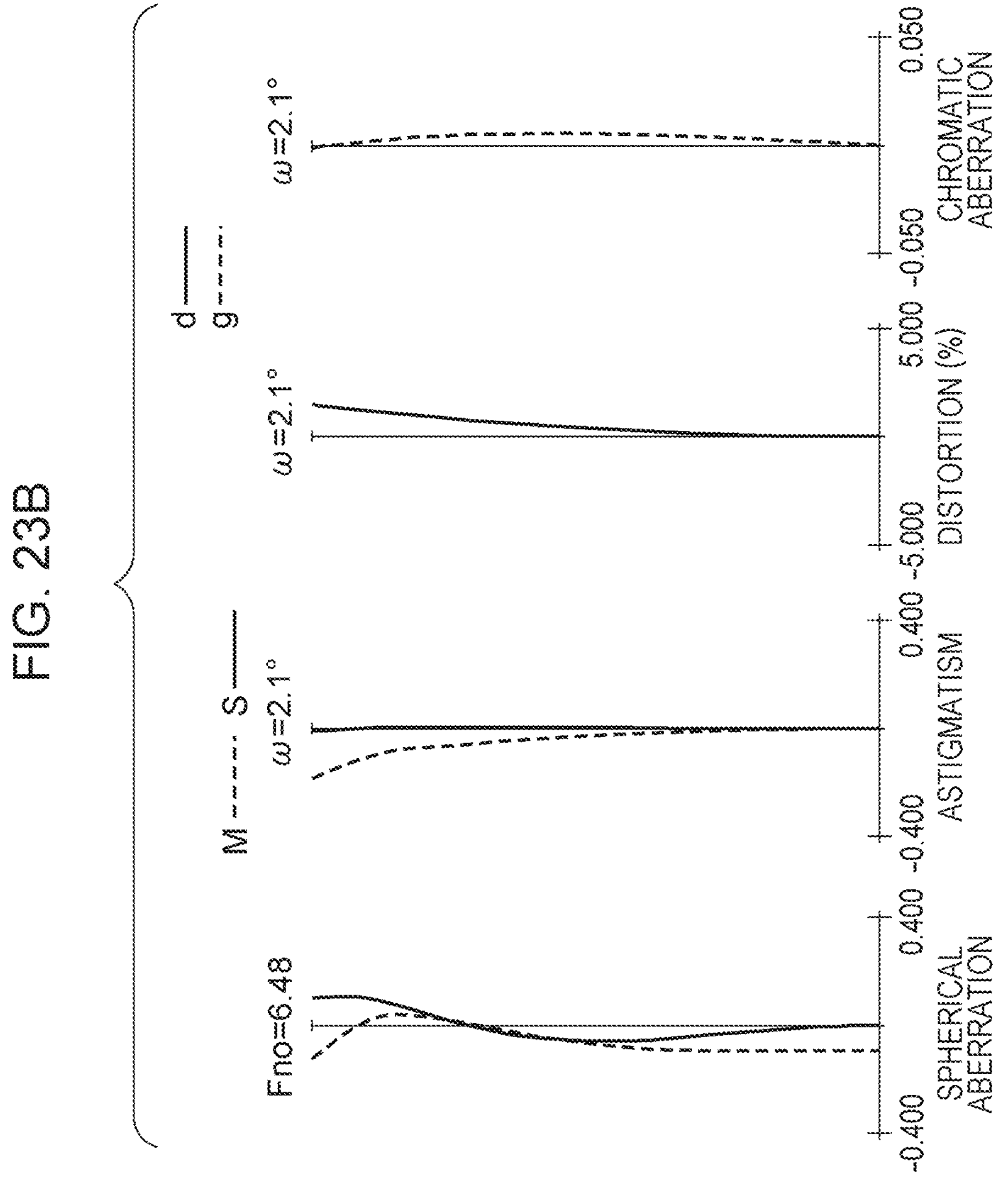
FIG. 23B is a set of aberration graphs obtained when focusing to infinity is performed at the telephoto end of the zoom lens according to the eighth embodiment.
Figure 24A:
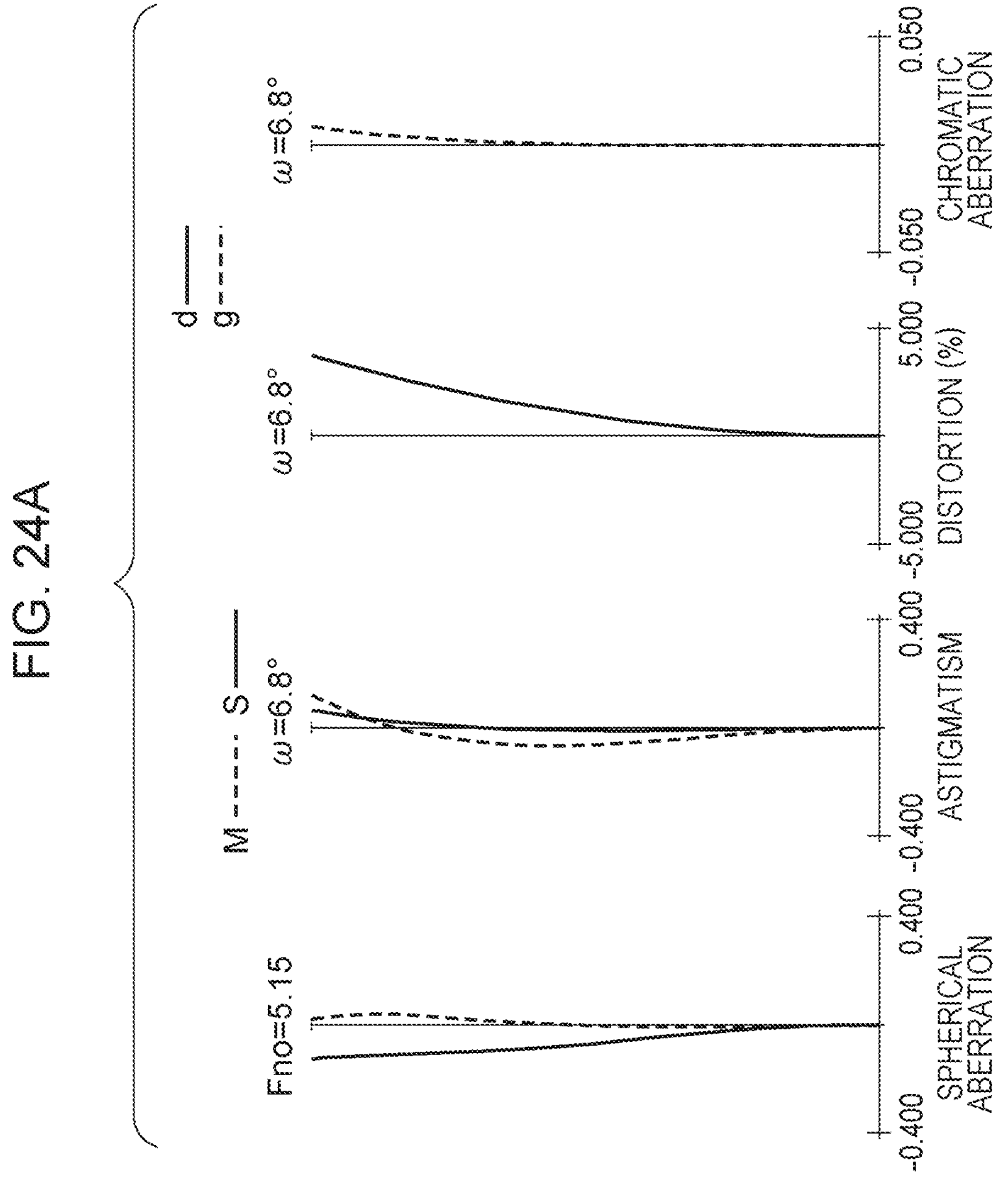
FIG. 24A is a set of aberration graphs obtained when focusing to close range is performed at the wide-angle end of the zoom lens according to the eighth embodiment.
Figure 24B:
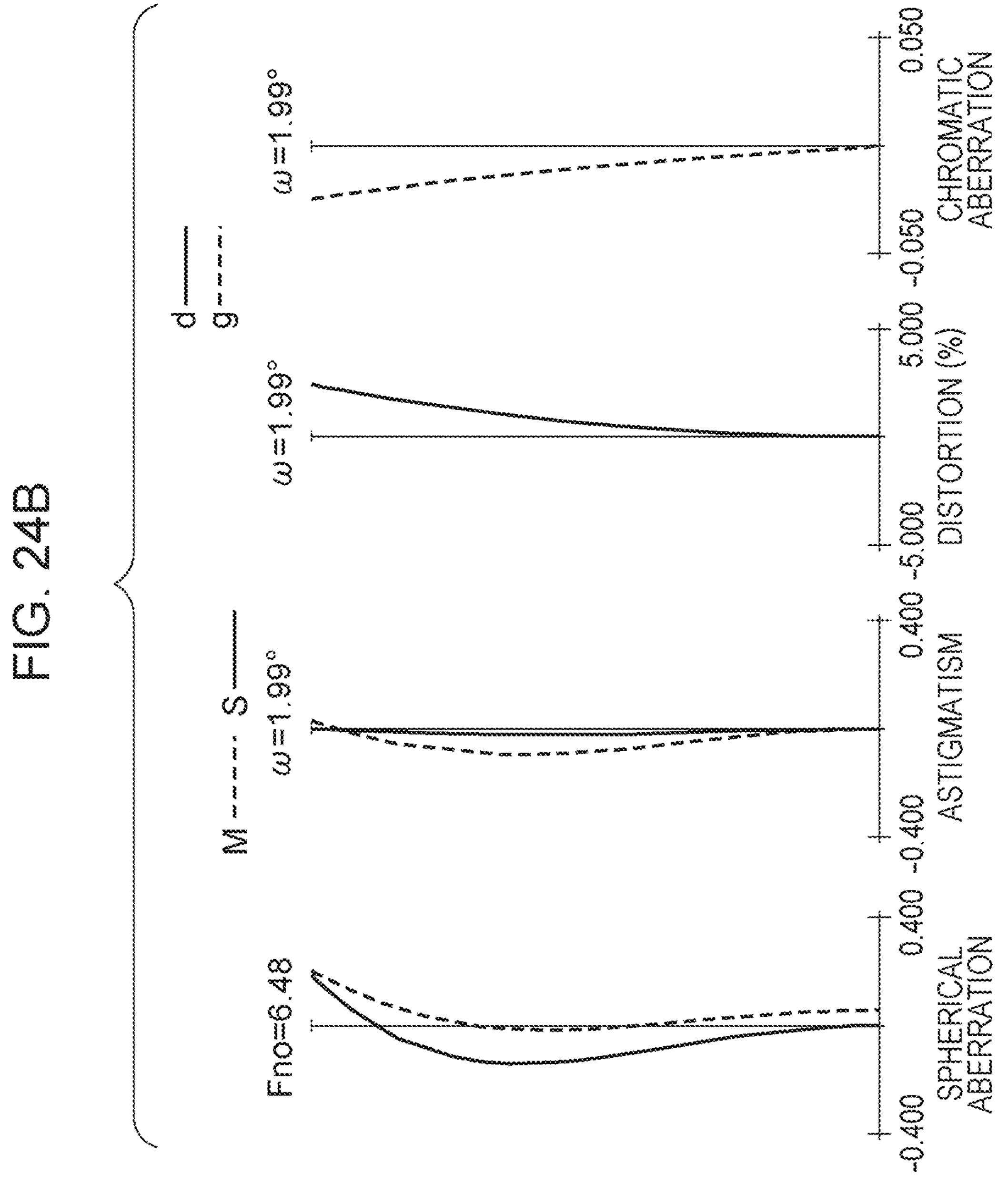
FIG. 24B is a set of aberration graphs obtained when focusing to close range is performed at the telephoto end of the zoom lens according to the eighth embodiment.

Embodiments of a zoom lens according to the present disclosure, and an imaging apparatus including the zoom lens, will now be described with reference to the accompanying drawings.

FIGS. 1, 4, 7, 10, 13, 16, 19, and 22 are cross-sectional views at the wide-angle end of a zoom lens L0 according to first to eighth embodiments, respectively. The zoom lens L0 according to each embodiment is used in an imaging apparatus such as a digital video camera, a digital still camera, a broadcasting camera, a silver-halide film camera, a surveillance camera, a vehicle-mounted camera, and the like.

In each cross-sectional view of the lens system, the left side is the object side, and the right side is the image side. The zoom lens L0 according to each embodiment may be used as a projection lens for a projector or the like. When it is used as the projection lens, the left side is the screen side, and the right side is the side where an image to be projected lies.

The zoom lens L0 according to each embodiment includes a first lens unit L1, a second lens unit L2, a third lens unit L3, and a rear lens group LR that are disposed in order from the object side to the image side. The first lens unit L1 has a positive refractive power. The third lens unit L3 has a negative refractive power. The rear lens group LR includes one or more lens units. During zooming, the interval between lens units disposed adjacent to each other changes. Each lens unit may be comprised of a single lens or a plurality of lenses. The lens unit may include an aperture diaphragm.

Solid-line arrows that are headed downward in each cross-sectional view of the lens system indicate the trajectories of movement of the lens units respectively when zooming from the wide-angle end to the telephoto end is performed. Solid-line arrows that are illustrated at an upper portion of each cross-sectional view of the lens system indicate the moving direction of lens units that move when focusing from infinity to close range is performed and the moving direction of a lens unit that moves when image blur correction is performed.

In each cross-sectional view of the lens system, reference sign SP denotes an aperture diaphragm. Reference sign IP denotes an image plane. When the zoom lens L0 according to each embodiment is used for a digital still camera or a digital video camera, the image pickup plane of a solid-state image pickup device (photoelectric conversion element) such as a CCD sensor or a CMOS sensor is disposed at the image plane IP. When the zoom lens L0 according to each embodiment is used as the imaging optical system of a silver-halide film camera, a photosensitive surface corresponding to a film surface is disposed at the image plane IP.

Reference sign FL denotes an optical block corresponding to an optical filter, a face plate, a crystal low-pass filter, an infrared cut-off filter, or the like.

FIGS. 2, 5, 8, 11, 14, 17, 20, and 23 are aberration graphs obtained when focusing to infinity is performed at the wide-angle end and the telephoto end of the zoom lens according to the first to eighth embodiments, respectively.

FIGS. 3, 6, 9, 12, 15, 18, 21, and 24 are aberration graphs obtained when focusing to close range is performed at the wide-angle end and the telephoto end of the zoom lens according to the first to eighth embodiments, respectively.

In each spherical aberration graph, reference sign Fno denotes F-number, the solid line indicates an amount of spherical aberration for the d line (wavelength of 587.6 nm), and the broken line indicates an amount of spherical aberration for the g line (wavelength of 435.8 nm). In each astigmatism graph, the solid line indicates an amount of aberration at the sagittal image plane, and the broken line indicates an amount of aberration at the meridional image plane. Each distortion aberration graph illustrates an amount of distortion aberration for the d line. Each chromatic aberration graph illustrates an amount of chromatic aberration of magnification for the g line, where reference sign ω denotes an imaging half angle of view (°).

Next, the characteristic configuration of the zoom lens according to each embodiment will now be described.

In the zoom lens L0 according to each embodiment, the refractive power of the first lens unit L1 is configured to be positive so as to make it easier to dispose the principal point on the object side and thus to shorten the overall lens length. The overall lens length is a value obtained by adding a back focus to a distance on the optical axis from, of the zoom lens L0, the surface located closest to the object to the surface thereof located closest to the image. The term "back focus" mentioned here means a value obtained through air conversion of a distance on the optical axis from, of the zoom lens L0, the surface located closest to the image to the image plane.

Various off-axis aberrations especially at the wide-angle end are corrected by disposing the second lens unit L2. A chromatic aberration of magnification especially at the wide-angle end is corrected by configuring the refractive power of the third lens unit L3 to be negative. Furthermore, variations in various kinds of aberration occurring at the time of zooming are suppressed by disposing the rear lens group LR that includes one or more lens units.

Moreover, the decentering of the first lens unit L1 occurring at the time of zooming due to a manufacturing error or the like is suppressed by configuring the first lens unit L1 to be stationary when zooming from the wide-angle end to the telephoto end is performed, thereby reducing variations in various kinds of aberration caused by the decentering.

The rear lens group LR has a positive refractive power at the wide-angle end. That is, the synthesized focal length of all of the lens units disposed in the rear lens group LR is positive. Since the rear lens group LR has a positive refractive power at the wide-angle end, a spherical aberration and the like especially at the wide-angle end is corrected.

The first lens unit L1 includes a first positive lens GP1 disposed closest to the object and having a positive refractive power. This configuration converges an on-axis beam of light passing through the first positive lens GP1 and thus makes it possible to make the diameter of each lens disposed closer to the image than the first positive lens GP1 smaller.

The zoom lens L0 according to each embodiment is configured to satisfy the following inequalities:

$$0.05 < f1/|f2| < 2.00 \quad (1)$$

$$0.40 < Lt/ft < 0.65 \quad (2)$$

In the above expressions, reference sign f1 denotes the focal length of the first lens unit L1, and reference sign f2 denotes the focal length of the second lens unit L2. Reference sign Lt denotes the overall lens length at the telephoto end. Reference sign ft denotes the focal length of the entire system at the telephoto end.

The inequalities (1) and (2) are designed to be satisfied for the purposes of correcting various kinds of aberration well, achieving a long focal length, and reducing size and weight.

If the value is greater than the upper limit of the inequality (1), the refractive power of the first lens unit L1 is excessively weak, and the principal point of the entire system is disposed on the image side. This results in increasing the overall lens length, which is not desirable. If the value is less than the lower limit of the inequality (1), the refractive power of the first lens unit L1 is excessively strong, which makes it difficult to correct a spherical aberration and an on-axis chromatic aberration especially at the telephoto end.

If the value is greater than the upper limit of the inequality (2), the overall lens length at the telephoto end is long, which is not desirable.

If the value is less than the lower limit of the inequality (2), the overall lens length at the telephoto end is short; in this case, the refractive power of each lens unit is excessively strong, which makes it difficult to correct various kinds of aberration.

With the above configuration, it is possible to realize a zoom lens that offers high optical performance, has a long focal length, and is compact and light in weight.

At least one of the upper limit or the lower limit of the numerical range of either the inequality (1) or the inequality (2) may be replaced by the numerical value(s) in the following inequality (1a), (2a):

$$0.10 < f1/|f2| < 1.95 \quad (1a)$$

$$0.44 < Lt/ft < 0.63 \quad (2a)$$

In one embodiment, at least one of the upper limit or the lower limit of the numerical range of either the inequality (1) or the inequality (2) may be replaced by the numerical value(s) in the following inequality (1b), (2b):

$$0.15 < f1/|f2| < 1.90 \quad (1b)$$

$$0.47 < Lt/ft < 0.62 \quad (2b)$$

Next, some non-limiting examples of the configuration of the zoom lens L0 according to each embodiment will now be described.

The rear lens group LR may include a first focus lens unit LRF that moves when focusing from infinity to close range is performed. Since the diameter of each lens disposed in the rear lens group LR is relatively small, the movement of the first focus lens unit LRF at the time of focusing makes it possible to reduce the weight of the lens units that move at the time of focusing.

Furthermore, the first focus lens unit LRF may have a negative refractive power and may move toward the image when focusing from infinity to close range is performed. This makes it possible to increase the position sensitivity of the first focus lens unit LRF, that is, increase the absolute value of an amount of movement of an image-plane position in relation to an amount of movement of the first focus lens unit LRF. Consequently, it is possible to reduce the amount of movement of the first focus lens unit LRF at the time of focusing and make the diameter of the first focus lens unit LRF smaller.

The rear lens group LR may further include a second focus lens unit LF2, and the first focus lens unit LRF and the second focus lens unit LF2 may move while drawing trajectories different from each other when focusing from infinity to close range is performed. The movement with different trajectories makes it easier to suppress variations in various kinds of aberration occurring at the time of focusing.

The first lens unit L1 may be comprised of four lenses or less. Since the diameter of each lens disposed in the first lens unit L1 is relatively large, a reduction in weight is achieved by adopting this configuration of four lenses or less.

The first lens unit L1 includes a first partial unit L1A and a second partial unit L1B. The second partial unit L1B is disposed adjacent to, and on the image side with respect to, the first partial unit L1A. Furthermore, among air gaps on the optical axis of lenses disposed adjacent to one another in the first lens unit L1, the air gap on the optical axis between the first partial unit L1A and the second partial unit L1B may be the greatest, and the first partial unit L1A may be comprised of two lenses or less. Since the diameter of a lens disposed relatively on the object side in the first lens unit L1 is relatively large, adopting a configuration of two lenses or less for the first partial unit L1A makes it possible to reduce weight.

The zoom lens L0 according to each embodiment may satisfy one or more of the following inequalities:

$$0.02 < d1AB/f1A < 0.35 \quad (3)$$

$$1.1 < \beta LRF1 < 4.0 \quad (4)$$

$$-10.0 < (1-\beta LRF1\times\beta LRF1)\times\beta R1\times\beta R1 < -3.0 \quad (5)$$

$$0.09 < sk/Lt < 0.3 \quad (6)$$

$$1.2 < f1/fLP < 6.0 \quad (7)$$

$$-5.0 < f1/f3 < -0.5 \quad (8)$$

$$0.0 < (r2+r1)/(r2-r1) < 1.5 \quad (9)$$

$$0.1 < f1/ft < 0.8 \quad (10)$$

$$-3.5 < (r2LRF+r1LRF)/(r2LRF-r1LRF) < -0.2 \quad (11)$$

$$-0.01 < \theta gF\_N-(-0.0016178\times \nu d\_N+0.64146) < 0.01 \quad (12)$$

$$-0.012 < \theta gF\_PR-(-0.0016178\times \nu d\_PR+0.64146) < 0.005 \quad (13)$$

$$0.4 < fLF1/fLF2 < 3.0 \quad (14)$$

$$0.2 < MLF1/MLF2 < 5.0 \quad (15)$$

$$0.01 < T\times|(1-\beta LRF2\times\beta LRF2)\times\beta R2\times\beta R2|/f < 0.50 \quad (16)$$

$$50 < \nu d\_RF1N < 100 \quad (17)$$

$$-1000.0 < |f2|/f3 < -0.3 \quad (18)$$

$$-1.00 < fLRF/f1 < -0.05 \quad (19)$$

In the above expressions, reference sign d1AB denotes a distance on the optical axis between, of the first partial unit L1A, the surface located closest to the image and, of the second partial unit L1B, the surface located closest to the object. Reference sign f1A denotes the focal length of the first partial unit L1A.

Reference sign βLRF1 denotes the lateral magnification of the first focus lens unit LRF when focusing to an object distance where the lateral magnification of the entire system is −0.2 is performed at the telephoto end. Reference sign βR1 denotes the synthesized lateral magnification of all of the lens units disposed closer to the image than the first focus lens unit LRF at the telephoto end.

Reference sign sk denotes a back focus at the wide-angle end or a back focus at the telephoto end, whichever is less. If the value of the back focus at the wide-angle end is equal to the value of the back focus at the telephoto end, either the back focus at the wide-angle end or at the telephoto end is taken as sk.

Reference sign fLP denotes the focal length of the lens unit disposed closest to the object among lens units disposed in the rear lens group LR and each having a positive refractive power. Reference sign f3 denotes the focal length of the third lens unit L3. Reference sign r1 denotes the radius of curvature of the object-side surface of the first positive lens GP1. Reference sign r2 denotes the radius of curvature of the image-side surface of the first positive lens GP1.

Reference sign r1LRF denotes the radius of curvature of, of the first focus lens unit LRF, the surface located closest to the object. Reference sign r2LRF denotes the radius of curvature of, of the first focus lens unit LRF, the surface located closest to the image.

Reference signs νd_N and θgF_N denote, respectively, the Abbe number of a negative lens GN1 disposed closest to the object among negative lenses disposed in the first lens unit L1, and the partial dispersion ratio thereof for the g line and the F line.

The rear lens group LR includes an aperture diaphragm SP configured to determine an on-axis beam of light. Reference signs νd_PR and θgF_PR denote, respectively, the Abbe number of at least two positive lenses disposed closer to the image than the aperture diaphragm SP, and the partial dispersion ratio thereof for the g line and the F line.

The zoom lens L0 includes the second focus lens unit LF2. A lens unit that is either one of the first focus lens unit LRF and the second focus lens unit LF2 and is disposed closer to the object is defined as "object-side focus lens unit", and the other, which is disposed closer to the image, is defined as "image-side focus lens unit". Given these definitions, reference sign fLF1 denotes the focal length of the object-side focus lens unit, and fLF2 denotes the focal length of the image-side focus lens unit.

Reference signs MLF1 and MLF2 denote, respectively, the absolute value of an amount of movement of the object-side focus lens unit when focusing from infinity to an object distance where the lateral magnification of the entire system is −0.2 is performed at the telephoto end, and the absolute value of an amount of movement of the image-side focus lens unit when the focusing is performed thereat.

Reference sign T denotes a distance on the optical axis between, of the first focus lens unit LRF, the surface located closest to the image and the object-side surface of the lens disposed adjacent to, and on the image side with respect to, the first focus lens unit LRF when focusing to an object distance where the lateral magnification of the entire system is −0.3 is performed at the telephoto end.

Reference signs βLRF2 and βR2 denote, respectively, the lateral magnification of the first focus lens unit LRF when focusing to an object distance where the lateral magnification of the entire system is −0.3 is performed, and the synthesized lateral magnification of all of the lens units disposed closer to the image than the first focus lens unit LRF.

The first focus lens unit LRF includes a compound lens made up of a positive lens and a negative lens.

In this case, reference sign νd_RF1N denotes the Abbe number of the negative lens, and reference sign fLRF denotes the focal length of the first focus lens unit LRF.

Next, the technical meanings of the inequalities (3) to (19) disclosed above will now be described.

If the value is greater than the upper limit of the inequality (3), the distance on the optical axis between the first partial unit L1A and the second partial unit L1B is excessively long, and the overall lens length is thus long. If the value is less than the lower limit of the inequality (3), the height of incidence on the second partial unit L1B from the optical axis of the on-axis beam of light is excessively high, thus making the diameter of the second partial unit L1B large. This makes it difficult to reduce weight.

If the value is greater than the upper limit of the inequality (4), the refractive power of the first focus lens unit LRF is excessively strong, which makes it difficult to suppress variations in spherical aberration and field curvature occurring at the time of focusing. If the value is less than the lower limit of the inequality (4), the amount of movement of the first focus lens unit LRF occurring at the time of focusing is excessively large, and the overall lens length is thus long.

The inequality (5) expresses the position sensitivity of the first focus lens unit LRF when focusing to an object distance where the lateral magnification of the entire system is −0.2 is performed. If the value is greater than the upper limit of the inequality (5), the amount of movement of the first focus lens unit LRF occurring at the time of focusing is excessively large, and the overall lens length is thus long. If the value is less than the lower limit of the inequality (5), the refractive power of the first focus lens unit LRF is excessively strong, which makes it difficult to suppress variations in spherical aberration and field curvature occurring at the time of focusing.

If the value is greater than the upper limit of the inequality (6), the back focus at the wide-angle end and at the telephoto end is excessively long, and the overall lens length at the wide-angle end and at the telephoto end is thus long. If the value is less than the lower limit of the inequality (6), the back focus at the wide-angle end or at the telephoto end is excessively short. This is not desirable because of the following reason; when an image pickup device is disposed, it is likely that ghost light generated due to reflection by the image pickup element and by the image-side surface of the lens disposed closest to the image will form a ghost image on the image pickup device.

If the value is greater than the upper limit of the inequality (7), the refractive power of the lens unit disposed closest to the object among lens units disposed in the rear lens group LR and each having a positive refractive power is excessively strong, which makes it difficult to correct a spherical aberration especially at the wide-angle end. If the value is less than the lower limit of the inequality (7), the refractive power of the lens unit disposed closest to the object among lens units disposed in the rear lens group LR and each having a positive refractive power is excessively weak, and the diameter of the lens unit disposed closest to the image is thus large.

If the value is greater than the upper limit of the inequality (8), the refractive power of the third lens unit L3 is excessively weak. Consequently, in order to obtain a variable magnification ratio, the amount of movement of the third lens unit L3 occurring at the time of zooming is excessively large, and the overall lens length is thus long. If the value is less than the lower limit of the inequality (8), the refractive power of the third lens unit L3 is excessively strong, which makes it difficult to suppress variations in spherical aberration, on-axis chromatic aberration, and the like occurring at the time of zooming.

The inequality (9) specifies shape factors of the first positive lens GP1. If the value is greater than the upper limit of the inequality (9), the absolute value of the radius of curvature of the object-side surface of the first positive lens GP1 is a small value, which makes it difficult to correct a spherical aberration especially at the telephoto end. If the value is less than the lower limit of the inequality (9), the absolute value of the radius of curvature of the image-side surface of the first positive lens GP1 is a small value; in this case, the principal point of the entire system is disposed relatively on the image side, and the overall lens length is thus long.

If the value is greater than the upper limit of the inequality (10), the refractive power of the first lens unit L1 is excessively weak, and the principal point of the entire system is disposed on the image side. This results in increasing the overall lens length, which is not desirable. If the value is less than the lower limit of the inequality (10), the refractive power of the first lens unit L1 is excessively strong, which makes it difficult to correct a spherical aberration and an on-axis chromatic aberration especially at the telephoto end.

If the value is greater than the upper limit of the inequality (11), the shape is biconcave, meaning that both the absolute value of the radius of curvature of, of the first focus lens unit LRF, the surface located closest to the object, and the absolute value of the radius of curvature of the surface thereof located closest to the image, are large. Consequently, variations in spherical aberration and the like occurring at the time of focusing are large. If the value is less than the lower limit of the inequality (11), the absolute value of the radius of curvature of the surface located closest to the image is excessively large. Consequently, the amount of movement of the first focus lens unit LRF is large, and the overall lens length is thus long. Consequently, variations in field curvature and the like occurring at the time of focusing are large.

The inequality (12) specifies the anomalous dispersion property of the negative lens GN1 disposed closest to the object among negative lenses disposed in the first lens unit L1. If the value is greater than the upper limit of the inequality (12), it is difficult to correct a chromatic aberration of magnification at the telephoto end. If the value is less than the lower limit of the inequality (12), it is difficult to correct a chromatic aberration of magnification at the wide-angle end.

The inequality (13) specifies the anomalous dispersion property of at least two positive lenses disposed closer to the image than the aperture diaphragm SP. If the value is greater than the upper limit of the inequality (13), it is difficult to correct a chromatic aberration of magnification at the telephoto end. If the value is less than the lower limit of the inequality (13), it is difficult to correct a chromatic aberration of magnification at the wide-angle end. Furthermore, by adopting a configuration in which the number of positive lenses satisfying the inequality (13) is three to five, it is possible to further reduce the chromatic aberration of magnification at the wide-angle end and at the telephoto end.

If the value is greater than the upper limit of the inequality (14), the refractive power of the image-side focus lens unit is excessively strong, which makes it difficult to suppress variations in various kinds of aberration occurring at the time of focusing. If the value is less than the lower limit of the inequality (14), the refractive power of the object-side focus lens unit is excessively strong, which makes it difficult to suppress variations in various kinds of aberration occurring at the time of focusing.

If the value is greater than the upper limit of the inequality (15), the amount of movement of the object-side focus lens unit is excessively large, which is not desirable because the diameter of the object-side focus lens unit is to be large in order to ensure sufficient peripheral brightness. If the value is less than the lower limit of the inequality (15), the amount of movement of the image-side focus lens unit is excessively large, which is not desirable because the diameter of the image-side focus lens unit is to be large in order to ensure sufficient peripheral brightness.

The inequality (16) specifies conditions for making it possible to perform focusing to an object distance where the lateral magnification of the entire system is −0.3 at the telephoto end. A deviation of an actual image-plane position from a designed image-plane position could happen due to a lens manufacturing error. For this reason, in one embodiment, for the purpose of correcting the deviation of the image-plane position to bring it to a desired image-plane position, the position in the optical-axis direction may be changeable by making an adjustment while taking the lens manufacturing error into consideration from the predetermined position in design in the optical-axis direction of the first focus lens unit LRF.

Therefore, in one embodiment, T, which is a distance on the optical axis is secured, depending on the position sensitivity of the first focus lens unit LRF.

If the absolute value of the position sensitivity of the first focus lens unit LRF is large, a small value of the interval T on the optical axis suffices. If the absolute value of the position sensitivity of the first focus lens unit LRF is small, the interval T on the optical axis may be large.

If the value is greater than the upper limit of the inequality (16), the interval T on the optical axis is excessively large, which is not desirable because the overall lens length is thus long. If the value is less than the lower limit of the inequality (16), the interval T on the optical axis is excessively small, which makes it difficult to perform focusing to an object distance where the lateral magnification of the entire system is −0.3. The position sensitivity of the first focus lens unit LRF is a value calculated from (1−βLRF2×βLRF2)×βR2×βR2.

If the value is greater than the upper limit of the inequality (17), the refractive index of the negative lens disposed in the first focus lens unit LRF is small. Consequently, the absolute value of the radius of curvature of the object-side surface or the image-side surface of the negative lens is large and, therefore, especially, variations in field curvature occurring at the time of focusing are large.

If the value is less than the lower limit of the inequality (17), variations in chromatic aberration occurring at the time of focusing are large.

If the value is greater than the upper limit of the inequality (18), the refractive power of the third lens unit L3 is weak, and the amount of movement of the third lens unit L3 occurring at the time of zooming is excessively large. This results in increasing the overall lens length. If the value is less than the lower limit of the inequality (18), the refractive power of the third lens unit L3 is strong, and variations in on-axis chromatic aberration, astigmatism, and the like occurring at the time of zooming are large.

If the value is greater than the upper limit of the inequality (19), the refractive power of the first focus lens unit LRF is strong, and variations in field curvature and the like occurring at the time of focusing are large. If the value is less than the lower limit of the inequality (19), the refractive power of the first focus lens unit LRF is weak, and the amount of movement of the first focus lens unit LRF occurring at the time of focusing is excessively large. This results in increasing the overall lens length.

At least one of the upper limit or the lower limit of the inequalities (3) to (19) may be set as shown by the following numerical ranges:

$$0.025 < d1AB/f1A < 0.30 \quad (3a)$$

$$1.2 < \beta LRF1 < 3.7 \quad (4a)$$

$$-9.5 < (1 - \beta LRF1 \times \beta LRF1) \times \beta R1 \times \beta R1 < -3.2 \quad (5a)$$

$$0.095 < sk/Lt < 0.270 \quad (6a)$$

$$1.4 < f1/fLP < 5.5 \quad (7a)$$

$$-4.5 < f1/f3 < -0.7 \quad (8a)$$

$$0.1 < (r2 + r1)/(r2 - r1) < 1.3 \quad (9a)$$

$$0.14 < f1/ft < 0.70 \quad (10a)$$

-continued $$-3.0 < (r2LRF + r1LRF)/(r2LRF - r1LRF) < -0.4 \quad (11a)$$

$$-0.008 < \theta gF\_N - (-0.0016178 \times \nu d\_N + 0.64146) < 0.008 \quad (12a)$$

$$-0.011 < \theta gF\_PR - (-0.0016178 \times \nu d\_PR + 0.64146) < 0.004 \quad (13a)$$

$$0.45 < fLF1/fLF2 < 2.60 \quad (14a)$$

$$0.3 < MLF1/MLF2 < 4.2 \quad (15a)$$

$$0.015 < T \times |(1 - \beta LRF2 \times \beta LRF2) \times \beta R2 \times \beta R2|/f < 0.400 \quad (16a)$$

$$54 < \nu d\_RF1N < 96 \quad (17a)$$

$$-100.0 < |f2|/f3 < -0.4 \quad (18a)$$

$$-0.90 < fLRF/f1 < -0.08 \quad (19a)$$

At least one of the upper limit or the lower limit of the inequalities (3) to (19) may be set as shown by the following numerical ranges:

$$0.03 < d1AB/f1A < 0.25 \quad (3b)$$

$$1.4 < \beta LRF1 < 3.2 \quad (4b)$$

$$-9.0 < (1 - \beta LRF1 \times \beta LRF1) \times \beta R1 \times \beta R1 < -3.5 \quad (5b)$$

$$0.10 < sk/Lt < 0.25 \quad (6b)$$

$$1.6 < f1/fLP < 5.0 \quad (7b)$$

$$-4.0 < f1/f3 < -0.9 \quad (8b)$$

$$0.2 < (r2 + r1)/(r2 - r1) < 1.1 \quad (9b)$$

$$0.18 < f1/ft < 0.60 \quad (10b)$$

$$-2.5 < (r2LRF + r1LRF)/(r2LRF - r1LRF) < -0.5 \quad (11b)$$

$$-0.006 < \theta gF\_N - (-0.0016178 \times \nu d\_N + 0.64146) < 0.006 \quad (12b)$$

$$-0.010 < \theta gF\_PR - (-0.0016178 \times \nu d\_PR + 0.64146) < 0.003 \quad (13b)$$

$$0.5 < fLF1/fLF2 < 2.2 \quad (14b)$$

$$0.4 < MLF1/MLF2 < 3.5 \quad (15b)$$

$$0.02 < T \times |(1 - \beta LRF2 \times \beta LRF2) \times \beta R2 \times \beta R2|/f < 0.30 \quad (16b)$$

$$57 < \nu d\_RF1N < 92 \quad (17b)$$

$$-50.0 < |f2|/f3 < -0.5 \quad (18b)$$

$$-0.70 < fLRF/f1 < -0.11 \quad (19b)$$

Next, the configuration of the zoom lens L0 according to each embodiment will now be described in detail. Second and subsequent embodiments will be described with a focus on differences from a first embodiment.

First Embodiment

The zoom lens L0 according to the first embodiment includes a first lens unit L1, a second lens unit L2, a third lens unit L3, and a rear lens group LR that are disposed in order from the object side to the image side. The first lens unit L1 has a positive refractive power. The second lens unit L2 has a negative refractive power. The third lens unit L3 has a negative refractive power. The rear lens group LR has a positive refractive power at the wide-angle end. The rear lens group LR includes a fourth lens unit L4, a fifth lens unit L5, a sixth lens unit L6, a seventh lens unit L7, and an eighth lens unit L8 that are disposed in order from the object side to the image side. The fourth lens unit L4 has a positive refractive power. The fifth lens unit L5 has a positive refractive power. The sixth lens unit L6 has a negative refractive power. The seventh lens unit L7 has a negative refractive power. The eighth lens unit L8 has a positive refractive power. Various kinds of aberration in the entire zoom range are corrected well by properly disposing lens units each having a positive refractive power and lens units each having a negative refractive power.

When focusing is performed, the sixth lens unit L6 and the seventh lens unit L7 move toward the image with different trajectories, thereby suppressing variations in various kinds of aberration occurring at the time of focusing.

When image blur correction is performed, an image stabilizing unit LVR disposed in the fourth lens unit L4 moves such that a directional component perpendicular to the optical axis is included. Since the diameter of each lens disposed in the fourth lens unit L4 is relatively small, disposing the image stabilizing unit LVR in the fourth lens unit L4 makes it possible to make the diameter of the image stabilizing unit LVR smaller.

In one embodiment, a flare cut-off stop(s) FC configured to block a ray of light may be disposed in each embodiment. Each numerical embodiment discloses an example in which a flare cut-off stop(s) FC is disposed.

The configuration may include at least one flare cut-off stop FC at a position next to, and on the object side with respect to, the first lens unit L1 or at a position between, of the first lens unit L1, the surface located closest to the object and the surface thereof located closest to the image. This makes it possible to properly block an unwanted on-axis marginal ray at the telephoto end and thus to achieve a ghost reduction.

The configuration may include at least one flare cut-off stop FC at a position next to, and on the object side with respect to, the second lens unit L2 or at a position between, of the second lens unit L2, the surface located closest to the object and the surface thereof located closest to the image. This makes it possible to properly block an unwanted off-axis marginal ray and principal ray at the wide-angle end and in a zoom midrange and thus to achieve a coma aberration reduction and a ghost reduction.

The configuration may include at least one flare cut-off stop FC at a position next to, and on the object side with respect to, the third lens unit L3 or at a position between, of the third lens unit L3, the surface located closest to the object and the surface thereof located closest to the image. This makes it possible to properly block an unwanted off-axis marginal ray and principal ray at the wide-angle end and in a zoom midrange and thus to achieve a coma aberration reduction and a ghost reduction.

The configuration may include at least one flare cut-off stop FC at a position next to, and on the object side with respect to, the lens unit in the zoom lens L0 disposed closest to the image or at a position next to, and on the image side with respect to, the lens unit therein disposed closest to the image. This makes it possible to properly block an unwanted off-axis marginal ray and principal ray at the wide-angle end and thus to achieve a coma aberration reduction and a ghost reduction.

The non-limiting layout of the flare cut-off stop(s) FC described above is applicable not only to the first embodiment, and a coma aberration reduction and a ghost reduction can be achieved also in the second to eighth embodiments by adopting the same or similar layout.

Second Embodiment

The zoom lens L0 according to the second embodiment includes a first lens unit L1, a second lens unit L2, a third lens unit L3, and a rear lens group LR that are disposed in order from the object side to the image side. The first lens unit L1 has a positive refractive power. The second lens unit L2 has a negative refractive power. The third lens unit L3 has a negative refractive power. The rear lens group LR has a positive refractive power at the wide-angle end. The rear lens group LR includes a fourth lens unit L4, a fifth lens unit L5, a sixth lens unit L6, and a seventh lens unit L7 that are disposed in order from the object side to the image side. The fourth lens unit L4 has a positive refractive power. The fifth lens unit L5 has a negative refractive power. The sixth lens unit L6 has a negative refractive power. The seventh lens unit L7 has a positive refractive power. Since the number of the lens units is smaller than in the first embodiment, the present embodiment makes it easier to suppress variations in aberration occurring due to relative decentering of each lens unit at the time of zooming.

Third Embodiment

The zoom lens L0 according to the third embodiment includes a first lens unit L1, a second lens unit L2, a third lens unit L3, and a rear lens group LR that are disposed in order from the object side to the image side. The first lens unit L1 has a positive refractive power. The second lens unit L2 has a positive refractive power. The third lens unit L3 has a negative refractive power. The rear lens group LR has a positive refractive power at the wide-angle end. The rear lens group LR includes a fourth lens unit L4, a fifth lens unit L5, a sixth lens unit L6, and a seventh lens unit L7 that are disposed in order from the object side to the image side. The fourth lens unit L4 has a positive refractive power. The fifth lens unit L5 has a negative refractive power. The sixth lens unit L6 has a negative refractive power. The seventh lens unit L7 has a positive refractive power. Since the second lens unit L2 has a positive refractive power, the present embodiment makes it easier to suppress variations in, especially, spherical aberration and the like occurring at the time of zooming.

Fourth Embodiment

In the zoom lens L0 according to the fourth embodiment, the third lens unit L3 is stationary for zooming. This suppresses the decentering of the third lens unit L3 occurring at the time of zooming, thereby making it easier to reduce variations in various kinds of aberration.

Fifth Embodiment

The zoom lens L0 according to the fifth embodiment includes a first lens unit L1, a second lens unit L2, a third lens unit L3, and a rear lens group LR that are disposed in order from the object side to the image side. The first lens unit L1 has a positive refractive power. The second lens unit L2 has a negative refractive power. The third lens unit L3 has a negative refractive power. The rear lens group LR has a positive refractive power at the wide-angle end. The rear lens group LR includes a fourth lens unit L4 having a positive refractive power, a fifth lens unit L5 having a negative refractive power, and a sixth lens unit L6 having a positive refractive power. Since the number of the lens units is smaller than in the first embodiment, the present embodiment makes it easier to suppress variations in aberration occurring due to relative decentering of each lens unit at the time of zooming.

Since the sixth lens unit L6 includes an aspherical lens, the present embodiment makes it easier to suppress variations in field curvature and distortion aberration occurring at the time of zooming.

Sixth Embodiment

In the zoom lens L0 according to the sixth embodiment, the third lens unit L3 is stationary for zooming. This suppresses the decentering of the third lens unit L3 occurring at the time of zooming, thereby making it easier to reduce variations in various kinds of aberration. Moreover, since the second lens unit L2 includes three lenses, the present embodiment makes it easier to suppress variations in field curvature and the like occurring at the time of zooming.

Seventh Embodiment

In the zoom lens L0 according to the seventh embodiment, the eighth lens unit L8 is stationary for zooming. This suppresses the decentering of the eighth lens unit L8 occurring at the time of zooming, thereby making it easier to reduce variations in various kinds of aberration.

Eighth Embodiment

In the zoom lens L0 according to the eighth embodiment, when focusing is performed, the third lens unit L3 and the sixth lens unit L6 move toward the image with different trajectories, thereby suppressing variations in various kinds of aberration occurring at the time of focusing.

In the zoom lens L0 according to each embodiment, any arbitrary lens surface may be an aspherical surface. With this configuration, variations in spherical aberration and field curvature occurring at the time of zooming can be suppressed. Configuring the surface of a lens disposed closer to the image than the aperture diaphragm SP as an aspherical surface because it is possible to suppress poor coma aberration and/or poor field curvature due to a manufacturing error of the aspherical surface.

The zoom lens L0 according to each embodiment may include one or more positive lenses made of a material whose Abbe number is 80 or greater and 100 or less in the first lens unit L1 or the second lens unit L2. This makes it possible to correct an on-axis chromatic aberration at the telephoto end well. In one embodiment, the system may include one or more positive lenses made of a material whose Abbe number is 90 or greater and 96 or less.

In the zoom lens L0 according to each embodiment, the specific gravity of a material of which at least one of positive lenses included in the first lens unit L1 is made may be 3.0 or less, and the Abbe number thereof may be 65 or greater and 100 or less.

This makes it possible to correct an on-axis chromatic aberration at the telephoto end well while reducing the weight of the first lens unit L1. In the zoom lens L0 according to each embodiment, the first lens GP1 is S-FSL7 manufactured by OHARA INC., and its specific gravity is 2.46. An alternative example is an optical glass J-FK5 or the like having a specific gravity of 2.45, but is not limited thereto.

In the zoom lens L0 according to each embodiment, the Abbe number of the material of the negative lens GN1 may be 25 or greater and 40 or less. This makes it easier to correct an on-axis chromatic aberration and a chromatic aberration of magnification in the entire zoom range.

In the zoom lens L0 according to each embodiment, the object-side surface of the lens disposed closest to the object and the image-side surface of the lens disposed closest to the image may be fluorine coated using vapor deposition. Since the object-side surface of the lens disposed closest to the object and the image-side surface of the lens disposed closest to the image are likely to be exposed to the outside, fluorine coating using vapor deposition enhances water repellency and oil repellency and makes it possible to suppress flares and obtain high optical characteristics. Since the object-side surface of the lens disposed closest to the object has a large diameter, fluorine coating using vapor deposition could be used.

A positive lens and a negative lens that make up at least one compound lens among compound lenses disposed in the zoom lens L0 according to each embodiment may be bonded to each other using an adhesive having a thickness on the optical axis of 0.005 mm or greater and 0.05 mm or less. If the thickness is less than 0.005 mm, the adhesion is weak. If the thickness is greater than 0.03 mm, the distance on the optical axis from, of the compound lens, the surface located closest to the object to the surface thereof located closest to the image is long, and the overall lens length is thus long. In one embodiment, a range from 0.008 mm inclusive to 0.02 mm inclusive may be satisfied.

At least one lens disposed in the zoom lens L0 according to each embodiment has an antireflection film for prevention of reflection, and the antireflection film is made up of a plurality of layers. Let Nd be the refractive index of the most-air-interface-side layer for the d line. The value Nd of the antireflection film PC may be 1.32 or less. Setting the value Nd to be 1.32 or less makes it possible to reduce a refractive index difference from air; therefore, it is possible to reduce the reflection of light and thus to reduce a ghost.

A specific example of the configuration of the antireflection film PC is a multilayer film using a wet method disclosed in Japanese Patent Laid-Open Nos. 2012-230211 and 2014-95877, and the like, but is not limited thereto. In one embodiment, the value Nd may be 1.30 or less, which makes it possible to further reduce a ghost.

The antireflection film PC may be applied to the image-side surface of the negative lens whose concave surface is oriented toward the image among negative lenses disposed in the zoom lens L0. The light reflected by the negative lens whose concave surface is oriented toward the image tends to have a high reflectivity because this light is prone to reflection at a large angle with respect to the normal-to-surface direction of the negative lens whose concave surface is oriented toward the image. Moreover, since the light reflected by the negative lens whose concave surface is oriented toward the image is prone to condensing at the image plane, a ghost will be easily noticeable. Therefore, applying the antireflection film PC to the image-side surface of the negative lens whose concave surface is oriented toward the image makes it possible to reduce the ghost.

Numerical embodiments 1 to 8 corresponding to the first to eighth embodiments respectively will be disclosed below.

In surface data of each numerical embodiment, reference sign r denotes the radius of curvature of each optical surface, and reference sign d (mm) denotes an on-axis interval (distance on the optical axis) between the m-th surface and the (m+1)-th surface, where reference sign m denotes the ordinal number of the surface counted from the light-incident side. Reference sign nd denotes the refractive index of each optical member for the d line. Reference sign νd denotes the Abbe number of the optical member. The Abbe number νd of a certain material is expressed by the following expression when Nd is defined as a refractive index for the d line (wavelength of 587.6 nm) of Fraunhofer lines, NF is defined as a refractive index for the F line (wavelength of 486.1 nm) thereof, and NC is defined as a refractive index for the C line (wavelength of 656.3 nm) thereof:

$$\nu d=(Nd-1)/(NF-NC).$$

The back focus BF is the distance from the final lens surface to the image plane. The overall lens length is a value obtained by adding the back focus to the distance from the first lens surface to the final lens surface.

In a case where the optical surface is an aspherical surface, an asterisk sign * is affixed to the right of the surface number. The shape of the aspherical surface is expressed by the following expression when x is defined as an amount of displacement from the surface vertex in the optical-axis direction, h is defined as a height from the optical axis in the direction perpendicular to the optical axis, R is defined as the paraxial radius of curvature, k is defined as a conic constant, and A4, A6, A8, and A10 are defined as the aspherical surface coefficients of individual orders, respectively:

$$x=(h^2/R)/\left[1+\{1-(1+k)(h/R)^2\}^{1/2}\right]+A4\times h^4+A6\times h^6+A8\times h^8+A10\times h^{10}.$$

Reference sign "e±XX" in each aspherical surface coefficient means "$\times 10^{\pm XX}$".

"Lens structure length" means a distance on the optical axis from, of each lens unit, the surface located closest to the object to the surface thereof located closest to the image.

Non-illustrated FC denotes a flare cut-off stop for cutting undesirable light. "FC" shown at the m-th surface means that a flare cut-off stop is disposed between the m-th surface and the (m+1)-th surface.

Numerical Embodiment 1

Unit: mm

Surface data (*SN = surface number)
(*ED = effective diameter)

| SN | r | d | nd | vd | ED |
|---|---|---|---|---|---|
| 1 | 170.806 | 11.52 | 1.48749 | 70.2 | 89.81 |
| 2 | −394.114 | 29.08 | | | 89.29 |
| 3 | 157.819 | 10.80 | 1.43387 | 95.1 | 75.42 |
| 4 | −223.673 | 2.00 | 1.72047 | 34.7 | 74.11 |
| 5 (FC) | 805.986 | (variable) | | | 72.44 |
| 6 | 110.937 | 4.80 | 1.64769 | 33.8 | 54.28 |
| 7 | 217.526 | 1.80 | 1.72916 | 54.7 | 52.89 |
| 8 (FC) | 86.185 | (variable) | | | 51.07 |
| 9 | 957.252 | 1.65 | 1.72916 | 54.7 | 47.82 |
| 10 | 158.741 | 4.75 | | | 47.18 |
| 11 | −101.332 | 1.65 | 1.69680 | 55.5 | 47.15 |
| 12 | 117.664 | 3.18 | 1.84666 | 23.8 | 47.94 |
| 13 (FC) | 640.828 | (variable) | | | 48.02 |
| 14 | 78.130 | 7.53 | 1.49700 | 81.5 | 48.97 |
| 15 | −203.211 | 0.15 | | | 48.78 |
| 16 | 68.586 | 5.52 | 1.49700 | 81.5 | 47.26 |
| 17 | 532.441 | 0.20 | | | 46.51 |
| 18 | 58.838 | 7.09 | 1.49700 | 81.5 | 44.17 |
| 19 | −222.977 | 1.50 | 1.85150 | 40.8 | 43.02 |
| 20 | 97.389 | 4.86 | | | 40.77 |
| 21 (iris) | ∞ | 18.11 | | | 39.35 |
| 22 | 76.887 | 5.90 | 1.85478 | 24.8 | 29.15 |
| 23 | −41.187 | 1.40 | 2.00100 | 29.1 | 28.22 |
| 24 | 31.126 | 4.09 | | | 25.80 |
| 25 | 47.159 | 1.40 | 2.00069 | 25.5 | 26.35 |
| 26 | 29.597 | 4.95 | 1.65412 | 39.7 | 25.84 |
| 27 | −378.885 | (variable) | | | 25.76 |
| 28 | 35.744 | 6.15 | 1.56732 | 42.8 | 25.24 |
| 29 | −49.358 | 0.20 | | | 24.44 |
| 30 | −116.989 | 1.20 | 1.80400 | 46.5 | 23.33 |
| 31 | 36.862 | 3.16 | 1.58144 | 40.8 | 21.98 |
| 32 | −1748.879 | (variable) | | | 21.47 |
| 33 | 306.743 | 1.83 | 1.62280 | 57.0 | 20.12 |
| 34 | −98.774 | 1.20 | 1.49700 | 81.5 | 19.67 |
| 35 | 28.966 | (variable) | | | 18.30 |
| 36 | −496.398 | 2.02 | 1.66565 | 35.6 | 17.56 |
| 37 | −46.067 | 3.87 | | | 17.63 |
| 38 | −36.886 | 1.30 | 1.71300 | 53.9 | 17.58 |
| 39 (FC) | 56.282 | (variable) | | | 18.19 |
| 40 | −448.749 | 4.64 | 1.65412 | 39.7 | 41.82 |
| 41 | −64.608 | (variable) | | | 42.26 |

-continued

| Numerical Embodiment 1 | | | | | |
|---|---|---|---|---|---|
| 42 | ∞ | 1.30 | 1.51633 | 64.1 | 50.00 |
| 43 | ∞ | 0.80 | | | 50.00 |
| IP | ∞ | | | | |

(*IP = image plane)

Various data

| | | | |
|---|---|---|---|
| Zoom ratio | 3.15 | | |
| Focal length | 185.00 | 300.00 | 582.00 |
| F number | 5.15 | 5.70 | 6.48 |
| Half angle of view | 6.67 | 4.12 | 2.13 |
| Image height | 21.64 | 21.64 | 21.64 |
| Overall lens length | 329.56 | 329.56 | 329.56 |
| BF | 39.56 | 39.56 | 39.56 |
| d5 | 1.80 | 16.70 | 39.92 |
| d8 | 6.17 | 13.42 | 13.57 |
| d13 | 90.07 | 51.71 | 1.40 |
| d27 | 2.96 | 2.31 | 1.70 |
| d32 | 6.34 | 7.47 | 2.10 |
| d35 | 4.53 | 4.07 | 11.28 |
| d39 | 18.62 | 34.82 | 60.52 |
| d41 | 37.90 | 37.90 | 37.90 |

Zoom lens unit data (*LU = lens unit)
(*SS = starting surface)
(*FL = focal length)
(*LSL = lens structure length)
(*FPPP = front principal point position)
(*RPPP = rear principal point position)

| LU | SS | FL | LSL | FPPP | RPPP |
|---|---|---|---|---|---|
| L1 | 1 | 214.23 | 53.40 | 3.21 | −41.76 |
| L2 | 6 | −486.51 | 6.60 | 15.73 | 11.41 |
| L3 | 9 | −91.78 | 11.24 | 4.26 | −4.07 |
| L4 | 14 | 100.36 | 62.70 | −48.89 | −68.87 |
| L5 | 28 | 66.71 | 10.72 | −0.65 | −7.37 |
| L6 | 33 | −72.61 | 3.03 | 2.29 | 0.36 |
| L7 | 36 | −57.67 | 7.19 | 8.85 | 2.61 |
| L8 | 40 | 114.84 | 4.64 | 3.26 | 0.47 |

Single lens element data (*L = lens)
(*SS = starting surface)
(*FL = focal length)

| L | SS | FL |
|---|---|---|
| 1 | 1 | 246.08 |
| 2 | 3 | 215.11 |
| 3 | 4 | −242.82 |
| 4 | 6 | 343.47 |
| 5 | 7 | −196.89 |
| 6 | 9 | −261.21 |
| 7 | 11 | −77.89 |
| 8 | 12 | 169.76 |
| 9 | 14 | 114.56 |
| 10 | 16 | 157.78 |
| 11 | 18 | 94.46 |
| 12 | 19 | −79.43 |
| 13 | 22 | 32.12 |
| 14 | 23 | −17.54 |
| 15 | 25 | −82.72 |
| 16 | 26 | 42.17 |
| 17 | 28 | 37.52 |
| 18 | 30 | −34.74 |
| 19 | 31 | 62.13 |
| 20 | 33 | 120.17 |
| 21 | 34 | −44.93 |
| 22 | 36 | 76.15 |
| 23 | 38 | −31.07 |
| 24 | 40 | 114.84 |

Numerical Embodiment 2

Unit: mm
Surface data

| SN | r | d | nd | vd | ED |
|---|---|---|---|---|---|
| (*SN = surface number) (*ED = effective diameter) | | | | | |
| 1 | 194.596 | 9.09 | 1.48749 | 70.2 | 89.81 |
| 2 | −847.706 | 0.20 | | | 89.40 |
| 3 | 358.793 | 5.10 | 1.49700 | 81.5 | 88.24 |
| 4 | −9722.189 | 43.61 | | | 87.62 |
| 5 | 164.846 | 8.91 | 1.43387 | 95.1 | 67.93 |
| 6 | −232.134 | 2.00 | 1.66565 | 35.6 | 66.69 |
| 7 | 299.163 | (variable) | | | 64.75 |
| 8 | 86.451 | 2.46 | 1.84666 | 23.8 | 46.26 |
| 9 | 134.316 | 1.80 | 1.77250 | 49.6 | 45.67 |
| 10 | 72.113 | 3.54 | | | 44.14 |
| 11 | 2673.406 | 1.65 | 1.77250 | 49.6 | 44.09 |
| 12 | 130.175 | (variable) | | | 43.44 |
| 13 (FC) | −114.555 | 1.65 | 1.72916 | 54.7 | 43.04 |
| 14 | 94.135 | 3.40 | 1.85883 | 30.0 | 43.77 |
| 15 (FC) | 578.623 | (variable) | | | 43.86 |
| 16 | 100.358 | 5.47 | 1.49700 | 81.5 | 45.65 |
| 17 | −262.039 | 0.15 | | | 45.62 |
| 18 | 62.075 | 6.19 | 1.43700 | 95.1 | 45.01 |
| 19 | 14246.998 | 0.20 | | | 44.40 |
| 20 | 50.974 | 6.48 | 1.49700 | 81.5 | 42.25 |
| 21 | −1348.868 | 1.50 | 1.91082 | 35.2 | 41.21 |
| 22 | 104.784 | 16.40 | | | 39.61 |
| 23 (iris) | ∞ | 6.83 | | | 32.12 |
| 24 | 85.940 | 6.50 | 1.85478 | 24.8 | 28.00 |
| 25 | −41.040 | 1.40 | 2.00100 | 29.1 | 26.66 |
| 26 | 31.921 | 3.42 | | | 24.60 |
| 27 | 46.614 | 1.40 | 2.05090 | 26.9 | 24.98 |
| 28 | 28.770 | 4.69 | 1.70154 | 41.2 | 24.47 |
| 29 | −336.143 | 1.70 | | | 24.35 |
| 30 | 35.709 | 5.42 | 1.62004 | 36.3 | 23.69 |
| 31 | −54.260 | 1.37 | | | 22.89 |
| 32 | −103.671 | 1.20 | 1.80400 | 46.5 | 20.85 |
| 33 | 29.018 | 2.68 | 1.65412 | 39.7 | 19.49 |
| 34 | 77.015 | (variable) | | | 18.90 |
| 35 | −266.666 | 2.30 | 1.69350 | 53.2 | 17.41 |
| 36 | −35.138 | 1.20 | 1.59282 | 68.6 | 17.07 |
| 37 | 31.939 | (variable) | | | 16.13 |
| 38 | −64.597 | 1.30 | 1.49700 | 81.5 | 26.74 |
| 39 (FC) | −178.602 | (variable) | | | 27.45 |
| 40 | 960.057 | 4.31 | 1.66565 | 35.6 | 40.97 |
| 41 | −83.955 | (variable) | | | 41.00 |
| 42 | ∞ | 1.30 | 1.54400 | 66.3 | 50.00 |
| 43 | ∞ | 0.80 | | | 50.00 |
| IP | ∞ | | | | |

(*IP = image plane)

Various data

| | | | |
|---|---|---|---|
| Zoom ratio | 2.85 | | |
| Focal length | 204.00 | 350.00 | 582.00 |
| F number | 5.15 | 5.70 | 6.48 |
| Half angle of view | 6.05 | 3.54 | 2.13 |
| Image height | 21.64 | 21.64 | 21.64 |
| Overall lens length | 344.54 | 344.54 | 344.54 |
| BF | 49.54 | 47.39 | 45.54 |
| d7 | 2.60 | 28.53 | 47.44 |
| d12 | 6.06 | 8.29 | 8.86 |
| d15 | 84.08 | 41.39 | 1.40 |
| d34 | 2.75 | 5.30 | 2.75 |
| d37 | 32.01 | 30.04 | 40.92 |
| d39 | 2.00 | 18.10 | 32.13 |
| d41 | 47.90 | 45.75 | 43.90 |

-continued

Numerical Embodiment 2

Zoom lens unit data (*LU = lens unit)
(*SS = starting surface)
(*FL = focal length)
(*LSL = lens structure length)
(*FPPP = front principal point position)
(*RPPP = rear principal point position)

| LU | SS | FL | LSL | FPPP | RPPP |
|---|---|---|---|---|---|
| L1 | 1 | 239.65 | 68.91 | −9.07 | −65.67 |
| L2 | 8 | −147.68 | 9.45 | 9.64 | 2.55 |
| L3 | 13 | −154.18 | 5.05 | 0.43 | −2.34 |
| L4 | 16 | 66.96 | 72.99 | −3.88 | −56.16 |
| L5 | 35 | −54.50 | 3.50 | 1.92 | −0.18 |
| L6 | 38 | −204.39 | 1.30 | −0.49 | −1.37 |
| L7 | 40 | 116.17 | 4.31 | 2.38 | −0.21 |

Single lens element data (*L = lens)
(*SS = starting surface)
(*FL = focal length)

| L | SS | FL |
|---|---|---|
| 1 | 1 | 325.58 |
| 2 | 3 | 696.34 |
| 3 | 5 | 223.69 |
| 4 | 6 | −196.07 |
| 5 | 8 | 279.93 |
| 6 | 9 | −204.15 |
| 7 | 11 | −144.19 |
| 8 | 13 | −70.63 |
| 9 | 14 | 130.48 |
| 10 | 16 | 146.74 |
| 11 | 18 | 142.65 |
| 12 | 20 | 98.98 |
| 13 | 21 | −106.70 |
| 14 | 24 | 33.28 |
| 15 | 25 | −17.77 |
| 16 | 27 | −74.51 |
| 17 | 28 | 37.98 |
| 18 | 30 | 35.55 |
| 19 | 32 | −28.09 |
| 20 | 33 | 69.64 |
| 21 | 35 | 58.12 |
| 22 | 36 | −28.04 |
| 23 | 38 | −204.39 |
| 24 | 40 | 116.17 |

Numerical Embodiment 3

Unit: mm
Surface data (*SN = surface number)
(*ED = effective diameter)

| SN | r | d | nd | vd | ED |
|---|---|---|---|---|---|
| 1 | 171.183 | 11.80 | 1.48749 | 70.2 | 89.81 |
| 2 (FC) | −365.868 | (variable) | | | 89.27 |
| 3 | 156.403 | 10.88 | 1.43875 | 94.7 | 73.06 |
| 4 | −174.417 | 2.00 | 1.72047 | 34.7 | 71.89 |
| 5 (FC) | 1520.907 | (variable) | | | 70.21 |
| 6 | 1457.410 | 1.65 | 1.72916 | 54.7 | 50.42 |
| 7 | 90.618 | 6.26 | | | 49.14 |
| 8 | −116.957 | 1.65 | 1.61997 | 63.9 | 49.12 |
| 9 | 101.643 | 3.39 | 1.96300 | 24.1 | 50.08 |
| 10 (FC) | 341.950 | (variable) | | | 50.10 |
| 11 | 80.016 | 7.53 | 1.43700 | 95.1 | 50.93 |
| 12 | −251.597 | 0.15 | | | 50.75 |
| 13 | 75.326 | 5.81 | 1.49700 | 81.5 | 49.57 |
| 14 | 1255.391 | 0.20 | | | 48.89 |
| 15 | 56.201 | 7.88 | 1.49700 | 81.5 | 46.23 |

-continued

| Numerical Embodiment 3 | | | | | |
|---|---|---|---|---|---|
| 16 | −237.070 | 1.50 | 1.80400 | 46.5 | 45.02 |
| 17 | 107.504 | 11.75 | | | 42.68 |
| 18 (iris) | ∞ | 13.02 | | | 37.17 |
| 19 | 121.140 | 4.48 | 1.84666 | 23.8 | 29.19 |
| 20 | −53.408 | 1.40 | 2.00100 | 29.1 | 28.49 |
| 21 | 34.485 | 4.20 | | | 26.48 |
| 22 | 49.075 | 1.40 | 2.05090 | 26.9 | 26.98 |
| 23 | 31.559 | 6.00 | 1.65412 | 39.7 | 26.45 |
| 24 | −384.167 | 3.57 | | | 26.29 |
| 25 | 41.062 | 5.54 | 1.60342 | 38.0 | 25.48 |
| 26 | −56.350 | 0.20 | | | 24.78 |
| 27 | −111.876 | 1.20 | 1.90366 | 31.3 | 23.94 |
| 28 | 33.303 | 4.68 | 1.77047 | 29.7 | 22.71 |
| 29 | −705.298 | (variable) | | | 21.99 |
| 30 | 115.786 | 1.90 | 1.61340 | 44.3 | 20.41 |
| 31 | −722.133 | 1.10 | 1.59282 | 68.6 | 19.84 |
| 32 | 31.234 | (variable) | | | 18.74 |
| 33 | −166.953 | 1.81 | 1.73037 | 32.2 | 18.75 |
| 34 | −49.201 | 6.18 | | | 18.94 |
| 35 | −38.662 | 1.30 | 1.77250 | 49.6 | 18.94 |
| 36 (FC) | 85.508 | (variable) | | | 19.61 |
| 37 | 2295.727 | 4.64 | 1.66565 | 35.6 | 41.97 |
| 38 | −76.977 | (variable) | | | 42.35 |
| 39 | ∞ | 1.30 | 1.51633 | 64.1 | 50.00 |
| 40 | ∞ | 0.80 | | | 50.00 |
| IP | ∞ | | | | |

(*IP = image plane)

Various data

| | | | |
|---|---|---|---|
| Zoom ratio | 3.15 | | |
| Focal length | 185.00 | 300.00 | 582.00 |
| F number | 5.15 | 5.70 | 6.48 |
| Half angle of view | 6.67 | 4.12 | 2.13 |
| Image height | 21.64 | 21.64 | 21.64 |
| Overall lens length | 329.56 | 329.56 | 329.56 |
| BF | 42.03 | 42.03 | 42.03 |
| d2 | 23.56 | 30.24 | 34.26 |
| d5 | 3.70 | 23.66 | 44.96 |
| d10 | 93.66 | 54.53 | 1.40 |
| d29 | 8.19 | 9.09 | 2.10 |
| d32 | 7.24 | 4.20 | 11.25 |
| d36 | 16.11 | 30.75 | 58.50 |
| d38 | 40.37 | 40.37 | 40.37 |

Zoom lens unit data

| LU | SS | FL | LSL | FPPP | RPPP |
|---|---|---|---|---|---|
| L1 | 1 | 240.96 | 11.80 | 2.55 | −5.44 |
| L2 | 3 | 1313.47 | 12.88 | −21.48 | −29.73 |
| L3 | 6 | −79.71 | 12.96 | 3.71 | −6.10 |
| L4 | 11 | 75.79 | 80.50 | 28.44 | −61.33 |
| L5 | 30 | −74.26 | 3.00 | 2.63 | 0.74 |
| L6 | 33 | −59.61 | 9.29 | 11.85 | 3.25 |
| L7 | 37 | 111.98 | 4.64 | 2.70 | −0.09 |

(*LU = lens unit)
(*SS = starting surface)
(*FL = focal length)
(*LSL = lens structure length)
(*FPPP = front principal point position)
(*RPPP = rear principal point position)

Single lens element data

| L | SS | FL |
|---|---|---|
| 1 | 1 | 240.96 |
| 2 | 3 | 189.85 |
| 3 | 4 | −217.08 |
| 4 | 6 | −132.59 |
| 5 | 8 | −87.46 |
| 6 | 9 | 149.16 |
| 7 | 11 | 139.89 |

(*L = lens)
(*SS = starting surface)
(*FL = focal length)

-continued

| Numerical Embodiment 3 | | |
|---|---|---|
| 8 | 13 | 160.97 |
| 9 | 15 | 92.23 |
| 10 | 16 | −91.82 |
| 11 | 19 | 44.30 |
| 12 | 20 | −20.77 |
| 13 | 22 | −87.73 |
| 14 | 23 | 44.84 |
| 15 | 25 | 40.22 |
| 16 | 27 | −28.29 |
| 17 | 28 | 41.39 |
| 18 | 30 | 162.82 |
| 19 | 31 | −50.48 |
| 20 | 33 | 94.90 |
| 21 | 35 | −34.31 |
| 22 | 37 | 111.98 |

Numerical Embodiment 4

Unit: mm
Surface data

| SN | r | d | nd | vd | ED |
|---|---|---|---|---|---|
| | | (*SN = surface number) (*ED = effective diameter) | | | |
| 1 | 158.077 | 11.31 | 1.48749 | 70.2 | 89.22 |
| 2 | −509.174 | 21.59 | | | 88.65 |
| 3 | 125.655 | 11.09 | 1.43387 | 95.1 | 77.50 |
| 4 | −391.341 | 2.00 | 1.66565 | 35.6 | 76.07 |
| 5 (FC) | 465.930 | (variable) | | | 74.15 |
| 6 | 110.080 | 1.65 | 1.61997 | 63.9 | 47.90 |
| 7 | 67.228 | 6.32 | | | 46.40 |
| 8 | −142.124 | 1.65 | 1.72916 | 54.7 | 46.30 |
| 9 | 68.545 | 4.91 | 1.84666 | 23.8 | 45.97 |
| 10 (FC) | 321.092 | (variable) | | | 45.81 |
| 11 | −171.311 | 1.80 | 1.90366 | 31.3 | 45.70 |
| 12 (FC) | 463.335 | (variable) | | | 46.12 |
| 13 | 92.510 | 7.28 | 1.49700 | 81.5 | 49.24 |
| 14 | −162.381 | 0.15 | | | 49.26 |
| 15 | 77.224 | 6.55 | 1.49700 | 81.5 | 48.44 |
| 16 | −436.402 | 0.20 | | | 47.83 |
| 17 | 54.618 | 8.24 | 1.49700 | 81.5 | 44.83 |
| 18 | −160.002 | 1.50 | 1.83481 | 42.7 | 43.57 |
| 19 | 104.805 | 4.75 | | | 41.25 |
| 20 (iris) | ∞ | 18.00 | | | 39.87 |
| 21 | 81.974 | 6.01 | 1.85478 | 24.8 | 29.97 |
| 22 | −41.584 | 1.40 | 2.00100 | 29.1 | 29.07 |
| 23 | 33.797 | 4.92 | | | 26.71 |
| 24 | 50.482 | 1.40 | 2.00069 | 25.5 | 27.32 |
| 25 | 31.689 | 4.85 | 1.65412 | 39.7 | 26.80 |
| 26 | −523.338 | (variable) | | | 26.71 |
| 27 | 41.853 | 6.12 | 1.54814 | 45.8 | 26.23 |
| 28 | −47.351 | 0.20 | | | 25.53 |
| 29 | −94.947 | 1.20 | 1.69680 | 55.5 | 24.49 |
| 30 | 26.092 | 3.80 | 1.65412 | 39.7 | 22.77 |
| 31 | 138.243 | (variable) | | | 22.19 |
| 32 | 145.141 | 1.80 | 1.61340 | 44.3 | 20.89 |
| 33 | −188.510 | 1.20 | 1.59282 | 68.6 | 20.49 |
| 34 | 38.372 | (variable) | | | 19.54 |
| 35 | 335.097 | 2.31 | 1.61340 | 44.3 | 17.32 |
| 36 | −45.404 | 4.40 | | | 17.48 |
| 37 | −36.559 | 1.30 | 1.77250 | 49.6 | 17.27 |
| 38 (FC) | 60.896 | (variable) | | | 17.81 |
| 39 | −181.598 | 4.14 | 1.73800 | 32.3 | 40.53 |
| 40 | −57.611 | (variable) | | | 41.04 |
| 41 | ∞ | 1.30 | 1.51633 | 64.1 | 50.00 |
| 42 | ∞ | 0.80 | | | 50.00 |
| IP | ∞ | | | | |

(*IP = image plane)

Various data

| | | | |
|---|---|---|---|
| Zoom ratio | 3.35 | | |
| Focal length | 204.00 | 300.00 | 682.50 |

-continued

| Numerical Embodiment 4 | | | |
|---|---|---|---|
| F number | 5.15 | 5.70 | 7.65 |
| Half angle of view | 6.05 | 4.12 | 1.82 |
| Image height | 21.64 | 21.64 | 21.64 |
| Overall lens length | 344.56 | 344.56 | 344.56 |
| BF | 44.71 | 44.71 | 44.71 |
| d5 | 19.84 | 32.40 | 51.33 |
| d10 | 36.84 | 24.28 | 5.35 |
| d12 | 56.48 | 41.63 | 1.40 |
| d26 | 2.89 | 2.11 | 1.94 |
| d31 | 7.57 | 8.28 | 2.10 |
| d34 | 3.62 | 3.62 | 27.83 |
| d38 | 18.59 | 33.50 | 55.88 |
| d40 | 43.05 | 43.05 | 43.05 |

Zoom lens unit data (*LU = lens unit)
(*SS = starting surface)
(*FL = focal length)
(*LSL = lens structure length)
(*FPPP = front principal point position)
(*RPPP = rear principal point position)

| LU | SS | FL | LSL | FPPP | RPPP |
|---|---|---|---|---|---|
| L1 | 1 | 184.67 | 45.99 | 6.16 | −31.94 |
| L2 | 6 | −102.59 | 14.53 | 6.39 | −4.47 |
| L3 | 11 | −138.22 | 1.80 | 0.25 | −0.69 |
| L4 | 13 | 78.74 | 65.24 | −34.53 | −62.10 |
| L5 | 27 | 87.80 | 11.32 | −2.30 | −9.18 |
| L6 | 32 | −90.98 | 3.00 | 2.61 | 0.72 |
| L7 | 35 | −61.78 | 8.01 | 11.44 | 4.12 |
| L8 | 39 | 112.74 | 4.14 | 3.44 | 1.09 |

Single lens element data (*L = lens)
(*SS = starting surface)
(*FL = focal length)

| L | SS | FL |
|---|---|---|
| 1 | 1 | 248.83 |
| 2 | 3 | 220.66 |
| 3 | 4 | −319.23 |
| 4 | 6 | −282.73 |
| 5 | 8 | −63.21 |
| 6 | 9 | 102.02 |
| 7 | 11 | −138.22 |
| 8 | 13 | 119.72 |
| 9 | 15 | 132.58 |
| 10 | 17 | 82.99 |
| 11 | 18 | −75.66 |
| 12 | 21 | 33.02 |
| 13 | 22 | −18.45 |
| 14 | 24 | −88.36 |
| 15 | 25 | 45.84 |
| 16 | 27 | 41.54 |
| 17 | 29 | −29.25 |
| 18 | 30 | 48.52 |
| 19 | 32 | 133.96 |
| 20 | 33 | −53.67 |
| 21 | 35 | 65.34 |
| 22 | 37 | −29.40 |
| 23 | 39 | 112.74 |

Numerical Embodiment 5

Unit: mm
Surface data (*SN = surface number)
(*ED = effective diameter)

| SN | r | d | nd | vd | ED |
|---|---|---|---|---|---|
| 1 | 173.604 | 7.74 | 1.48749 | 70.2 | 74.85 |
| 2 | −668.668 | 0.20 | | | 74.47 |

-continued

| Numerical Embodiment 5 | | | | | |
|---|---|---|---|---|---|
| 3 | 260.347 | 5.10 | 1.49700 | 81.5 | 73.43 |
| 4 | −4188.383 | 25.29 | | | 72.78 |
| 5 | 138.054 | 8.19 | 1.43387 | 95.1 | 60.49 |
| 6 | −234.104 | 2.00 | 1.66565 | 35.6 | 59.21 |
| 7 (FC) | 210.639 | (variable) | | | 57.27 |
| 8 | 85.023 | 2.26 | 1.84666 | 23.8 | 37.21 |
| 9 | 154.793 | 1.80 | 1.81600 | 46.6 | 36.69 |
| 10 (FC) | 60.709 | (variable) | | | 35.32 |
| 11 | −324.229 | 1.65 | 1.72916 | 54.7 | 33.56 |
| 12 | 158.255 | 2.75 | | | 33.26 |
| 13 | −82.052 | 1.65 | 1.72916 | 54.7 | 33.26 |
| 14 | 92.545 | 2.70 | 1.85478 | 24.8 | 34.06 |
| 15 (FC) | 2019.792 | (variable) | | | 34.21 |
| 16 | 71.137 | 4.64 | 1.49700 | 81.5 | 36.20 |
| 17 | −351.943 | 0.15 | | | 36.18 |
| 18 | 55.256 | 5.28 | 1.43700 | 95.1 | 35.91 |
| 19 | −522.509 | 0.20 | | | 35.40 |
| 20 | 43.993 | 5.74 | 1.49700 | 81.5 | 33.83 |
| 21 | −442.271 | 1.50 | 1.91082 | 35.2 | 32.71 |
| 22 | 90.035 | 8.79 | | | 31.43 |
| 23 (iris) | ∞ | 5.60 | | | 28.14 |
| 24 | 83.679 | 6.50 | 1.85478 | 24.8 | 25.22 |
| 25 | −37.048 | 1.40 | 2.00100 | 29.1 | 23.87 |
| 26 | 32.685 | 3.28 | | | 22.29 |
| 27 | 49.481 | 1.40 | 2.05090 | 26.9 | 22.63 |
| 28 | 28.848 | 4.09 | 1.74400 | 44.8 | 22.22 |
| 29 | −280.577 | 1.70 | | | 22.11 |
| 30 | 40.975 | 4.74 | 1.66565 | 35.6 | 21.53 |
| 31 | −44.897 | 0.59 | | | 20.87 |
| 32 | −55.492 | 1.20 | 1.77250 | 49.6 | 19.97 |
| 33 | 106.409 | (variable) | | | 19.14 |
| 34 | −257.743 | 2.83 | 1.63930 | 44.9 | 16.64 |
| 35 | −25.508 | 1.20 | 1.59282 | 68.6 | 16.65 |
| 36 (FC) | 30.852 | (variable) | | | 16.62 |
| 37* | −93.406 | 2.00 | 1.58313 | 59.4 | 29.36 |
| 38 | 81.856 | 6.64 | 1.53172 | 48.8 | 30.88 |
| 39 | −53.407 | (variable) | | | 34.00 |
| 40 | ∞ | 1.30 | 1.54400 | 66.3 | 50.00 |
| 41 | ∞ | 0.80 | | | 50.00 |
| IP | ∞ | | | | |

(*IP = image plane)

Aspherical surface data
The 37-th surface

K = 0.00000e+00 A 4 = −5.61235e−07 A 6 = 3.23010e−09 A 8 = −1.63969e−11
A10 = 3.48666e−14

| Various data | | | |
|---|---|---|---|
| Zoom ratio | 3.88 | | |
| Focal length | 125.00 | 250.00 | 485.00 |
| F number | 5.15 | 5.70 | 6.48 |
| Half angle of view | 9.82 | 4.95 | 2.55 |
| Image height | 21.64 | 21.64 | 21.64 |
| Overall lens length | 299.54 | 299.54 | 299.54 |
| BF | 64.13 | 57.60 | 51.99 |
| d7 | 2.60 | 35.11 | 53.96 |
| d10 | 5.56 | 7.66 | 10.06 |
| d15 | 82.38 | 39.99 | 1.40 |
| d33 | 2.61 | 8.27 | 10.15 |
| d36 | 11.47 | 20.12 | 41.18 |
| d39 | 62.49 | 55.96 | 50.35 |

Zoom lens unit data

| LU | SS | FL | LSL | FPPP | RPPP |
|---|---|---|---|---|---|
| L1 | 1 | 203.74 | 48.52 | −8.78 | −46.56 |
| L2 | 8 | −295.40 | 4.06 | 8.86 | 6.45 |
| L3 | 11 | −66.75 | 8.75 | 2.25 | −3.83 |

(*LU = lens unit)
(*SS = starting surface)
(*FL = focal length)
(*LSL = lens structure length)
(*FPPP = front principal point position)
(*RPPP = rear principal point position)

-continued

| Numerical Embodiment 5 | | | | | |
|---|---|---|---|---|---|
| L4 | 16 | 54.68 | 56.80 | 5.95 | −41.31 |
| L5 | 34 | −50.11 | 4.03 | 2.23 | −0.24 |
| L6 | 37 | 289.42 | 8.64 | 15.91 | 10.91 |

| Single lens element data | | |
|---|---|---|
| L | SS<br>(*L = lens)<br>(*SS = starting surface)<br>(*FL = focal length) | FL |
| 1 | 1 | 283.57 |
| 2 | 3 | 493.37 |
| 3 | 5 | 201.50 |
| 4 | 6 | −166.27 |
| 5 | 8 | 219.54 |
| 6 | 9 | −123.47 |
| 7 | 11 | −145.64 |
| 8 | 13 | −59.41 |
| 9 | 14 | 113.39 |
| 10 | 16 | 119.50 |
| 11 | 18 | 114.67 |
| 12 | 20 | 80.83 |
| 13 | 21 | −82.02 |
| 14 | 24 | 30.81 |
| 15 | 25 | −17.18 |
| 16 | 27 | −68.20 |
| 17 | 28 | 35.36 |
| 18 | 30 | 32.91 |
| 19 | 32 | −47.06 |
| 20 | 34 | 44.07 |
| 21 | 35 | −23.37 |
| 22 | 37 | −74.50 |
| 23 | 38 | 61.84 |

Numerical Embodiment 6

Unit: mm
Surface data

| SN | r | d<br>(*SN = surface number)<br>(*ED = effective diameter) | nd | vd | ED |
|---|---|---|---|---|---|
| 1 | 185.136 | 10.53 | 1.48749 | 70.2 | 89.81 |
| 2 | −468.666 | 11.50 | | | 89.35 |
| 3 | 135.136 | 9.87 | 1.43387 | 95.1 | 82.49 |
| 4 | −1482.456 | 2.00 | 1.73800 | 32.3 | 81.26 |
| 5 (FC) | 678.705 | (variable) | | | 79.98 |
| 6 | 92.605 | 1.65 | 1.72916 | 54.7 | 54.06 |
| 7 | 72.502 | 6.83 | | | 52.64 |
| 8 | −214.838 | 1.65 | 1.72916 | 54.7 | 52.53 |
| 9 | 65.101 | 5.45 | 1.84666 | 23.8 | 51.51 |
| 10 (FC) | 200.453 | (variable) | | | 51.21 |
| 11 | −134.322 | 1.80 | 1.90366 | 31.3 | 50.95 |
| 12 (FC) | 564.979 | (variable) | | | 51.61 |
| 13 | 113.990 | 7.71 | 1.49700 | 81.5 | 52.98 |
| 14 | −141.886 | 0.15 | | | 53.11 |
| 15 | 82.813 | 7.03 | 1.49700 | 81.5 | 52.49 |
| 16 | −447.028 | 0.20 | | | 51.93 |
| 17 | 55.599 | 9.22 | 1.49700 | 81.5 | 48.72 |
| 18 | −176.696 | 1.50 | 1.83481 | 42.7 | 47.44 |
| 19 | 115.041 | 4.92 | | | 45.01 |
| 20 (iris) | ∞ | 20.19 | | | 43.64 |
| 21 | 78.019 | 6.51 | 1.85478 | 24.8 | 32.57 |
| 22 | −47.199 | 1.40 | 2.00100 | 29.1 | 31.60 |
| 23 | 33.910 | 4.96 | | | 28.86 |
| 24 | 50.532 | 1.40 | 2.00069 | 25.5 | 29.58 |
| 25 | 31.163 | 5.54 | 1.67300 | 38.3 | 28.99 |
| 26 | −644.614 | (variable) | | | 28.89 |
| 27 | 41.737 | 6.53 | 1.61340 | 44.3 | 28.34 |
| 28 | −54.673 | 0.20 | | | 27.55 |
| 29 | −122.333 | 1.20 | 1.80400 | 46.5 | 26.26 |
| 30 | 30.744 | 3.56 | 1.72047 | 34.7 | 24.43 |

-continued

| Numerical Embodiment 6 | | | | | |
|---|---|---|---|---|---|
| 31 | 151.153 | (variable) | | | 23.84 |
| 32 | 165.525 | 1.58 | 1.71700 | 47.9 | 22.70 |
| 33 | −479.514 | 1.20 | 1.59282 | 68.6 | 22.30 |
| 34 | 36.614 | (variable) | | | 21.10 |
| 35 | 502.145 | 2.05 | 1.66565 | 35.6 | 17.98 |
| 36 | −56.738 | 5.63 | | | 18.02 |
| 37 | −42.218 | 1.30 | 1.81600 | 46.6 | 17.59 |
| 38 | 59.727 | (variable) | | | 18.10 |
| 39 | −400.292 | 4.50 | 1.73800 | 32.3 | 42.45 |
| 40 (FC) | −67.000 | (variable) | | | 42.90 |
| 41 | ∞ | 1.30 | 1.54400 | 66.3 | 50.00 |
| 42 | ∞ | 0.80 | | | 50.00 |
| IP | ∞ | | | | 50.00 |

(*IP = image plane)

| Various data | | | |
|---|---|---|---|
| Zoom ratio | 3.15 | | |
| Focal length | 185.00 | 300.00 | 582.00 |
| F number | 5.15 | 5.70 | 6.48 |
| Half angle of view | 6.67 | 4.12 | 2.13 |
| Image height | 21.64 | 21.64 | 21.64 |
| Overall lens length | 329.54 | 329.54 | 329.54 |
| BF | 42.04 | 42.04 | 42.04 |
| d5 | 10.53 | 27.85 | 47.53 |
| d10 | 44.08 | 26.76 | 7.08 |
| d12 | 51.92 | 32.56 | 1.40 |
| d26 | 3.28 | 2.17 | 1.72 |
| d31 | 4.67 | 6.48 | 2.10 |
| d34 | 4.82 | 3.94 | 17.83 |
| d38 | 18.43 | 37.97 | 60.08 |
| d40 | 40.40 | 40.40 | 40.40 |

Zoom lens unit data

| LU | SS | FL | LSL | FPPP | RPPP |
|---|---|---|---|---|---|
| L1 | 1 | 181.06 | 33.90 | 6.04 | −20.65 |
| L2 | 6 | −124.70 | 15.59 | 8.77 | −2.88 |
| L3 | 11 | −119.94 | 1.80 | 0.18 | −0.76 |
| L4 | 13 | 76.01 | 70.74 | −31.21 | −63.60 |
| L5 | 27 | 80.91 | 11.49 | −2.34 | −9.03 |
| L6 | 32 | −87.10 | 2.78 | 2.34 | 0.65 |
| L7 | 35 | −57.06 | 8.98 | 12.56 | 4.08 |
| L8 | 39 | 108.41 | 4.50 | 3.09 | 0.52 |

(*LU = lens unit)
(*SS = starting surface)
(*FL = focal length)
(*LSL = lens structure length)
(*FPPP = front principal point position)
(*RPPP = rear principal point position)

Single lens element data

| L | SS | FL |
|---|---|---|
| 1 | 1 | 273.68 |
| 2 | 3 | 285.97 |
| 3 | 4 | −630.59 |
| 4 | 6 | −474.45 |
| 5 | 8 | −68.35 |
| 6 | 9 | 111.81 |
| 7 | 11 | −119.94 |
| 8 | 13 | 128.47 |
| 9 | 15 | 141.20 |
| 10 | 17 | 86.23 |
| 11 | 18 | −83.27 |
| 12 | 21 | 35.25 |
| 13 | 22 | −19.54 |
| 14 | 24 | −84.30 |
| 15 | 25 | 44.32 |
| 16 | 27 | 39.61 |
| 17 | 29 | −30.45 |
| 18 | 30 | 52.91 |

(*L = lens)
(*SS = starting surface)
(*FL = focal length)

-continued

| Numerical Embodiment 6 | | |
|---|---|---|
| 19 | 32 | 171.79 |
| 20 | 33 | −57.33 |
| 21 | 35 | 76.70 |
| 22 | 37 | −30.14 |
| 23 | 39 | 108.41 |

Numerical Embodiment 7

Unit: mm
Surface data

| SN | r | d | nd | vd | ED |
|---|---|---|---|---|---|
| | | (*SN = surface number) (*ED = effective diameter) | | | |
| 1 | 150.309 | 11.96 | 1.48749 | 70.2 | 89.81 |
| 2 | −481.314 | 31.52 | | | 89.20 |
| 3 | 131.122 | 11.14 | 1.43387 | 95.1 | 73.61 |
| 4 | −245.600 | 2.00 | 1.72047 | 34.7 | 72.14 |
| 5 (FC) | 467.037 | (variable) | | | 70.21 |
| 6 | 127.182 | 3.62 | 1.73037 | 32.2 | 49.66 |
| 7 | 361.846 | 1.80 | 1.72916 | 54.7 | 48.80 |
| 8 (FC) | 72.346 | (variable) | | | 46.72 |
| 9 | −2309.514 | 1.65 | 1.72916 | 54.7 | 44.23 |
| 10 | 330.094 | 3.52 | | | 43.89 |
| 11 | −92.981 | 1.65 | 1.69680 | 55.5 | 43.87 |
| 12 | 97.379 | 3.08 | 1.84666 | 23.8 | 44.68 |
| 13 (FC) | 364.057 | (variable) | | | 44.76 |
| 14 | 66.257 | 7.78 | 1.49700 | 81.5 | 45.90 |
| 15 | −180.827 | 0.15 | | | 45.70 |
| 16 | 75.550 | 4.81 | 1.49700 | 81.5 | 44.38 |
| 17 | 874.213 | 0.20 | | | 43.71 |
| 18 | 52.221 | 7.56 | 1.49700 | 81.5 | 41.39 |
| 19 | −147.505 | 1.50 | 1.85150 | 40.8 | 40.14 |
| 20 | 93.480 | 4.64 | | | 37.93 |
| 21 (iris) | ∞ | 14.72 | | | 36.60 |
| 22 | 74.302 | 6.23 | 1.85478 | 24.8 | 28.64 |
| 23 | −36.705 | 1.40 | 2.00100 | 29.1 | 27.68 |
| 24 | 31.093 | 3.56 | | | 25.34 |
| 25 | 46.201 | 1.40 | 2.00069 | 25.5 | 25.87 |
| 26 | 28.960 | 4.92 | 1.65412 | 39.7 | 25.39 |
| 27 | −365.718 | (variable) | | | 25.33 |
| 28 | 36.475 | 6.16 | 1.56732 | 42.8 | 24.89 |
| 29 | −45.198 | 0.20 | | | 24.14 |
| 30 | −98.335 | 1.20 | 1.80400 | 46.5 | 23.03 |
| 31 | 32.069 | 3.26 | 1.65412 | 39.7 | 21.65 |
| 32 | 504.250 | (variable) | | | 21.15 |
| 33 | 193.985 | 1.58 | 1.62280 | 57.0 | 19.93 |
| 34 | −200.000 | 1.20 | 1.49700 | 81.5 | 19.53 |
| 35 | 31.124 | (variable) | | | 18.38 |
| 36 | −256.193 | 2.00 | 1.66565 | 35.6 | 18.37 |
| 37 | −45.934 | 5.20 | | | 18.45 |
| 38 | −35.265 | 1.30 | 1.71300 | 53.9 | 17.67 |
| 39 (FC) | 60.693 | (variable) | | | 18.05 |
| 40 | −336.312 | 4.54 | 1.65412 | 39.7 | 40.26 |
| 41 | −59.940 | (variable) | | | 40.75 |
| 42 | ∞ | 1.30 | 1.51633 | 64.1 | 50.00 |
| 43 | ∞ | 0.80 | | | 50.00 |
| IP | ∞ | | | | |

(*IP = image plane)

Various data

| | | | |
|---|---|---|---|
| Zoom ratio | 3.77 | | |
| Focal length | 154.50 | 300.00 | 582.00 |
| F number | 5.15 | 5.70 | 6.48 |
| Half angle of view | 7.97 | 4.12 | 2.13 |
| Image height | 21.64 | 21.64 | 21.64 |
| Overall lens length | 329.56 | 329.56 | 329.56 |
| BF | 44.56 | 44.56 | 44.56 |
| d5 | 1.80 | 23.69 | 44.51 |
| d8 | 6.58 | 16.02 | 13.98 |
| d13 | 95.54 | 45.60 | 1.40 |
| d27 | 2.79 | 1.90 | 1.84 |

-continued

| Numerical Embodiment 7 | | | |
|---|---|---|---|
| d32 | 2.10 | 6.02 | 2.10 |
| d35 | 4.05 | 4.05 | 12.36 |
| d39 | 14.69 | 30.27 | 51.36 |
| d41 | 42.90 | 42.90 | 42.90 |

Zoom lens unit data

| LU | SS | FL | LSL | FPPP | RPPP |
|---|---|---|---|---|---|
| L1 | 1 | 204.41 | 56.63 | 2.44 | −45.17 |
| L2 | 6 | −240.49 | 5.42 | 7.59 | 4.32 |
| L3 | 9 | −91.55 | 9.91 | 4.03 | −3.04 |
| L4 | 14 | 87.16 | 58.86 | −39.92 | −60.74 |
| L5 | 28 | 70.17 | 10.83 | −1.08 | −7.73 |
| L6 | 33 | −83.11 | 2.78 | 2.30 | 0.52 |
| L7 | 36 | −54.93 | 8.50 | 10.67 | 2.94 |
| L8 | 40 | 110.79 | 4.54 | 3.32 | 0.59 |

(*LU = lens unit)
(*SS = starting surface)
(*FL = focal length)
(*LSL = lens structure length)
(*FPPP = front principal point position)
(*RPPP = rear principal point position)

Single lens element data

| L | SS | FL |
|---|---|---|
| 1 | 1 | 236.43 |
| 2 | 3 | 198.81 |
| 3 | 4 | −223.14 |
| 4 | 6 | 266.78 |
| 5 | 7 | −124.34 |
| 6 | 9 | −395.99 |
| 7 | 11 | −68.02 |
| 8 | 12 | 156.19 |
| 9 | 14 | 98.60 |
| 10 | 16 | 166.06 |
| 11 | 18 | 78.59 |
| 12 | 19 | −67.01 |
| 13 | 22 | 29.51 |
| 14 | 23 | −16.64 |
| 15 | 25 | −80.83 |
| 16 | 26 | 41.23 |
| 17 | 28 | 36.58 |
| 18 | 30 | −29.95 |
| 19 | 31 | 52.21 |
| 20 | 33 | 158.36 |
| 21 | 34 | −54.10 |
| 22 | 36 | 83.76 |
| 23 | 38 | −31.11 |
| 24 | 40 | 110.79 |

(*L = lens)
(*SS = starting surface)
(*FL = focal length)

Numerical Embodiment 8

Unit: mm
Surface data

| SN | r | d | nd | vd | ED |
|---|---|---|---|---|---|
| 1 | 156.049 | 11.59 | 1.48749 | 70.2 | 89.82 |
| 2 | −496.261 | 30.48 | | | 89.23 |
| 3 | 145.397 | 10.56 | 1.43387 | 95.1 | 74.81 |
| 4 | −264.253 | 2.00 | 1.74951 | 35.3 | 73.48 |
| 5 (FC) | 691.229 | (variable) | | | 71.86 |
| 6 | 104.105 | 3.00 | 1.75520 | 27.5 | 57.27 |
| 7 | 168.323 | 1.80 | 1.72916 | 54.7 | 56.40 |
| 8 | 89.864 | 3.50 | | | 54.10 |
| 9 | 451.643 | 1.65 | 1.83481 | 42.7 | 54.02 |

(*SN = surface number)
(*ED = effective diameter)

-continued

| Numerical Embodiment 8 | | | | | |
|---|---|---|---|---|---|
| 10 (FC) | 118.638 | (variable) | | | 52.51 |
| 11 | −113.512 | 1.65 | 1.69680 | 55.5 | 44.19 |
| 12 | 90.699 | 2.81 | 1.92119 | 24.0 | 44.67 |
| 13 (FC) | 226.240 | (variable) | | | 44.68 |
| 14 | 90.565 | 6.04 | 1.43700 | 95.1 | 45.29 |
| 15 | −209.408 | 0.15 | | | 45.25 |
| 16 | 59.188 | 6.07 | 1.49700 | 81.5 | 44.50 |
| 17 | 1009.241 | 0.20 | | | 43.81 |
| 18 | 44.835 | 6.63 | 1.49700 | 81.5 | 41.26 |
| 19 | 2019.829 | 1.50 | 1.91082 | 35.2 | 40.11 |
| 20 | 108.557 | 9.77 | | | 38.47 |
| 21 (iris) | ∞ | 7.71 | | | 32.99 |
| 22 | 117.629 | 6.50 | 1.84666 | 23.8 | 27.21 |
| 23 | −42.821 | 1.40 | 2.00100 | 29.1 | 25.44 |
| 24 | 29.226 | 3.38 | | | 23.28 |
| 25 | 41.959 | 1.40 | 2.05090 | 26.9 | 23.56 |
| 26 | 27.197 | 4.39 | 1.65412 | 39.7 | 23.00 |
| 27 | −493.461 | (variable) | | | 22.85 |
| 28 | 42.301 | 4.96 | 1.59551 | 39.2 | 21.95 |
| 29 | −41.477 | 0.20 | | | 21.32 |
| 30 | −74.047 | 1.20 | 1.80400 | 46.5 | 20.53 |
| 31 | 26.655 | 3.40 | 1.65412 | 39.7 | 19.32 |
| 32 | 1794.563 | (variable) | | | 18.87 |
| 33 | 180.718 | 2.25 | 1.61340 | 44.3 | 17.50 |
| 34 | −66.401 | 1.20 | 1.59282 | 68.6 | 16.99 |
| 35 | 28.364 | (variable) | | | 15.98 |
| 36 | −42.457 | 1.30 | 1.49700 | 81.5 | 21.41 |
| 37 (FC) | 449.975 | (variable) | | | 22.33 |
| 38 | −1546.985 | 5.41 | 1.61340 | 44.3 | 38.27 |
| 39 | −56.851 | (variable) | | | 41.00 |
| 40 | ∞ | 1.30 | 1.54400 | 66.3 | 50.00 |
| 41 | ∞ | 0.80 | | | 50.00 |
| IP | ∞ | | | | |

(*IP = image plane)

| Various data | | | |
|---|---|---|---|
| Zoom ratio | 3.15 | | |
| Focal length | 185.00 | 300.00 | 582.00 |
| F number | 5.15 | 5.70 | 6.48 |
| Half angle of view | 6.67 | 4.12 | 2.13 |
| Image height | 21.64 | 21.64 | 21.64 |
| Overall lens length | 329.54 | 329.54 | 329.54 |
| BF | 45.54 | 45.54 | 46.21 |
| d5 | 2.60 | 23.85 | 44.94 |
| d10 | 28.76 | 31.57 | 25.72 |
| d13 | 80.42 | 45.22 | 1.40 |
| d27 | 3.02 | 2.84 | 4.21 |
| d32 | 8.20 | 9.79 | 2.10 |
| d35 | 14.88 | 13.16 | 30.01 |
| d37 | 2.00 | 13.45 | 30.85 |
| d39 | 43.90 | 43.90 | 44.56 |

Zoom lens unit data

| LU | SS | FL | LSL | FPPP | RPPP |
|---|---|---|---|---|---|
| L1 | 1 | 208.29 | 54.63 | 3.87 | −42.49 |
| L2 | 6 | −168.15 | 9.95 | 10.39 | 2.97 |
| L3 | 11 | −128.74 | 4.46 | 0.97 | −1.46 |
| L4 | 14 | 85.44 | 55.16 | −46.35 | −59.18 |
| L5 | 28 | 84.24 | 9.76 | −1.32 | −7.25 |
| L6 | 33 | −58.68 | 3.45 | 2.61 | 0.44 |
| L7 | 36 | −77.99 | 1.30 | 0.07 | −0.79 |
| L8 | 38 | 96.08 | 5.41 | 3.48 | 0.13 |

(*LU = lens unit)
(*SS = starting surface)
(*FL = focal length)
(*LSL = lens structure length)
(*FPPP = front principal point position)
(*RPPP = rear principal point position)

-continued

| Numerical Embodiment 8 | | |
|---|---|---|
| Single lens element data | | |
| L | SS<br>(*L = lens)<br>(*SS = starting surface)<br>(*FL = focal length) | FL |
| 1 | 1 | 244.96 |
| 2 | 3 | 217.87 |
| 3 | 4 | −254.83 |
| 4 | 6 | 354.20 |
| 5 | 7 | −266.98 |
| 6 | 9 | −193.18 |
| 7 | 11 | −72.11 |
| 8 | 12 | 162.72 |
| 9 | 14 | 145.57 |
| 10 | 16 | 126.24 |
| 11 | 18 | 92.16 |
| 12 | 19 | −126.00 |
| 13 | 22 | 37.78 |
| 14 | 23 | −17.19 |
| 15 | 25 | −77.32 |
| 16 | 26 | 39.54 |
| 17 | 28 | 35.96 |
| 18 | 30 | −24.25 |
| 19 | 31 | 41.33 |
| 20 | 33 | 79.44 |
| 21 | 34 | −33.37 |
| 22 | 36 | −77.99 |
| 23 | 38 | 96.08 |

The moving distance of each lens unit when focusing from infinity to each object distance is performed in each numerical embodiment is shown in Table 1 below. In Table 1, the direction from the object side toward the image side is defined as a positive direction.

TABLE 1

| | | Wide-angle end | Midrange | Telephoto end | |
|---|---|---|---|---|---|
| | Unit that moves | Lateral magnification −0.15 | Lateral magnification −0.2 | Lateral magnification −0.2 | Lateral magnification −0.3 |
| First Embodiment | From first surface to object surface | −1045.796 | −1260.902 | −2661.210 | −1695.742 |
| | Sixth lens unit | 1.711 | 7.022 | 11.072 | 16.691 |
| | Seventh lens unit | 11.606 | 9.938 | 6.086 | 11.000 |
| Second Embodiment | From first surface to object surface | −1149.698 | −1489.351 | −2747.821 | −1747.718 |
| | Fifth lens unit | 7.126 | 14.672 | 17.937 | 29.500 |
| Third Embodiment | From first surface to object surface | −1073.783 | −1273.545 | −2658.958 | −1693.927 |
| | Fifth lens unit | 2.748 | 7.901 | 11.957 | 18.046 |
| | Sixth lens unit | 9.454 | 10.008 | 5.913 | 11.000 |
| Fourth Embodiment | From first surface to object surface | −1128.720 | −1241.181 | −3192.957 | −2049.844 |
| | Sixth lens unit | 3.523 | 8.885 | 15.288 | 23.618 |
| | Seventh lens unit | 11.480 | 12.131 | 5.512 | 10.578 |
| Fifth Embodiment | From first surface to object surface | −682.856 | −1004.119 | −2222.774 | −1385.923 |
| | Fifth lens unit | 4.077 | 11.092 | 17.507 | 29.001 |
| Sixth Embodiment | From first surface to object surface | −1051.298 | −1292.840 | −2713.321 | −1747.730 |
| | Sixth lens unit | 2.070 | 7.584 | 12.209 | 18.207 |
| | Seventh lens unit | 11.466 | 10.282 | 5.858 | 11.163 |
| Seventh Embodiment | From first surface to object surface | −849.627 | −1235.048 | −2649.768 | −1682.619 |
| | Sixth lens unit | 1.967 | 8.814 | 13.653 | 20.695 |
| | Seventh lens unit | 8.149 | 8.418 | 6.727 | 12.389 |

TABLE 1-continued

| | | Wide-angle end | Midrange | Telephoto end | |
|---|---|---|---|---|---|
| | Unit that moves | Lateral magnification −0.15 | Lateral magnification −0.2 | Lateral magnification −0.2 | Lateral magnification −0.3 |
| Eighth Embodiment | From first surface to object surface | −906.114 | −1013.076 | −2431.733 | −1382.947 |
| | Third lens unit | −21.646 | −23.360 | −8.647 | −18.604 |
| | Sixth lens unit | 1.893 | 7.190 | 14.977 | 21.577 |

Various values in each numerical embodiment are shown in Table 2 below.

TABLE 2

| | First Embodiment | Second Embodiment | Third Embodiment | Fourth Embodiment | Fifth Embodiment | Sixth Embodiment | Seventh Embodiment | Eighth Embodiment |
|---|---|---|---|---|---|---|---|---|
| ft | 582.000 | 582.000 | 582.000 | 682.500 | 485.000 | 582.000 | 582.000 | 582.000 |
| f1 | 214.225 | 239.654 | 240.959 | 184.667 | 203.735 | 181.056 | 204.415 | 208.294 |
| f2 | −486.513 | −147.677 | 1313.472 | −102.593 | −295.395 | −124.698 | −240.493 | −168.154 |
| f3 | −91.782 | −154.178 | −79.712 | −138.216 | −66.753 | −119.944 | −91.550 | −128.741 |
| fLP | 100.365 | 66.964 | 75.786 | 78.737 | 54.679 | 76.005 | 87.162 | 85.445 |
| f1A | 246.085 | 223.011 | 240.959 | 248.829 | 181.132 | 273.678 | 236.425 | 244.956 |
| sk | 39.557 | 45.542 | 42.027 | 44.710 | 51.994 | 42.037 | 44.557 | 45.542 |
| Lt | 330.000 | 345.000 | 330.000 | 345.000 | 300.000 | 330.000 | 330.000 | 330.000 |
| d1AB | 29.080 | 43.606 | 23.563 | 21.586 | 25.287 | 11.500 | 31.523 | 30.478 |
| βLRF1 | 1.732 | 2.738 | 1.755 | 1.766 | 2.750 | 1.713 | 1.638 | 2.065 |
| βLRF2 | 1.714 | 2.526 | 1.734 | 1.723 | 2.521 | 1.699 | 1.615 | 1.952 |
| βR1 | 1.967 | 0.936 | 1.875 | 1.812 | 0.858 | 1.920 | 1.898 | 1.346 |
| βR2 | 1.911 | 0.936 | 1.822 | 1.762 | 0.858 | 1.863 | 1.836 | 1.346 |
| r1 | 170.806 | 194.596 | 171.183 | 158.077 | 173.604 | 185.136 | 150.309 | 156.049 |
| r2 | −394.114 | −847.706 | −365.868 | −509.174 | −668.668 | −468.666 | −481.314 | −496.261 |
| r1LRF | 306.743 | −266.666 | 115.786 | 145.141 | −257.743 | 165.525 | 193.985 | 180.718 |
| r2LRF | 28.966 | 31.939 | 31.234 | 38.372 | 30.852 | 36.614 | 31.124 | 28.364 |
| fLRF | −72.608 | −54.502 | −74.262 | −90.980 | −50.108 | −87.099 | −83.111 | −58.684 |
| fLF1 | −72.608 | | −74.262 | −90.980 | | −87.099 | −83.111 | −58.684 |
| fLF2 | −57.669 | | −59.611 | −61.779 | | −57.063 | −54.930 | −77.992 |
| MLF1 | 11.072 | | 11.957 | 15.288 | | 12.209 | 13.653 | 8.647 |
| MLF2 | 6.086 | | 5.913 | 5.512 | | 5.858 | 6.727 | 14.977 |
| T | 5.593 | 11.421 | 4.203 | 14.788 | 12.184 | 10.782 | 4.052 | 8.431 |
| vd_RF1N | 81.540 | 68.621 | 68.621 | 68.621 | 68.621 | 68.621 | 81.540 | 68.621 |
| Inequality (1) | 0.440 | 1.623 | 0.183 | 1.800 | 0.690 | 1.452 | 0.850 | 1.239 |
| Inequality (2) | 0.567 | 0.593 | 0.567 | 0.505 | 0.619 | 0.567 | 0.567 | 0.567 |
| Inequality (3) | 0.118 | 0.196 | 0.098 | 0.087 | 0.140 | 0.042 | 0.133 | 0.124 |
| Inequality (4) | 1.732 | 2.738 | 1.755 | 1.766 | 2.750 | 1.713 | 1.638 | 2.065 |
| Inequality (5) | −7.736 | −5.699 | −7.317 | −6.952 | −4.833 | −7.134 | −6.066 | −5.909 |
| Inequality (6) | 0.120 | 0.132 | 0.127 | 0.130 | 0.173 | 0.127 | 0.135 | 0.138 |
| Inequality (7) | 2.134 | 3.579 | 3.179 | 2.345 | 3.726 | 2.382 | 2.345 | 2.438 |
| Inequality (8) | −2.334 | −1.554 | −3.023 | −1.336 | −3.052 | −1.509 | −2.233 | −1.618 |
| Inequality (9) | 0.395 | 0.627 | 0.363 | 0.526 | 0.588 | 0.434 | 0.524 | 0.522 |
| Inequality (10) | 0.368 | 0.412 | 0.414 | 0.271 | 0.420 | 0.311 | 0.351 | 0.358 |
| Inequality (11) | −1.209 | −0.786 | −1.739 | −1.719 | −0.786 | −1.568 | −1.382 | −1.372 |
| Inequality (12) | −0.0019 | −0.0014 | −0.0019 | −0.0014 | −0.0014 | 0.0008 | −0.0019 | −0.0025 |
| Inequality (14) | 1.259 | | 1.246 | 1.473 | | 1.526 | 1.513 | 0.752 |
| Inequality (15) | 1.819 | | 2.022 | 2.773 | | 2.084 | 2.029 | 0.577 |
| Inequality (16) | 0.068 | 0.093 | 0.048 | 0.132 | 0.099 | 0.121 | 0.038 | 0.074 |
| Inequality (17) | 81.540 | 68.621 | 68.621 | 68.621 | 68.621 | 68.621 | 81.540 | 68.621 |
| Inequality (18) | −5.301 | −0.958 | −16.478 | −0.742 | −4.425 | −1.040 | −2.627 | −1.306 |
| Inequality (19) | −0.339 | −0.227 | −0.308 | −0.493 | −0.246 | −0.481 | −0.407 | −0.282 |

Lenses that satisfy the inequality (13) and their numerical values in the numerical embodiments are shown in Table 3 below.

TABLE 3

| | First Embodiment | | Second Embodiment | | Third Embodiment | | Fourth Embodiment | | Fifth Embodiment | | Sixth Embodiment | | Seventh Embodiment | | Eighth Embodiment | |
|---|---|---|---|---|---|---|---|---|---|---|---|---|---|---|---|---|
| Inequality (13) | G16 | −0.0036 | G20 | −0.0036 | G14 | −0.0036 | G15 | −0.0036 | G17 | −0.00355 | G15 | −0.0039 | G16 | −0.0036 | G16 | −0.0036 |
| | G20 | −0.0028 | G21 | −0.0081 | G18 | −0.0065 | G18 | −0.0036 | G18 | −0.00137 | G16 | −0.0065 | G19 | −0.0036 | G19 | −0.0036 |
| | G22 | −0.0014 | G24 | −0.0014 | G22 | −0.0014 | G19 | −0.0065 | G20 | −0.00053 | G18 | −0.0019 | G20 | −0.0028 | G20 | −0.0065 |
| | G24 | −0.0036 | | | | | G21 | −0.0065 | | | G19 | −0.0034 | G22 | −0.0014 | G23 | −0.0065 |
| | | | | | | | | | | | G21 | −0.0014 | G24 | −0.0036 | | |

Imaging Apparatus

Figure 25:
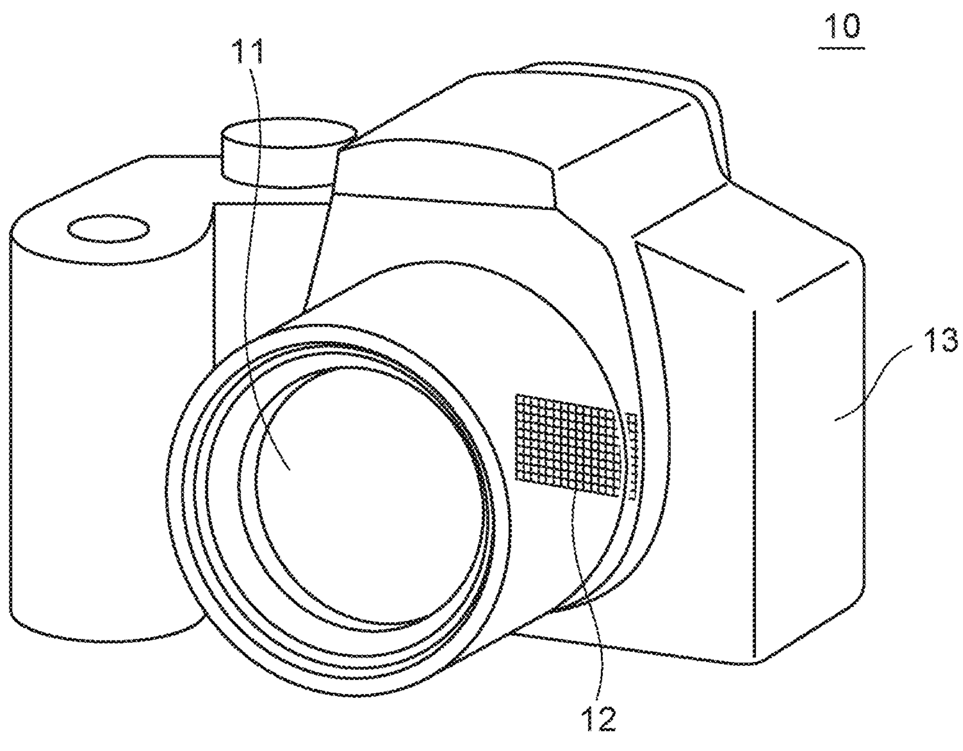
FIG. 25 is a schematic view of an imaging apparatus.

Next, an embodiment of a digital still camera (imaging apparatus) using a zoom lens according to the present disclosure as its imaging optical system will now be described with reference to FIG. 25. In FIG. 25, reference numeral 11 denotes an imaging optical system configured as a zoom lens according to any one of the first to eighth embodiments described above. Reference numeral 12 denotes an image pickup device (photoelectric conversion element) such as a CCD sensor or a CMOS sensor built in a camera body 10 and configured to receive an optical image formed by the imaging optical system 11 and perform photoelectric conversion thereon. The camera body 10 may be a so-called single-lens reflex camera that is equipped with an instant return mirror or a mirrorless camera that is not equipped with an instant return mirror.

Applying the zoom lens L0 according to the present disclosure to an imaging apparatus such as a digital still camera as described here makes it possible to obtain a high-resolution image with a wide angle of view.

Though some exemplary embodiments and examples have been described above, the scope of the present disclosure is not limited to these embodiments and examples. Various combinations, alterations, and changes can be made without departing from the gist of the disclosure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-101410, filed on Jun. 21, 2023, which is hereby incorporated by reference herein in its entirety.

What is claimed is:

1. A zoom lens, comprising:

a first lens unit having a positive refractive power;

a second lens unit;

a third lens unit having a negative refractive power; and a rear lens group including one or more lens units, wherein the first lens unit, the second lens unit, the third lens unit, and the rear lens group are disposed in order from an object side to an image side, and an interval between lens units disposed adjacent to each other changes during zooming, the rear lens group includes all of lens units disposed closer to an image than the third lens unit in the zoom lens, the first lens unit is stationary for zooming, and includes a first positive lens disposed closest to an object and having a positive refractive power, the rear lens group has a positive refractive power at a wide-angle end, and following inequalities are satisfied:

$$0.05 < f1/|f2| < 2.00, \text{ and}$$

$$0.40 < Lt/ft < 0.65,$$

where f1 denotes a focal length of the first lens unit, f2 denotes a focal length of the second lens unit, Lt denotes an overall lens length at a telephoto end, and ft denotes a focal length of an entire system at the telephoto end.

2. The zoom lens according to claim 1, wherein the rear lens group includes a first focus lens unit that moves when focusing from infinity to close range is performed.

3. The zoom lens according to claim 2, wherein the first focus lens unit has a negative refractive power and moves toward the image when the focusing from infinity to close range is performed.

4. The zoom lens according to claim 1, wherein the first lens unit includes a first partial unit and a second partial unit disposed adjacent to, and on the image side with respect to, the first partial unit, among air gaps on an optical axis of lenses disposed adjacent to one another in the first lens unit, an air gap on the optical axis between the first partial unit and the second partial unit is a greatest gap, and a following inequality is satisfied:

$$0.02 < d1AB/f1A < 0.35,$$

where d1AB denotes a distance on the optical axis between, of the first partial unit, a surface located closest to the image and, of the second partial unit, a surface located closest to the object, and f1A denotes a focal length of the first partial unit.

5. The zoom lens according to claim 1, wherein the first lens unit is comprised of four lenses or less.

6. The zoom lens according to claim 3, wherein a following inequality is satisfied:

$$1.1 < \beta LRF1 < 4.0,$$

where βLRF1 denotes a lateral magnification of the first focus lens unit when focusing to an object distance where a lateral magnification of the entire system is –0.2 is performed at the telephoto end.

7. The zoom lens according to claim 3, wherein a following inequality is satisfied:

$$-10.0 < (1 - \beta LRF1 \times \beta LRF1) \times \beta R1 \times \beta R1 < -3.0,$$

where βLRF1 denotes a lateral magnification of the first focus lens unit when focusing to an object distance where a lateral magnification of the entire system is –0.2 is performed at the telephoto end, and βR1 denotes a synthesized lateral magnification of all of lens units disposed closer to the image than the first focus lens unit.

8. The zoom lens according to claim 1, wherein a following inequality is satisfied:

$$0.09 < sk/Lt < 0.3,$$

where sk denotes a back focus at the wide-angle end or a back focus at the telephoto end, whichever is less.

9. The zoom lens according to claim 1, wherein a following inequality is satisfied:

$$1.2 < f1/fLP < 6.0,$$

where fLP denotes a focal length of a lens unit disposed closest to the object among lens units disposed in the rear lens group and each having a positive refractive power.

10. The zoom lens according to claim 1, wherein a following inequality is satisfied:

$$-5.0 < f1/f3 < -0.5,$$

where f3 denotes a focal length of the third lens unit.

11. The zoom lens according to claim 1, wherein a following inequality is satisfied:

$$0.0 < (r2 + r1)/(r2 - r1) < 1.5,$$

where r1 denotes a radius of curvature of, of the first positive lens, a surface located closer to the object, and r2 denotes a radius of curvature of, of the first positive lens, a surface located closer to the image.

12. The zoom lens according to claim 1, wherein the first lens unit is stationary when focusing from infinity to close range is performed.

13. The zoom lens according to claim 1, wherein a following inequality is satisfied:

$$0.1 < f1/ft < 0.8.$$

14. The zoom lens according to claim 3, wherein a following inequality is satisfied:

$$-3.5 < (r2LRF + r1LRF)/(r2LRF - r1LRF) < -0.2,$$

where r1LRF denotes a radius of curvature of, of the first focus lens unit, a surface located closest to the object, and r2LRF denotes a radius of curvature of, of the first focus lens unit, a surface located closest to the image.

15. The zoom lens according to claim 1, wherein the rear lens group includes a fourth lens unit having a positive refractive power, a fifth lens unit, and a sixth lens unit that are disposed in order from the object side to the image side.

16. The zoom lens according to claim 1, wherein a following inequality is satisfied:

$$-0.01 < \theta gF\_N - (-0.0016178 \times \nu d\_N + 0.64146) < 0.01,$$

where νd_N denotes an Abbe number of a negative lens disposed closest to the object among negative lenses disposed in the first lens unit, and θgF_N denotes a partial dispersion ratio of the negative lens for a g line and an F line.

17. The zoom lens according to claim 1, wherein the rear lens group includes an aperture diaphragm configured to determine an on-axis beam of light, and includes a plurality of positive lenses disposed closer to the image than the aperture diaphragm, and a following inequality is satisfied:

$$-0.012 < \theta gF\_PR - (-0.0016178 \times \nu d\_PR + 0.64146) < 0.005,$$

where νd_PR denotes an Abbe number of at least two positive lenses among the plurality of positive lenses, and θgF_PR denotes a partial dispersion ratio of the at least two positive lenses for a g line and an F line.

18. The zoom lens according to claim 3, further comprising:

a second focus lens unit, wherein the first focus lens unit and the second focus lens unit move while drawing trajectories different from each other when the focusing from infinity to close range is performed.

19. The zoom lens according to claim 18, wherein a lens unit that is either one of the first focus lens unit and the second focus lens unit and is disposed closer to the object is defined as an object-side focus lens unit, and an other, which is disposed closer to the image, is defined as an image-side focus lens unit, and a following inequality is satisfied:

$$0.4 < fLF1/fLF2 < 3.0,$$

where fLF1 denotes a focal length of the object-side focus lens unit, and fLF2 denotes a focal length of the image-side focus lens unit.

20. The zoom lens according to claim 18, wherein a lens unit that is either one of the first focus lens unit and the second focus lens unit and is disposed closer to the object is defined as an object-side focus lens unit, and an other, which is disposed closer to the image, is defined as an image-side focus lens unit, and a following inequality is satisfied:

$$0.2 < MLF1/MLF2 < 5.0,$$

where MLF1 denotes an absolute value of an amount of movement of the object-side focus lens unit when focusing from infinity to an object distance where a lateral magnification of the entire system is −0.2 is performed at the telephoto end, and MLF2 denotes an absolute value of an amount of movement of the image-side focus lens unit when the focusing from infinity to the object distance where the lateral magnification of the entire system is −0.2 is performed at the telephoto end.

21. The zoom lens according to claim 3, wherein a following inequality is satisfied:

$$0.01 < T \times |(1 - \beta LRF2 \times \beta LRF2) \times \beta R2 \times \beta R2| / f < 0.50,$$

where T denotes a distance on an optical axis between, of the first focus lens unit, a surface located closest to the image and an object-side surface of a lens disposed adjacent to, and on the image side with respect to, the first focus lens unit when focusing to an object distance where a lateral magnification of the entire system is −0.3 is performed at the telephoto end, βLRF2 denotes a lateral magnification of the first focus lens unit, and βR2 denotes a synthesized lateral magnification of all of lens units disposed closer to the image than the first focus lens unit.

22. The zoom lens according to claim 3, wherein the first focus lens unit includes a compound lens made up of a positive lens and a negative lens, and a following inequality is satisfied:

$$50 < \nu d\_RF1N < 100,$$

where νd_RF1N denotes an Abbe number of the negative lens.

23. The zoom lens according to claim 4, wherein the first partial unit is comprised of two lenses or less.

24. The zoom lens according to claim 1, wherein a following inequality is satisfied:

$$-1000.0 < |f2|/f3 < -0.3,$$

where f3 denotes a focal length of the third lens unit.

25. The zoom lens according to claim 3, wherein a following inequality is satisfied:

$$-1.00 < fLRF/f1 < -0.05,$$

where fLRF denotes a focal length of the first focus lens unit.

26. An apparatus, comprising:

a zoom lens; and a pickup device configured to receive an image formed by the zoom lens, the zoom lens including a first lens unit having a positive refractive power, a second lens unit, a third lens unit having a negative refractive power, and a rear lens group including one or more lens units, wherein the first lens unit, the second lens unit, the third lens unit, and the rear lens group are disposed in order from an object side to an image side, an interval between lens units disposed adjacent to each other changes during zooming, the first lens unit is stationary for zooming, and includes a first positive lens disposed closest to an object and having a positive refractive power, the rear lens group has a positive refractive power at a wide-angle end, and following inequalities are satisfied:

$$0.05 < f1/|f2| < 2.00,$$

$$\text{and } 0.40 < Lt/ft < 0.65,$$

where f1 denotes a focal length of the first lens unit, f2 denotes a focal length of the second lens unit, Lt denotes an overall lens length at a telephoto end, and ft denotes a focal length of an entire system at the telephoto end.

* * * * *